(12) United States Patent
Sun et al.

(10) Patent No.: US 11,782,327 B2
(45) Date of Patent: Oct. 10, 2023

(54) REMOVABLE BATTERY DOOR ASSEMBLIES FOR IMAGE CAPTURE DEVICES

(71) Applicant: GoPro, Inc., San Mateo, CA (US)

(72) Inventors: Juntao Sun, Shenzhen (CN); Adrian Santos, Dublin, CA (US); Chao Chen, San Mateo, CA (US); Joseph Tucker, Foster City, CA (US); Nicholas Vitale, Foster City, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 17/417,622

(22) PCT Filed: Jul. 2, 2020

(86) PCT No.: PCT/CN2020/099915
§ 371 (c)(1),
(2) Date: Jun. 23, 2021

(87) PCT Pub. No.: WO2022/000417
PCT Pub. Date: Jan. 6, 2022

(65) Prior Publication Data
US 2022/0317548 A1     Oct. 6, 2022

(51) Int. Cl.
*G03B 17/08*     (2021.01)
*H01M 50/271*    (2021.01)

(52) U.S. Cl.
CPC .......... *G03B 17/08* (2013.01); *H01M 50/271* (2021.01)

(58) Field of Classification Search
CPC ......... H01M 50/262; E05D 7/10–1077; E05D 2007/1027–128; G03B 17/02
See application file for complete search history.

(56) References Cited

U.S. PATENT DOCUMENTS

| 1,612,277 | A | 12/1926 | Leo |
| D96,348 | S | 7/1935 | Teaque |
| D118,296 | S | 12/1939 | Tuomey |

(Continued)

FOREIGN PATENT DOCUMENTS

| CA | 168972 | 4/1916 |
| CN | 1531337 A | 9/2004 |

(Continued)

OTHER PUBLICATIONS

International Search Report and Written Opinion for App. No. PCT/CN2020/099915, dated Mar. 25, 2021, 10 pages.

(Continued)

*Primary Examiner* — Leon W Rhodes, Jr.
(74) *Attorney, Agent, or Firm* — Young Basile Hanlon & MacFarlane, P.C.

(57) ABSTRACT

An image capture device (100) is disclosed that includes a body (102) and a door assembly (400) that is configured for removable connection to the body (102). The door assembly (400) includes a door body (500); a locking mechanism (600) that is slidable in relation to the door body (500) between a locked position and an unlocked position; and at least one biasing member (700) that is configured for engagement (contact) with the door body (500) and the locking mechanism (600) to automatically move the locking mechanism (600) into the locked position upon closure of the door assembly (400).

20 Claims, 27 Drawing Sheets

(56) References Cited

U.S. PATENT DOCUMENTS

| | | |
|---|---|---|
| 3,508,482 A | 4/1970 | Taylor |
| 3,721,746 A | 3/1973 | Knappenberger |
| D243,618 S | 3/1977 | Kaye |
| 4,091,402 A | 5/1978 | Siegel |
| 4,208,028 A | 6/1980 | Brown |
| D260,513 S | 9/1981 | Comstock |
| 4,469,423 A | 9/1984 | Bresson |
| 4,646,141 A | 2/1987 | Timmermans |
| 4,733,259 A | 3/1988 | Ng |
| D299,651 S | 1/1989 | Preussner |
| D321,705 S | 11/1991 | Ohmura |
| D328,888 S | 8/1992 | Zhu |
| D329,040 S | 9/1992 | Seki |
| D334,169 S | 3/1993 | Antonczak |
| 5,216,371 A | 6/1993 | Nagai |
| D338,220 S | 8/1993 | Kohno |
| D339,365 S | 9/1993 | Urcuilio |
| D348,043 S | 6/1994 | Hamilton |
| D354,739 S | 1/1995 | Durham |
| 5,400,234 A | 3/1995 | Yu |
| D372,896 S | 8/1996 | Nagele |
| D385,283 S | 10/1997 | Snyder |
| D386,147 S | 11/1997 | Siddoway |
| D392,659 S | 3/1998 | Takano |
| 5,727,940 A * | 3/1998 | Wanzenbock .......... A61C 7/06 24/68 CD |
| 5,808,663 A | 9/1998 | Okaya |
| D400,496 S | 11/1998 | Barber |
| D402,955 S | 12/1998 | Smith |
| D404,356 S | 1/1999 | Higgins |
| D407,098 S | 3/1999 | Goto |
| D408,796 S | 4/1999 | Georgopulos |
| D409,160 S | 5/1999 | Sonntag |
| D412,153 S | 7/1999 | Chen |
| D418,107 S | 12/1999 | Murray, III |
| D423,449 S | 4/2000 | Naskali |
| D432,493 S | 10/2000 | Killebrew |
| 6,153,834 A | 11/2000 | Cole |
| D439,218 S | 3/2001 | Yu |
| D441,386 S | 5/2001 | Yamazaki |
| D442,982 S | 5/2001 | Adachi |
| 6,233,400 B1 | 5/2001 | Muramatsu |
| D449,577 S | 10/2001 | Nishio |
| 6,315,180 B1 | 11/2001 | Watkins |
| D456,006 S | 4/2002 | Maher |
| 6,380,713 B2 | 4/2002 | Namura |
| D457,132 S | 5/2002 | Petherbridge |
| D460,411 S | 7/2002 | Wang |
| D463,469 S | 9/2002 | Kawase |
| D463,774 S | 10/2002 | Buck |
| D474,489 S | 5/2003 | Kawashima |
| D480,682 S | 10/2003 | Kawase |
| D480,741 S | 10/2003 | Berger |
| D481,995 S | 11/2003 | Yokota |
| D483,329 S | 12/2003 | Kuo |
| D484,164 S | 12/2003 | Ogura |
| D486,510 S | 2/2004 | Ogura |
| D487,765 S | 3/2004 | Dow |
| 6,718,129 B1 | 4/2004 | Cornell |
| D490,370 S | 5/2004 | Picardo |
| D491,137 S | 6/2004 | Suzuki |
| D492,248 S | 6/2004 | Gregory |
| D494,940 S | 8/2004 | Fiocchi |
| D496,674 S | 9/2004 | Hayashi |
| D504,904 S | 5/2005 | Nagai |
| D509,189 S | 9/2005 | Buck |
| D510,721 S | 10/2005 | Axelrod |
| D512,371 S | 12/2005 | Axelrod |
| D515,121 S | 2/2006 | Bleau |
| D515,613 S | 2/2006 | Holmes |
| D516,502 S | 3/2006 | Small |
| D516,503 S | 3/2006 | Takeshita |
| D521,445 S | 5/2006 | Liu |
| D521,446 S | 5/2006 | Liu |
| D523,808 S | 6/2006 | Thor |
| D524,241 S | 7/2006 | Takeshita |
| D524,836 S | 7/2006 | Morita |
| D526,612 S | 8/2006 | Sugeno |
| D527,403 S | 8/2006 | Byun |
| D531,199 S | 10/2006 | Matsuda |
| D532,029 S | 11/2006 | Kim |
| D532,030 S | 11/2006 | Yoshida |
| D532,433 S | 11/2006 | Sato |
| D533,574 S | 12/2006 | Hamamura |
| D534,564 S | 1/2007 | Tainaka |
| D535,249 S | 1/2007 | Ogasawara |
| D535,253 S | 1/2007 | Buck |
| D538,322 S | 3/2007 | Horikiri |
| D544,463 S | 6/2007 | Harris, Jr. |
| D546,277 S | 7/2007 | Andre |
| D551,969 S | 10/2007 | Aurilio |
| D555,587 S | 11/2007 | Yamamoto |
| D556,803 S | 12/2007 | Ishida |
| D561,092 S | 2/2008 | Kim |
| D566,151 S | 4/2008 | Won |
| D576,486 S | 9/2008 | Koza |
| D577,729 S | 9/2008 | Derry |
| D577,731 S | 9/2008 | Altonji |
| D584,683 S | 1/2009 | Preliasco |
| D590,334 S | 4/2009 | Tatehata |
| D594,047 S | 6/2009 | Lee |
| D594,497 S | 6/2009 | Hatori |
| D596,217 S | 7/2009 | Kim |
| 7,617,944 B2 | 11/2009 | Noguchi |
| 7,626,621 B2 | 12/2009 | Ito |
| 7,653,292 B2 | 1/2010 | Yamaguchi |
| D610,539 S | 2/2010 | Dahan |
| 7,683,968 B2 | 3/2010 | Hagihara |
| D616,480 S | 5/2010 | Ookawa |
| D616,742 S | 6/2010 | Lymn |
| D617,360 S | 6/2010 | Endo |
| 7,728,905 B2 | 6/2010 | Tanaka |
| D621,860 S | 8/2010 | Fukano |
| D622,591 S | 8/2010 | Biesecker, II |
| 7,768,727 B2 | 8/2010 | Iida |
| 7,801,439 B2 | 9/2010 | Nagata |
| D631,835 S | 2/2011 | Neidhart |
| D635,607 S | 4/2011 | Takagi |
| D637,552 S | 5/2011 | Inman |
| D640,196 S | 6/2011 | Shuang |
| D641,389 S | 7/2011 | Dastagir |
| D642,517 S | 8/2011 | Inman |
| D643,809 S | 8/2011 | Okuda |
| D644,988 S | 9/2011 | Finney |
| D645,814 S | 9/2011 | Otani |
| 8,014,656 B2 | 9/2011 | Woodman |
| D646,222 S | 10/2011 | Tatehata |
| D647,554 S | 10/2011 | Yim |
| D647,935 S | 11/2011 | Raken |
| D647,944 S | 11/2011 | Jannard |
| D648,270 S | 11/2011 | Jiang |
| D654,850 S | 2/2012 | Obata |
| D654,853 S | 2/2012 | Bacon |
| D657,808 S | 4/2012 | Woodman |
| D660,339 S | 5/2012 | Yoshida |
| D660,788 S | 5/2012 | Ziring |
| 8,199,251 B2 | 6/2012 | Woodman |
| D664,995 S | 8/2012 | Akana |
| D665,340 S | 8/2012 | Obata |
| 8,241,783 B2 | 8/2012 | Tsuji |
| 8,247,106 B2 | 8/2012 | Takeshita |
| D667,003 S | 9/2012 | Richter |
| D668,247 S | 10/2012 | Kim |
| D674,749 S | 1/2013 | Moore |
| D676,476 S | 2/2013 | Ishikura |
| D680,097 S | 4/2013 | Davies |
| D681,550 S | 5/2013 | Corbin |
| D682,777 S | 5/2013 | Gupta |
| D682,778 S | 5/2013 | Baumgartner |
| 8,467,675 B2 | 6/2013 | Chen |
| D687,426 S | 8/2013 | Requa |
| D690,280 S | 9/2013 | Schul |
| 8,542,308 B2 | 9/2013 | Ozawa |
| D692,042 S | 10/2013 | Dawes |

(56) References Cited

U.S. PATENT DOCUMENTS

| | | |
|---|---|---|
| 8,544,643 B2 | 10/2013 | Yim |
| D692,939 S | 11/2013 | Huang |
| D699,672 S | 2/2014 | Kosugi |
| D700,136 S | 2/2014 | Morris |
| D700,166 S | 2/2014 | Petersen |
| D702,276 S | 4/2014 | Woodman |
| D702,278 S | 4/2014 | Kim |
| 8,743,277 B2 | 6/2014 | Matsuzawa |
| D708,189 S | 7/2014 | An |
| D708,571 S | 7/2014 | Ji |
| D709,439 S | 7/2014 | Ferber |
| 8,792,003 B2 | 7/2014 | Nakamura |
| D710,921 S | 8/2014 | Gioscia |
| D710,922 S | 8/2014 | Gioscia |
| D712,347 S | 9/2014 | Awiszus |
| D712,391 S | 9/2014 | Kim |
| D713,868 S | 9/2014 | Yang |
| 8,828,601 B2 | 9/2014 | Hara |
| 8,837,928 B1 | 9/2014 | Clearman |
| D715,347 S | 10/2014 | Troxel |
| D715,789 S | 10/2014 | Yoon |
| 8,865,339 B2 | 10/2014 | Enari |
| D718,617 S | 12/2014 | Taylor |
| D721,395 S | 1/2015 | Woodman |
| D722,043 S | 2/2015 | Requa |
| D722,864 S | 2/2015 | Greenthal |
| D723,456 S | 3/2015 | Currah |
| D724,013 S | 3/2015 | Zsolcsak |
| D724,538 S | 3/2015 | Baumgartner |
| D724,637 S | 3/2015 | Samuels |
| D724,638 S | 3/2015 | Samuels |
| D725,169 S | 3/2015 | Gioscia |
| D725,590 S | 3/2015 | Clyne |
| D725,691 S | 3/2015 | De Rosa |
| 8,992,102 B1 | 3/2015 | Samuels |
| D726,648 S | 4/2015 | Zealer |
| D727,387 S | 4/2015 | Hasegawa |
| D727,991 S | 4/2015 | Hasegawa |
| 9,004,783 B1 | 4/2015 | Woodman |
| D729,059 S | 5/2015 | Taylor |
| D729,761 S | 5/2015 | Hu |
| D729,762 S | 5/2015 | Hu |
| D730,287 S | 5/2015 | Motoyama |
| D730,423 S | 5/2015 | Vandenbussche |
| 9,033,596 B2 | 5/2015 | Samuels |
| D732,593 S | 6/2015 | Woodman |
| D733,781 S | 7/2015 | Chen |
| D733,788 S | 7/2015 | Baker |
| D734,799 S | 7/2015 | Woodman |
| 9,077,013 B2 | 7/2015 | Huang |
| D737,879 S | 9/2015 | Woodman |
| D739,451 S | 9/2015 | Gioscia |
| D740,868 S | 10/2015 | Gioscia |
| D741,394 S | 10/2015 | Gioscia |
| D741,932 S | 10/2015 | Huang |
| D742,818 S | 11/2015 | Lin |
| D742,952 S | 11/2015 | Nakajima |
| D744,572 S | 12/2015 | Tabuchi |
| D745,589 S | 12/2015 | Lee |
| D745,920 S | 12/2015 | Lee |
| 9,204,021 B2 | 12/2015 | Woodman |
| D750,146 S | 2/2016 | Costa |
| 9,260,909 B2 * | 2/2016 | Kaga ............... G03B 17/02 |
| D750,680 S | 3/2016 | Chen |
| D750,686 S | 3/2016 | Chen |
| D750,687 S | 3/2016 | Samuels |
| D750,690 S | 3/2016 | Lee |
| D751,131 S | 3/2016 | Woodman |
| D752,672 S | 3/2016 | Clearman |
| D753,749 S | 4/2016 | Zhu |
| D754,238 S | 4/2016 | Woodman |
| D754,769 S | 4/2016 | Patulski |
| D755,270 S | 5/2016 | Vehlewald |
| D755,271 S | 5/2016 | Patulski |
| D755,274 S | 5/2016 | Lee |
| D755,874 S | 5/2016 | Yang |
| D758,467 S | 6/2016 | Zhang |
| D759,145 S | 6/2016 | Lee |
| D759,585 S | 6/2016 | Herbst |
| D760,309 S | 6/2016 | Parfitt |
| D760,312 S | 6/2016 | Lee |
| 9,360,742 B1 | 6/2016 | Harrison |
| 9,395,031 B1 | 7/2016 | Clearman |
| D762,759 S | 8/2016 | Wu |
| D763,346 S | 8/2016 | Jenkins |
| D763,941 S | 8/2016 | Smith |
| D764,559 S | 8/2016 | Luo |
| D765,594 S | 9/2016 | Li |
| D766,175 S | 9/2016 | Tsiopanos |
| D766,351 S | 9/2016 | Li |
| D769,346 S | 10/2016 | Nguyen |
| D769,814 S | 10/2016 | Lin |
| D772,804 S | 11/2016 | Nakashima |
| D772,966 S | 11/2016 | Song |
| 9,507,245 B1 | 11/2016 | Druker |
| D773,546 S | 12/2016 | Nguyen |
| D773,547 S | 12/2016 | Lee |
| D775,254 S | 12/2016 | Parfitt |
| D776,183 S | 1/2017 | Miyazaki |
| D776,610 S | 1/2017 | Nommensen |
| D776,612 S | 1/2017 | Chen |
| D776,738 S | 1/2017 | Clearman |
| D776,741 S | 1/2017 | Parfitt |
| D777,125 S | 1/2017 | Eder |
| D777,236 S | 1/2017 | Mai |
| D777,240 S | 1/2017 | Costa |
| D777,821 S | 1/2017 | Gioscia |
| D778,335 S | 2/2017 | Gioscia |
| D778,336 S | 2/2017 | Gioscia |
| D779,576 S | 2/2017 | Ikegame |
| D780,111 S | 2/2017 | Clyne |
| D780,112 S | 2/2017 | Lin |
| D780,244 S | 2/2017 | Wang |
| 9,588,407 B1 | 3/2017 | Harrison |
| D785,692 S | 5/2017 | Wang |
| D785,695 S | 5/2017 | Woodman |
| D785,696 S | 5/2017 | Parfitt |
| D785,697 S | 5/2017 | Costa |
| D788,835 S | 6/2017 | Wu |
| D789,435 S | 6/2017 | Nguyen |
| D790,001 S | 6/2017 | Parfitt |
| D790,002 S | 6/2017 | Nguyen |
| D790,454 S | 6/2017 | Lee |
| D791,211 S | 7/2017 | Fujita |
| D791,695 S | 7/2017 | Bergman |
| D791,848 S | 7/2017 | Zhu |
| D792,919 S | 7/2017 | Ryu |
| D793,463 S | 8/2017 | Houin |
| D794,554 S | 8/2017 | Chang |
| D794,695 S | 8/2017 | Zhang |
| D794,696 S | 8/2017 | Nguyen |
| D797,040 S | 9/2017 | Lavin, Jr. |
| D798,929 S | 10/2017 | Zhou |
| D800,202 S | 10/2017 | Hu |
| D800,817 S | 10/2017 | Sutton |
| D800,819 S | 10/2017 | Parfitt |
| D803,705 S | 11/2017 | Read |
| D803,919 S | 11/2017 | Jeong |
| D803,920 S | 11/2017 | Shin |
| D803,925 S | 11/2017 | Hoshi |
| D804,560 S | 12/2017 | Costa |
| D805,117 S | 12/2017 | Nguyen |
| D805,569 S | 12/2017 | Daugela |
| D806,155 S | 12/2017 | Parfitt |
| D806,775 S | 1/2018 | Nguyen |
| D808,163 S | 1/2018 | Song |
| D808,898 S | 1/2018 | Walker |
| D814,543 S | 4/2018 | Oshima |
| D815,032 S | 4/2018 | Lin |
| D815,677 S | 4/2018 | Gao |
| D816,753 S | 5/2018 | Zhang |
| D818,025 S | 5/2018 | Wong |
| D818,028 S | 5/2018 | Ramones |
| D818,029 S | 5/2018 | Fujita |

(56) References Cited

U.S. PATENT DOCUMENTS

| | | |
|---|---|---|
| D819,718 S | 6/2018 | Wu |
| D820,335 S | 6/2018 | Favè |
| D820,339 S | 6/2018 | Yau |
| D820,898 S | 6/2018 | Fujita |
| D821,480 S | 6/2018 | Gioscia |
| D821,481 S | 6/2018 | Gioscia |
| D824,982 S | 8/2018 | Lee |
| D825,636 S | 8/2018 | Hueber |
| D829,260 S | 9/2018 | Fujita |
| D830,446 S | 10/2018 | Muhlenkamp, IV |
| D832,905 S | 11/2018 | Liu |
| D832,906 S | 11/2018 | Hasegawa |
| D833,505 S | 11/2018 | Hu |
| D835,172 S | 12/2018 | Fujita |
| D835,574 S | 12/2018 | Trongone |
| D835,910 S | 12/2018 | Eliyahu |
| D836,696 S | 12/2018 | Zhang |
| D837,861 S | 1/2019 | Luo |
| D837,865 S | 1/2019 | Parfitt |
| D838,762 S | 1/2019 | Piekarski |
| D839,335 S | 1/2019 | Zhang |
| D839,945 S | 2/2019 | Lenz |
| D840,463 S | 2/2019 | Nguyen |
| D842,142 S | 3/2019 | Recker |
| D848,509 S | 5/2019 | Lee |
| D849,076 S | 5/2019 | Bertram |
| D849,078 S | 5/2019 | Girotti |
| D849,084 S | 5/2019 | Hu |
| D849,100 S | 5/2019 | Hsu |
| D849,108 S | 5/2019 | Huang |
| D849,730 S | 5/2019 | Charette |
| D850,513 S | 6/2019 | Gan |
| D851,155 S | 6/2019 | Hu |
| D852,255 S | 6/2019 | Guo |
| D852,256 S | 6/2019 | Bai |
| D854,597 S | 7/2019 | Gao |
| D855,675 S | 8/2019 | Luo |
| D857,076 S | 8/2019 | Gan |
| D859,498 S | 9/2019 | Lin |
| D861,592 S | 10/2019 | Venugopal |
| D861,761 S | 10/2019 | Bergman |
| D861,765 S | 10/2019 | Muhlenkamp, IV |
| D861,766 S | 10/2019 | Lim |
| D863,404 S | 10/2019 | Karpenko |
| D864,275 S | 10/2019 | Huang |
| D865,843 S | 11/2019 | Hu |
| D865,844 S | 11/2019 | Jalala |
| D865,845 S | 11/2019 | Sakai |
| D867,420 S | 11/2019 | Zhang |
| D867,427 S | 11/2019 | Bai |
| D868,871 S | 12/2019 | Nguyen |
| D868,874 S | 12/2019 | Muhlenkamp, IV |
| D869,844 S | 12/2019 | Eliyahu |
| D870,176 S | 12/2019 | Hokari |
| D870,183 S | 12/2019 | Tsukamoto |
| D871,480 S | 12/2019 | Hu |
| 10,523,925 B2 | 12/2019 | Woodman |
| D872,162 S | 1/2020 | Gao |
| 10,536,615 B2 | 1/2020 | Campbell |
| D876,521 S | 2/2020 | Costa |
| 10,574,871 B2 | 2/2020 | Abbas |
| D880,561 S | 4/2020 | Muhlenkamp |
| D880,567 S | 4/2020 | Zhang |
| D880,569 S | 4/2020 | Zhang |
| D881,974 S | 4/2020 | Nguyen |
| D882,666 S | 4/2020 | Tsukamoto |
| D884,597 S | 5/2020 | Pilliod |
| D887,970 S | 6/2020 | Himeno |
| D890,709 S | 7/2020 | Lim |
| D890,835 S | 7/2020 | Nguyen |
| D892,194 S | 8/2020 | Nguyen |
| D892,905 S | 8/2020 | Nguyen |
| D894,256 S | 8/2020 | Vitale |
| D897,400 S | 9/2020 | Liu |
| D897,403 S | 9/2020 | Liu |
| D897,408 S | 9/2020 | Tsukamoto |
| 10,768,508 B1 | 9/2020 | Woodman |
| D900,911 S | 11/2020 | Muhlenkamp, IV |
| D903,740 S | 12/2020 | Au |
| D906,396 S | 12/2020 | Schaarschmidt |
| D907,101 S | 1/2021 | Coster |
| D907,680 S | 1/2021 | Nguyen |
| D907,682 S | 1/2021 | Sjögren |
| D911,412 S | 2/2021 | Alberstein |
| D911,418 S | 2/2021 | Yap |
| D912,120 S | 3/2021 | Druker |
| D920,419 S | 5/2021 | Muhlenkamp, IV |
| D921,086 S | 6/2021 | Li |
| D921,737 S | 6/2021 | Liang |
| D921,740 S | 6/2021 | Coster |
| D923,075 S | 6/2021 | Grant |
| D925,643 S | 7/2021 | Hsu |
| D926,243 S | 7/2021 | Tsukamoto |
| D928,863 S | 8/2021 | Alberstein |
| D935,507 S | 11/2021 | Li |
| D939,608 S | 12/2021 | Han |
| D939,610 S | 12/2021 | Han |
| D940,066 S | 1/2022 | Venugopal |
| D941,904 S | 1/2022 | Coster |
| D942,373 S | 2/2022 | Ruffing |
| 2001/0034163 A1 | 10/2001 | Chiang |
| 2002/0046218 A1 | 4/2002 | Gilbert |
| 2002/0090212 A1 | 7/2002 | Shimamura |
| 2002/0136557 A1 | 9/2002 | Shimamura |
| 2003/0156212 A1 | 8/2003 | Kingetsu |
| 2004/0223752 A1 | 11/2004 | Ghanouni |
| 2005/0019029 A1 | 1/2005 | Kawakami |
| 2005/0208345 A1 | 9/2005 | Yoon |
| 2005/0212959 A1 | 9/2005 | Manabe |
| 2006/0233545 A1 | 10/2006 | Senba |
| 2006/0257137 A1 | 11/2006 | Fromm |
| 2007/0019948 A1 | 1/2007 | Terada |
| 2007/0071423 A1 | 3/2007 | Fantone |
| 2007/0140686 A1 | 6/2007 | Misawa |
| 2008/0117328 A1 | 5/2008 | Daoud |
| 2008/0248703 A1 | 10/2008 | Russell |
| 2009/0032420 A1 | 2/2009 | Zenzai |
| 2010/0060747 A1 | 3/2010 | Woodman |
| 2010/0061711 A1 | 3/2010 | Woodman |
| 2011/0001834 A1 | 1/2011 | Herrell |
| 2011/0042530 A1 | 2/2011 | Phillips |
| 2011/0129210 A1 | 6/2011 | McGucken |
| 2011/0216195 A1 | 9/2011 | Tanaka |
| 2011/0223447 A1 | 9/2011 | Ignor |
| 2011/0317065 A1 | 12/2011 | Lin |
| 2012/0211254 A1 | 8/2012 | Miura |
| 2013/0186310 A1 | 7/2013 | Lymberis |
| 2013/0200768 A1 | 8/2013 | Miura |
| 2013/0321696 A1 | 12/2013 | Bae |
| 2014/0060582 A1 | 3/2014 | Hartranft |
| 2014/0160349 A1 | 6/2014 | Huang |
| 2015/0022717 A1 | 1/2015 | Coons |
| 2015/0122849 A1 | 5/2015 | Jones |
| 2015/0189131 A1 | 7/2015 | Woodman |
| 2015/0316835 A1 | 11/2015 | Scott |
| 2015/0318579 A1 | 11/2015 | Kwon |
| 2016/0116828 A1 | 4/2016 | Clearman |
| 2016/0119516 A1 | 4/2016 | Clearman |
| 2016/0131963 A1 | 5/2016 | Clearman |
| 2016/0209731 A1 | 7/2016 | Song |
| 2016/0274338 A1 | 9/2016 | Davies |
| 2017/0059967 A1 | 3/2017 | Harrison |
| 2017/0111559 A1 | 4/2017 | Abbas |
| 2017/0150236 A1 | 5/2017 | Newman |
| 2017/0195550 A1 | 7/2017 | Kim |
| 2017/0289413 A1 | 10/2017 | Samuels |
| 2017/0324890 A1 | 11/2017 | Moskovchenko |
| 2018/0039162 A1 | 2/2018 | Ali |
| 2018/0081258 A1 | 3/2018 | Clyne |
| 2018/0084194 A1 | 3/2018 | Woodman |
| 2018/0084215 A1 | 3/2018 | Jing |
| 2018/0102123 A1 | 4/2018 | Tisch |
| 2018/0103189 A1 | 4/2018 | Nguyen |
| 2018/0103190 A1 | 4/2018 | Nguyen |

(56) References Cited

U.S. PATENT DOCUMENTS

| | | | |
|---|---|---|---|
| 2018/0146122 | A1 | 5/2018 | Campbell |
| 2018/0198989 | A1 | 7/2018 | MacMillan |
| 2018/0262682 | A1 | 9/2018 | Wang |
| 2019/0179214 | A1 | 6/2019 | Hara |
| 2020/0159091 | A1 | 5/2020 | Vitale |
| 2020/0184690 | A1 | 6/2020 | Guérin |
| 2020/0204721 | A1 | 6/2020 | Douady |
| 2020/0204772 | A1 | 6/2020 | Gounelle |
| 2020/0218136 | A1 | 7/2020 | Au |
| 2020/0221010 | A1 | 7/2020 | Douady |
| 2020/0221219 | A1 | 7/2020 | Hardin |
| 2020/0259978 | A1 | 8/2020 | Abbas |
| 2022/0299846 | A1 | 9/2022 | Crow |
| 2022/0365405 | A1 | 11/2022 | Vitale |

FOREIGN PATENT DOCUMENTS

| | | | |
|---|---|---|---|
| CN | 1892403 | A | 1/2007 |
| CN | 101078859 | A | 11/2007 |
| CN | 101331815 | A | 12/2008 |
| CN | 102005552 | A | 4/2011 |
| CN | 207083334 | U | 3/2018 |
| CN | 207531231 | U | 6/2018 |
| EP | 0031985220005 | | 2/2018 |
| JP | H05304625 | A | 11/1993 |
| JP | 2001217564 | A | 8/2001 |
| JP | 2003142841 | A | 5/2003 |
| JP | 2005174919 | A | 6/2005 |
| JP | 2006252825 | A * | 9/2006 |
| JP | 2007057997 | A | 3/2007 |
| JP | 2012083494 | A * | 4/2012 |
| JP | 2012215667 | A | 11/2012 |
| JP | 1595273 | | 1/2018 |
| JP | 1595299 | | 1/2018 |
| JP | 2018107558 | A | 7/2018 |

OTHER PUBLICATIONS

Alex NLD AHDBT501 TinEye. Tineye.com [published Jan. 13, 2017][online][Accessed Feb. 28, 2017]<Url:https://tineye.com/search/a068519109ac11d29440a513c6a88863d1-dc6e51/?extension.sub.--ver=chrome-1.1.5>. 4 pages.
Amazon.com: Ailuki Rechargeable Battery 1490MAH 2 Pack and 3-Channel Charger for GoPro Hero. Published Jun. 22, 2017. Retrieved from the internet at <https://www.annazon.conn/Rechargeable-Battery-3-Channel-Compatible-Original/dp/B0734J76NN/>, Jan. 19, 2019. 1 page. (Year: 2017).
Amazon.com: GoPro Battery (Fusion) . . . Date First Available of Feb. 1, 2018. Retrieved from the internet at <https:// www.amazon.com/GoPro-Camera-ASBBA-001-Fusion-Battery/dp/B078XY2L42/>, Sep. 14, 2020. 1 page. (Year: 2018).
Chinese Office Action, Chinese Application No. 201430488714.2, dated Mar. 12, 2015, 3 pages.
International Search Report and Written Opinion for App. No. PCT/US2020/050479 dated Dec. 3, 2020, 6 pages.
International Search Report and Written Opinion for App. No. PCT/US2020/050483 dated Nov. 12, 2020, 9 pages.
Kingma Ebay. Ebay.com. [published Nov. 10, 2016][online][Accessed Feb. 28, 2017]<URL:http://www.ebay.com/itm/KingMa-AHDBT-501-Li-ion-Battery-1220- mAh-Dual-Charger-For-Gopro-Hero-5-Camera-/272413104511>. 4 pages.
Office Action for Taiwanese Patent Application No. TW 103304745, dated Jan. 28, 2016, 3 Pages.
PCT International Search Report and Written Opinion for PCT/US2014/058465, dated Dec. 23, 2014, 17 pages.
PCT International Search Report and Written Opinion for PCT/US2014/070655, dated Apr. 29, 2015, 13 Pages.
Shopthewall Tin Eye. Tineye.com[published Feb. 9, 2017][online][Accessed Feb. 27, 2017], <URL:https://tineye.com/search/2432380143a2cf364f8dd9e5150bce62a316525- f/?extension.sub.--ver=chrome-1.1.5>. 4 pages.
U.S. Appl. No. 29/663,435, filed Sep. 14, 2018, 65 pages.
U.S. Appl. No. 29/694,559, filed Jun. 11, 2019, 25 pages.
United States Office Action for U.S. Appl. No. 14/148,536, dated Jul. 9, 2014, 9 pages.
United States Office Action for U.S. Appl. No. 14/536,683, dated Dec. 18, 2014, 14 Pages.
United States Office Action for U.S. Appl. No. 14/536,683, dated Jun. 9, 2015, 16 pages.
United States Office Action for U.S. Appl. No. 14/536,683, dated Sep. 21, 2015. 15 Pages.
United States Office Action, U.S. Appl. No. 29/576,880, dated Mar. 9, 2017, 13 pages.
U.S. Appl. No. 29/631,230, filed Feb. 28, 2017, 79 pages.
U.S. Appl. No. 29/699,945, filed Jul. 30, 2019, 8 pages.
youtube.com: Ailuki Battery Charger for GoPro Hero 5/6/7 at ~9 seconds; published by Jake Wipp on Mar. 15, 2019; retrieved from the internet at <<https://www.youtube.com/watch?v=M13sf6NBKVE>> on Apr. 24, 2019; 1 page.
"FlyHi Battery". Found online Nov. 2, 2021 at amazon.com. Reference dated Nov. 21, 2016. 3 pages. Retrieved from https://www.amazon.com/ dp/B01MTQ9D74?tag=toptenbest-20. (Year: 2016).
"GoPro Rechargeable Battery". Found online Mar. 10, 2022 at amazon.co.uk Reference dated Oct. 7, 2016. 4 pages. Retrieved from https://www.amazon.co.uk/GoPro-Rechargeable-Battery-Official-Accessory-Black/dp/B01MOPV67H/?th=1.(Year: 2016).
"Newmowa Rechargeable Battery" Found online Mar. 14, 2022 at amazon.co.uk. Reference dated Mar. 26, 2017. 6 pages. Retrieved from https://www.amazon.co.uk/Newmowa-Rechargeable-AHDBT-302-Replacement-3-Channel/dp/B06XW6R74Z. (Year: 2017).
"Tectra Battery". Found online Mar. 10, 2022 at joom.com. Reference dated Jun. 6, 2019. 3 pages. Retrieved from https://www.joom.com/en/ products/5c9356006ecda80101b7f260. (Year: 2019).
"TELESIN Batteries". Found online Mar. 10, 2022 at amazon.com Reference dated Mar. 29, 2019. 3 pages. Retrieved from https://www.amazon.com/TELESIN-Replacement-Batteries-Function-Waterproof/dp/B07Q4C1MST.(Year: 2019).
International Preliminary Report on Patentability issued in App No. PCT/CN2020/099915, dated Jan. 12, 2023, 6 pages.

* cited by examiner

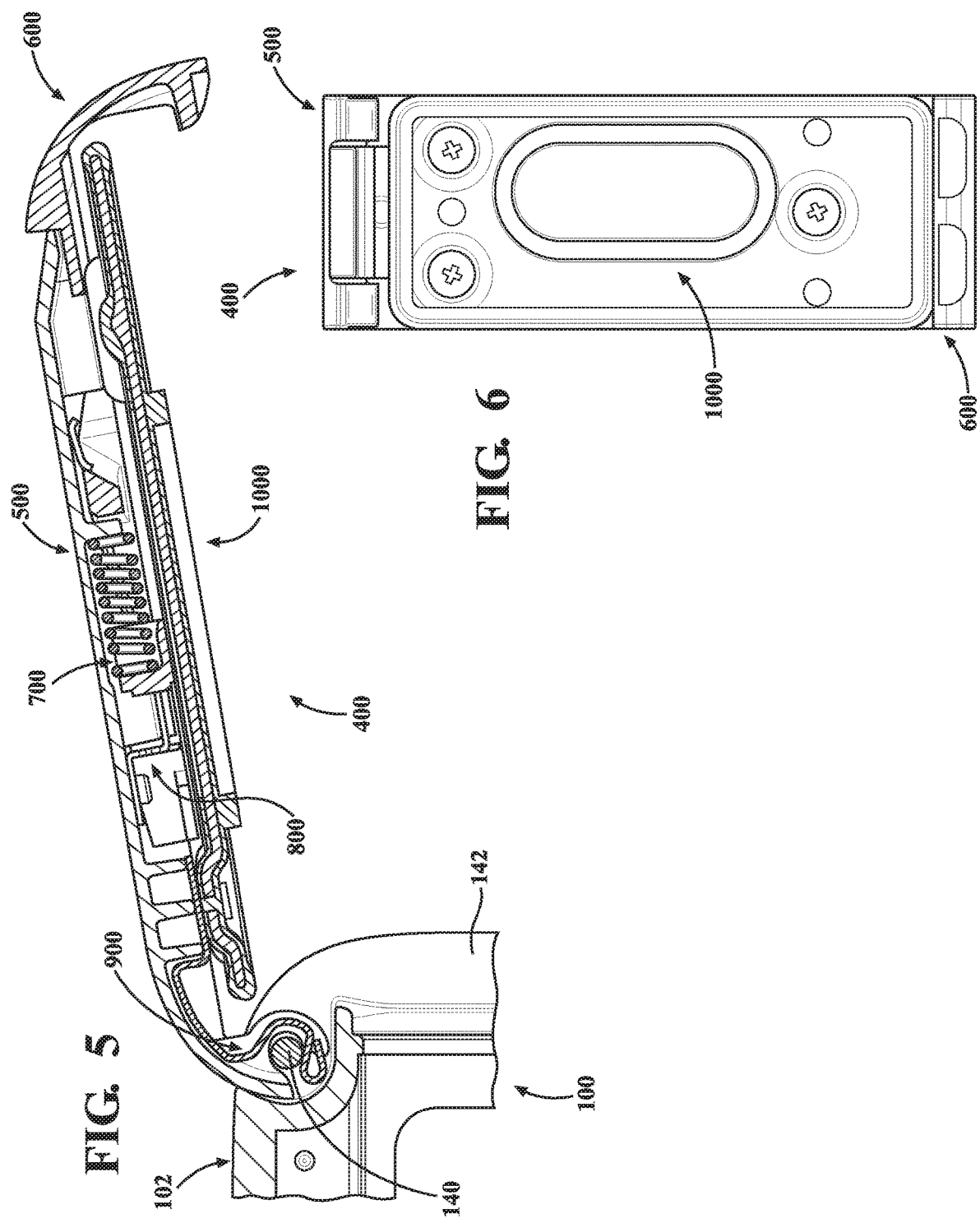

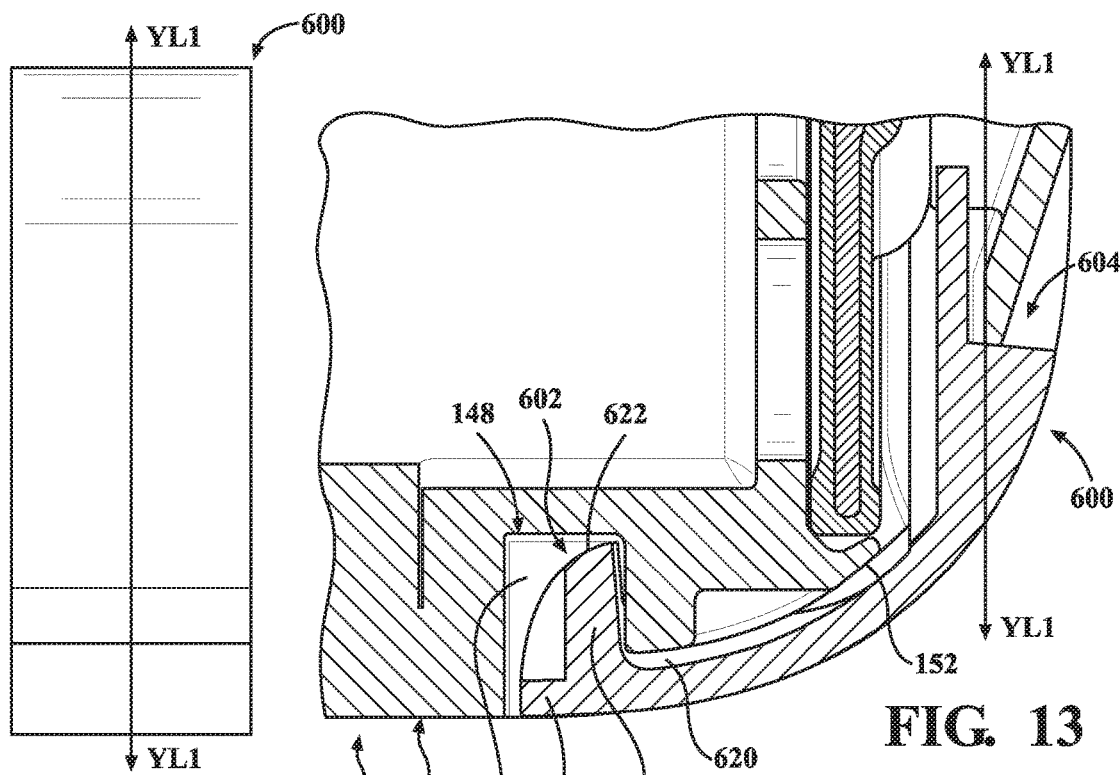
FIG. 12
FIG. 13
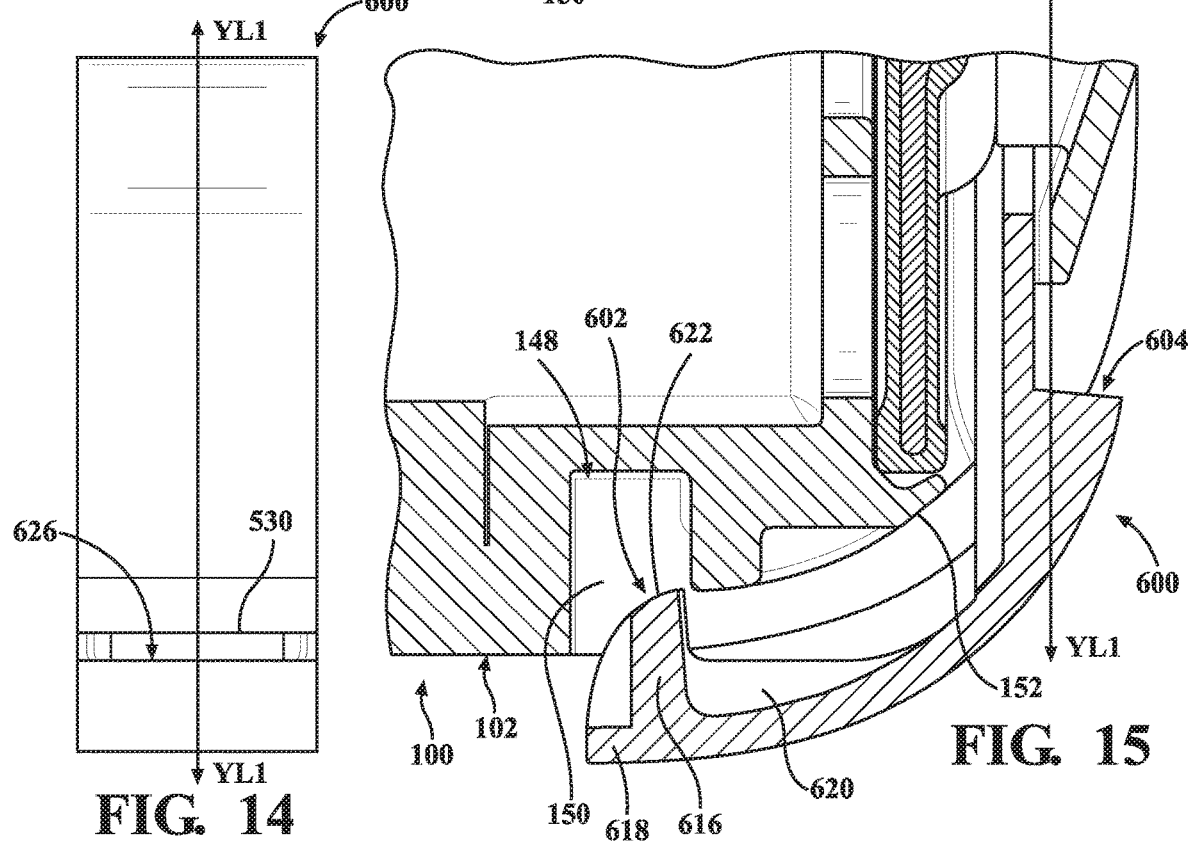
FIG. 14
FIG. 15

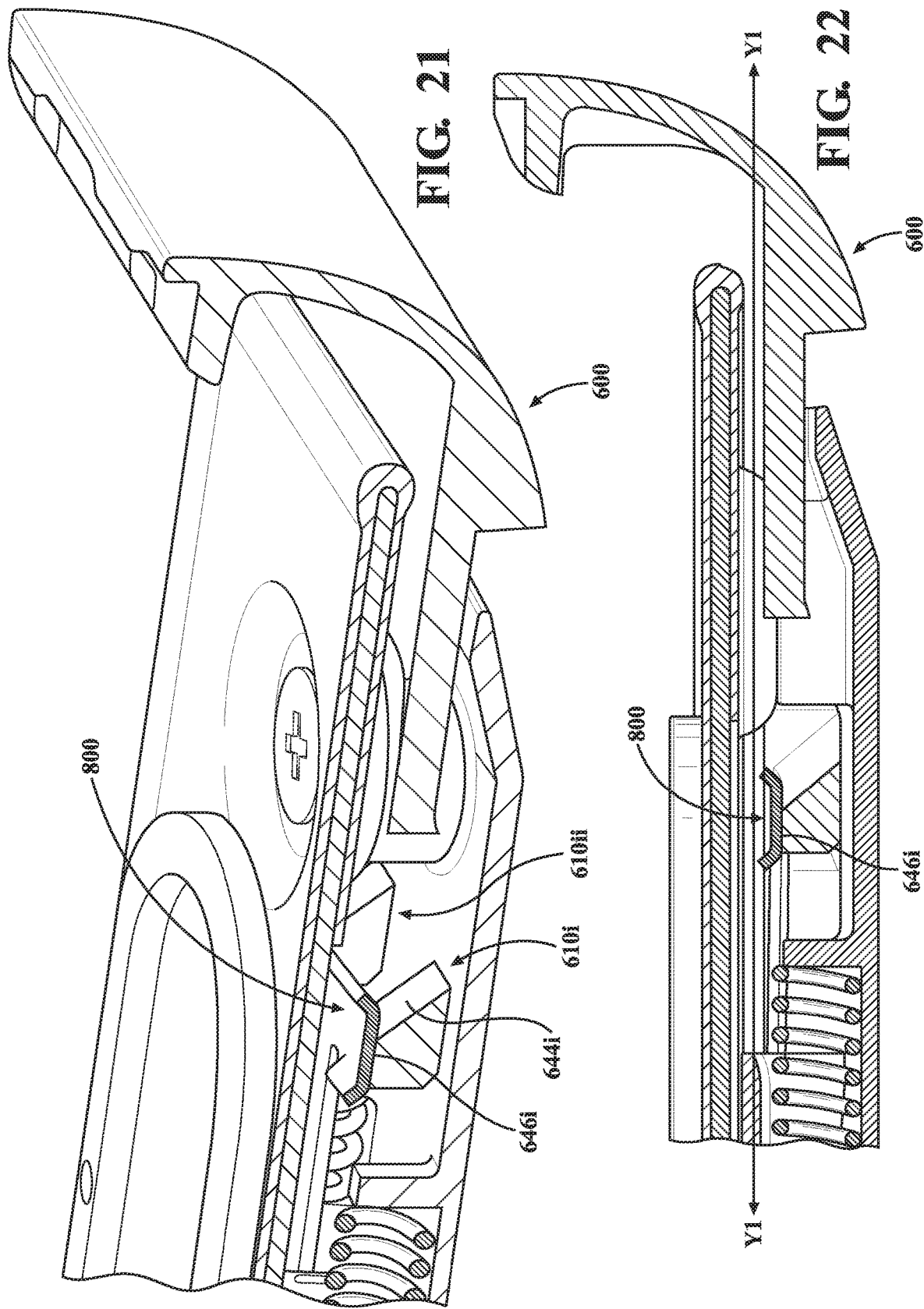

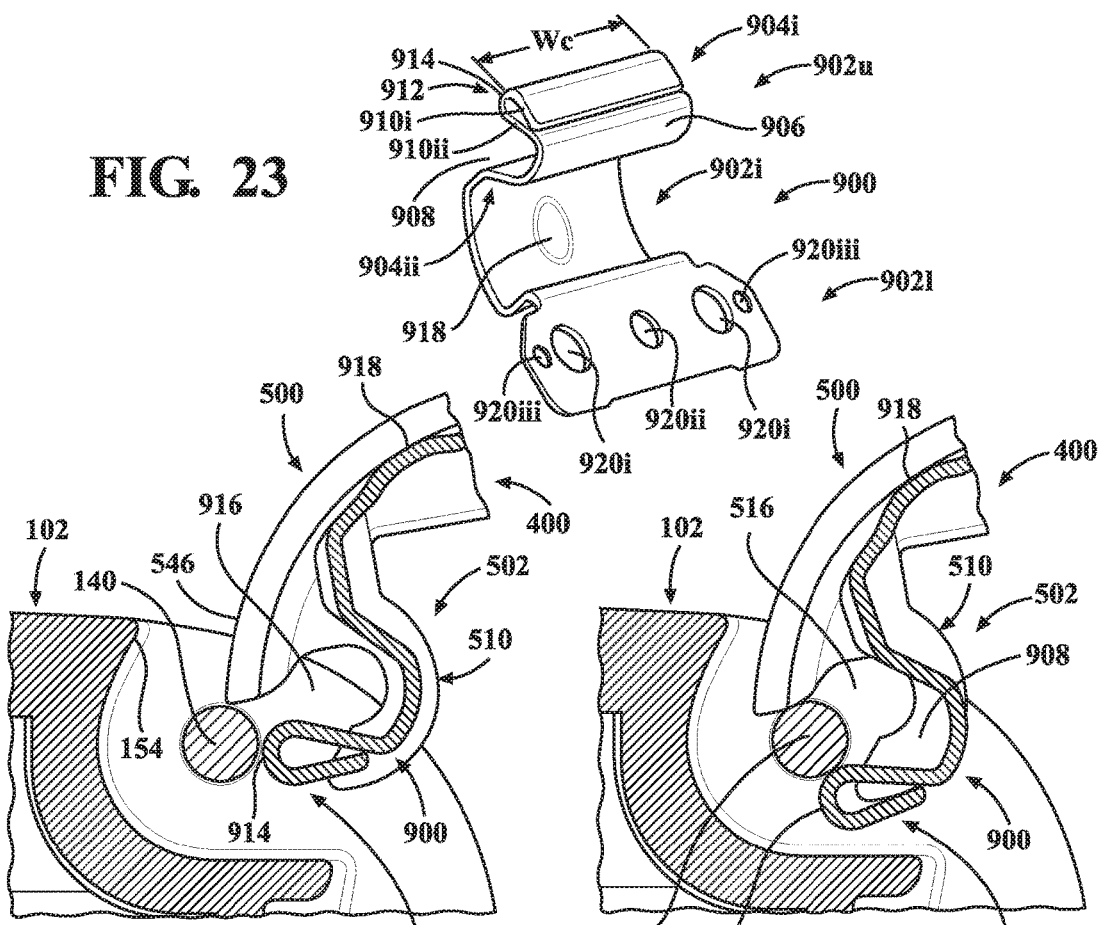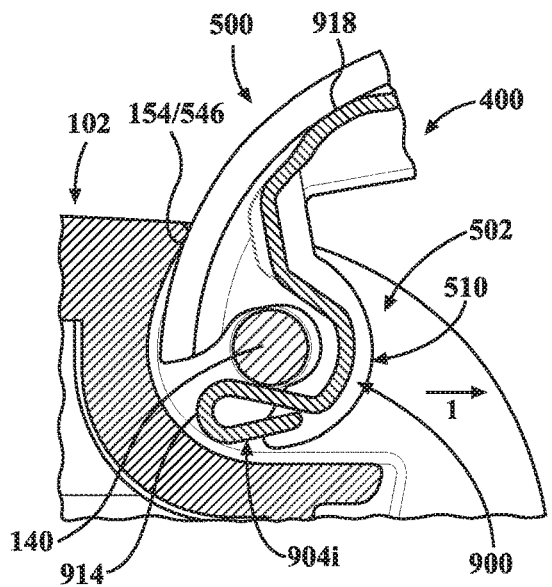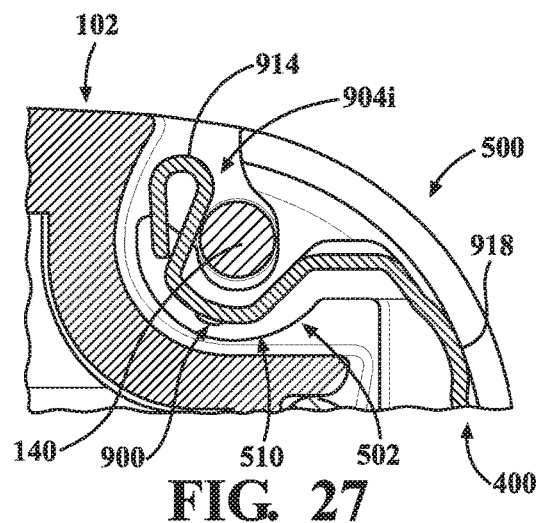

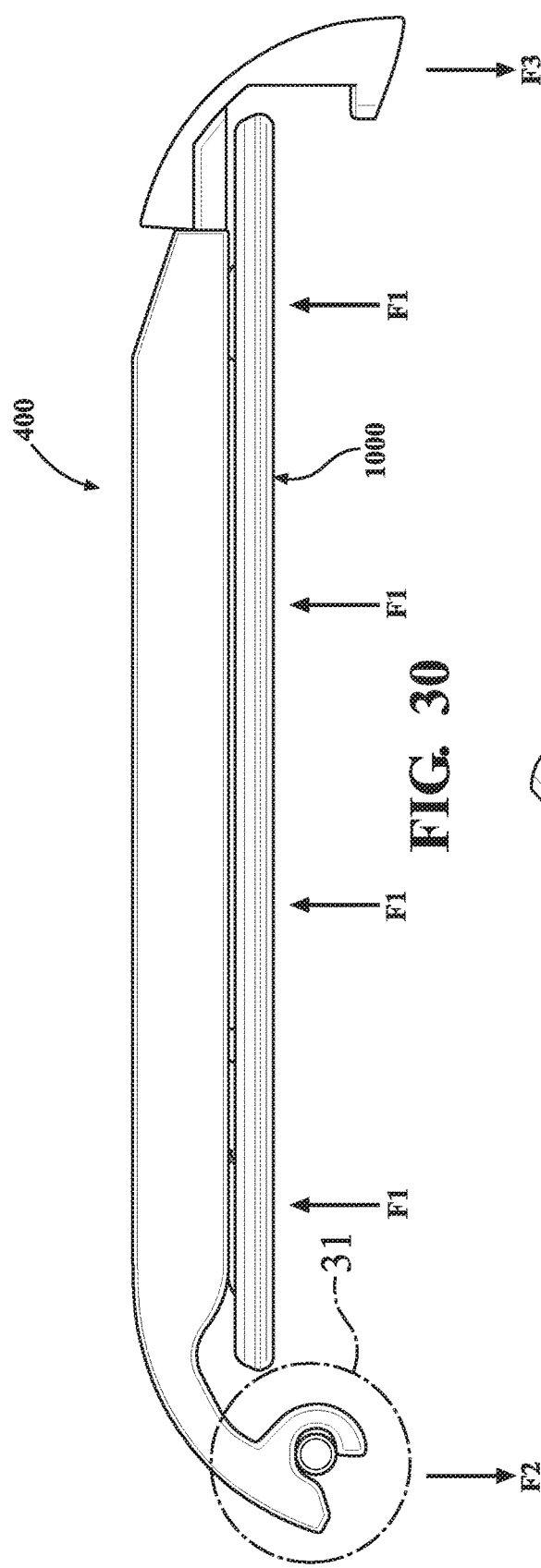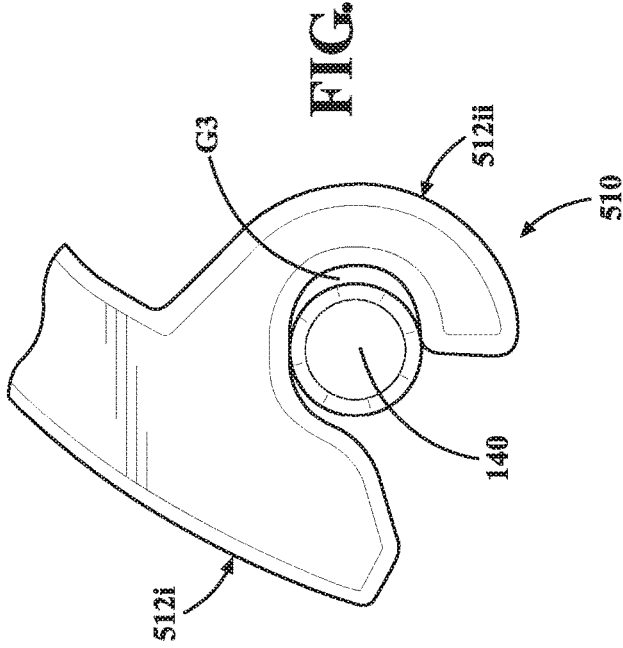

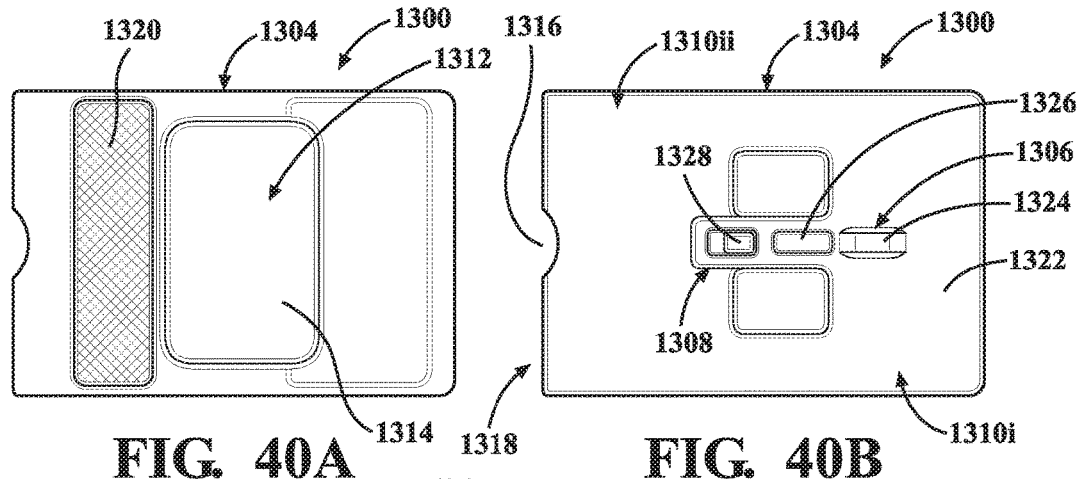
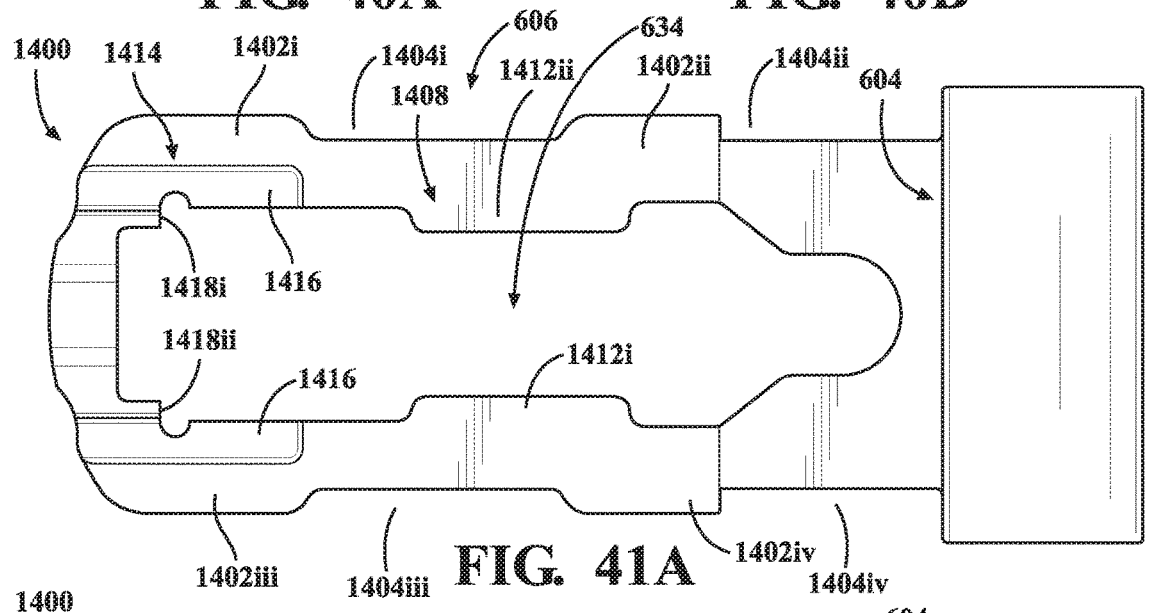
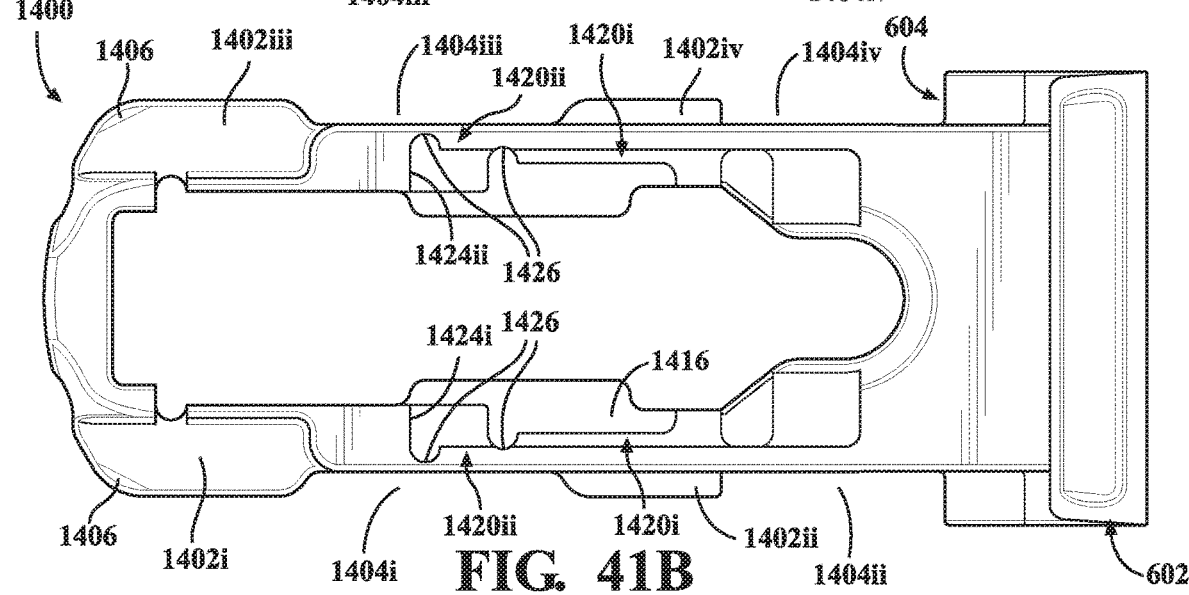

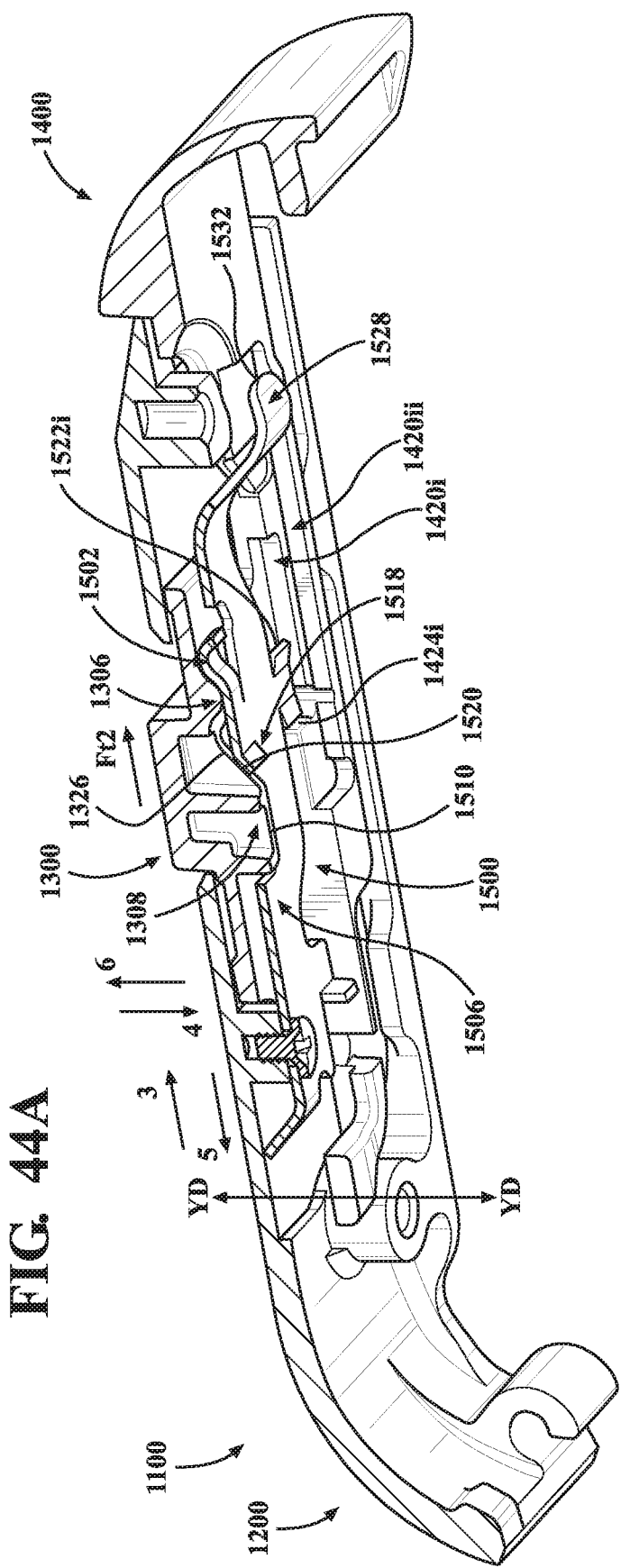

REMOVABLE BATTERY DOOR ASSEMBLIES FOR IMAGE CAPTURE DEVICES

CROSS-REFERENCE TO RELATED APPLICATIONS

This application is a 371 of International Application No. PCT/CN2020/099915, filed on Jul. 2, 2020, the entire contents of which are hereby incorporated by reference.

TECHNICAL FIELD

The present disclosure relates generally to image capture devices and, more specifically, to an image capture device including a removable door assembly that is repositionable between closed and open positions to conceal, protect, and expose interior components of the image capture device.

BACKGROUND

Image capture devices typically include a plurality of doors that are used to conceal various internal components, such as, for example, a power source for the image capture device (e.g., one or more batteries); one or more accessory ports; an I/O interface; USB-C connectors; etc. The inclusion of multiple doors, however, requires multiple seals (one for each door), and presents an elevated risk that water and/or debris may enter the image capture device. Additionally, in known image capture devices, the doors are often fixedly connected to (i.e., non-removable from) a body of the image capture device.

To address these concerns, the present disclosure describes image capture devices that include a single, removable door including an integrated seal.

SUMMARY

In one aspect of the present disclosure, an image capture device is disclosed that includes a body and a door assembly. The body of the image capture device includes a pivot member and defines a peripheral cavity, and the door assembly is configured to close and seal the peripheral cavity.

The door assembly includes a door body; a locking mechanism that is slidable in relation to the door body between a locked position and an unlocked position; at least one biasing member that is supported between the locking mechanism and the door body to bias the locking mechanism towards the locked position; and a spring clip that is secured to the door body and configured to engage (contact) the pivot member to secure the door assembly to the pivot member.

The door body includes an engagement structure that is configured to removably receive the pivot member such that the door body is connectable to and disconnectable from the body of the image capture device.

When the locking mechanism is in the locked position, the door assembly is rotationally fixed in relation to the body of the image capture device to maintain closure of the door assembly, and when the locking mechanism is in the unlocked position, the door assembly is rotatable in relation to the body of the image capture device to allow for opening of the door assembly.

The spring clip includes a resilient material and is configured for deflection during connection and disconnection of the door body to the pivot member to provide tactile indications of connection and disconnection.

In certain embodiments, the at least one biasing member may include a first end and a second end that is opposite to the first end.

In certain embodiments, the locking mechanism may define a cavity that is configured to receive the first end of the at least one biasing member.

In certain embodiments, the door body may include a seat that is configured to support the second end of the at least one biasing member such that the at least one biasing member extends in generally parallel relation to a length of the door assembly.

In certain embodiments, the at least one biasing member may include a first biasing member and a second biasing member that is spaced laterally from the first biasing member along a width of the door body.

In certain embodiments, the engagement structure and the spring clip may collectively define an expandable receiving space that is configured to receive the pivot member.

In certain embodiments, the spring clip may include an arm that defines an arcuate guide surface to guide the pivot member into and out of the expandable receiving space during connection and disconnection of the door body to the pivot member.

In certain embodiments, the arm may include overlapping segments to increase rigidity of the arm.

In certain embodiments, the image capture device may further include a spring plate that is supported by the door body.

In certain embodiments, the spring plate may be configured for engagement (contact) with the locking mechanism to resist movement of the locking mechanism from the locked position to the unlocked position and to facilitate movement of the locking mechanism from the unlocked position to the locked position.

In certain embodiments, the spring plate may be configured for movement between a normal position and a deflected position upon the application of a threshold force to the locking mechanism.

In certain embodiments, the door body may include at least one deflector that is configured for engagement (contact) with the spring plate.

In certain embodiments, the spring plate and the at least one deflector may define corresponding angled surfaces to facilitate movement of the spring plate between the normal position and the deflected position.

In another aspect of the present disclosure, an image capture device is disclosed that includes a device body and a door assembly that is configured for removable connection to the device body. The door assembly includes a door body; a locking mechanism that is slidable in relation to the door body between a locked position and an unlocked position; and at least one biasing member that is configured for engagement (contact) with the door body and the locking mechanism to automatically move the locking mechanism into the locked position upon closure of the door assembly.

When the locking mechanism is in the locked position, the door assembly is rotationally fixed in relation to the device body to maintain closure of the door assembly, and when the locking mechanism is in the unlocked position, the door assembly is rotatable in relation to the device body to allow for opening of the door assembly.

In certain embodiments, the device body may define a receptacle and the locking mechanism may include a locking member that is configured for removable insertion into the receptacle.

In certain embodiments, the locking member may be movable into the receptacle during movement of the locking mechanism into the locked position and movable out of the receptacle during movement of the locking mechanism into the unlocked position.

In certain embodiments, the device body and the door assembly may include corresponding bearing surfaces that are configured for engagement (contact) during closure of the door assembly to thereby slide the locking mechanism axially in relation to the door body to facilitate insertion of the locking member into the receptacle.

In certain embodiments, the locking mechanism may define a cavity that is configured to receive the at least one biasing member such that the at least one biasing member extends in generally parallel relation to a length of the door assembly.

In certain embodiments, the door body may define a seat that is configured to support the at least one biasing member such that the at least one biasing member is compressed between the locking mechanism and the door body.

In certain embodiments, the at least one biasing member may include a first biasing member and a second biasing member that is spaced laterally from the first biasing member along a width of the door body.

In certain embodiments, the locking mechanism may define a first cavity that is configured to receive the first biasing member and a second cavity that is configured to receive the second biasing member.

In certain embodiments, the door body may define a first seat that is configured to support the first biasing member and a second seat that is configured to support the second biasing member.

In another aspect of the present disclosure, a door assembly is disclosed for an image capture device. The door assembly includes: a door body that is configured for removable connection to (engagement with) the image capture device; a locking mechanism that is received by the door body such that the locking mechanism is axially displaceable along a length of the door assembly during movement between an unlocked position and a locked position; and at least one biasing member that is axially compressed between the door body and the locking mechanism such that the locking mechanism automatically moves into the locked position upon closure of the door assembly.

In certain embodiments, the door assembly may further include a spring clip that is secured to the door body and configured for engagement (contact) with a body of the image capture device to secure the door assembly to the body of the image capture device.

In certain embodiments, the spring clip may include a resilient material such that the spring clip is deflected during connection and disconnection of the door assembly to the body of the image capture device to provide tactile indications of connection and disconnection.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 5 is a partial, (longitudinal, vertical) cross-sectional view of the image capture device with the door assembly in the open position.

FIG. 6 is an (inner) plan view of the door assembly separated from the image capture device.

FIG. 12 is a front (outer), plan view of the door assembly with the locking mechanism shown in a locked position.

FIG. 13 is a partial, (transverse, horizontal) cross-sectional view of the image capture device and the door assembly with the locking mechanism shown in the locked position.

FIG. 14 is a front (outer), plan view of the door assembly with the locking mechanism shown in an unlocked position.

FIG. 15 is a partial, (transverse, horizontal) cross-sectional view of the image capture device and the door assembly with the locking mechanism shown in the unlocked position.

FIG. 21 is a partial, (longitudinal, vertical) cross-sectional view of the door assembly (shown in perspective) with the locking mechanism in the unlocked position and the spring plate in a deflected (second, biased) position.

FIG. 22 is a partial, (longitudinal, vertical) cross-sectional view of the door assembly with the locking mechanism shown in the locked position and the spring plate shown in the deflected position.

FIG. 23 is a perspective view of the spring clip.

FIG. 24 is a partial, (longitudinal, vertical) cross-sectional view of the image capture device and the door assembly shown prior to connection of the door assembly.

FIG. 25 is a partial, (longitudinal, vertical) cross-sectional view of the image capture device and the door assembly illustrating deflection of the spring clip during connection of the door assembly.

FIG. 26 is a partial, (longitudinal, vertical) cross-sectional view of the image capture device and the door assembly upon connection of the door assembly with the door assembly shown in the open position.

FIG. 27 is a partial, (longitudinal, vertical) cross-sectional view of the image capture device and the door assembly with the door assembly shown in the closed position.

FIG. 30 is side, plan view of the door assembly.

FIG. 31 is an enlargement of the area of detail identified in FIG. 30.

FIG. 40A is a top (outer), plan view of the slider.

FIG. 40B is a bottom (inner), plan view of the slider.

FIG. 41A is a top (outer), plan view of the locking mechanism.

FIG. 41B is a bottom (inner), plan view of the locking mechanism.

FIG. 44A is a (longitudinal, vertical) cross-sectional view of the door assembly (shown in perspective) with the slider shown in a first position and the retainer shown in an a undeflected (initial, normal) configuration.

DETAILED DESCRIPTION

Figure 1A:
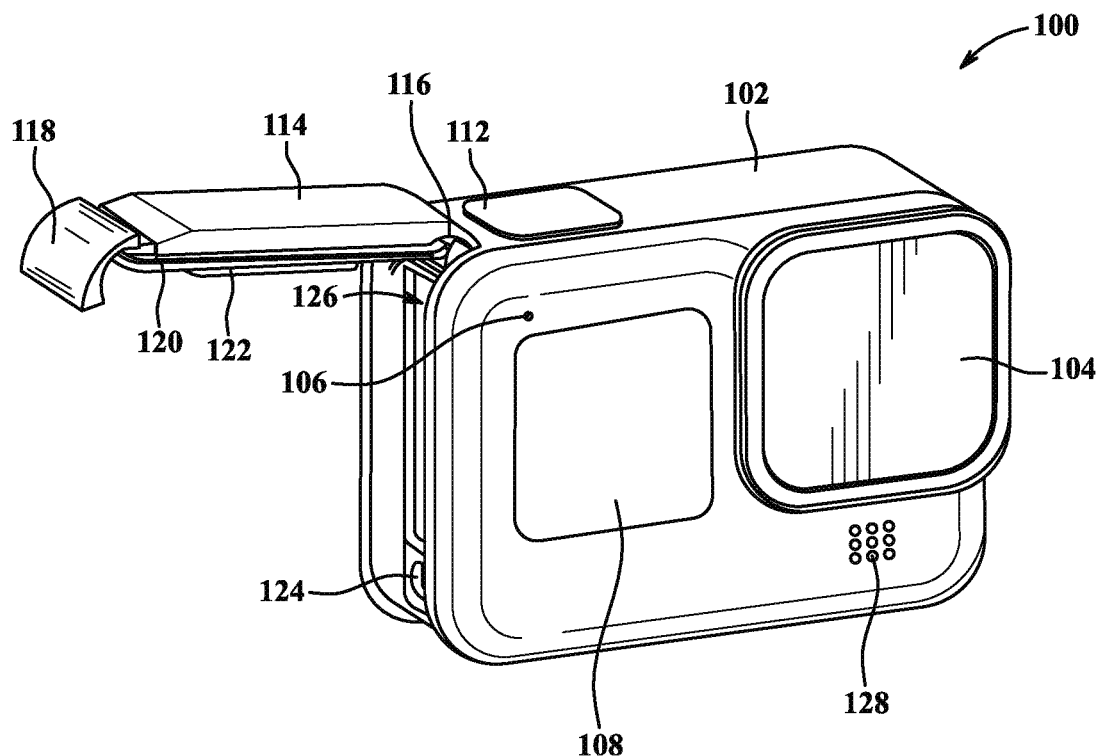
FIGS. 1A-B are isometric views of an example of an image capture device.

The present disclosure relates generally to image capture devices and describes various embodiments of door assemblies for use therewith. More specifically, the door assemblies described herein are configured for removable connection to an image capture device and are movable between open and closed positions to conceal and permit access to various internal components of the image capture device, including, for example, a power source (e.g., one or more batteries); one or more accessory ports; an I/O interface; USB-C connectors; etc. Each of the door assemblies described herein includes a door body; a seal that forms a watertight interface with a body of the image capture device upon closure of the door assembly to guard against (if not entirely prevent) the entry of debris and/or water; and a locking mechanism that is movable (e.g., slidable) between locked and unlocked positions. When the locking mechanism is in the locked position, the door assembly remains rotationally fixed relative to the body of the image capture device to maintain closure of the door assembly, and when the locking mechanism is in the unlocked position, the door assembly is rotatable relative to the body of the image capture device, which allows the door assembly to be opened.

In one aspect of the disclosure, the door assembly further includes one or more biasing members (e.g., coil springs) that are supported between the locking mechanism and the door body, and a spring clip that is secured to the door body.

The biasing member(s) bias the locking mechanism towards the locked position such that locking mechanism is automatically moved into the locked position upon closure of the door assembly, which reduces the likelihood of water entry that may otherwise exist (e.g., were positive user action required to lock the door assembly).

The spring clip is configured to engage (contact) a pivot member (e.g., a hinge pin) on the body of the image capture device so as to secure the door assembly to the pivot member. The spring clip inhibits (if not entirely prevents) partial connection of the door assembly to the pivot member, thereby improving operability through the facilitation of more consistent, reliable connection to reduce (if not entirely eliminate) any likelihood of water intrusion that may otherwise occur in the event of partial connection of the door assembly. The spring clip includes (e.g., is formed partially or entirely from) a resilient material that allows for deflection during connection and disconnection of the door body to the pivot member. Deflection of the spring clip provides the user with tactile feedback that serves as an indicator of positive (successful) connection and disconnection of the door assembly.

The door assembly may also include an (optional) spring plate that engages (contacts) the locking mechanism to resist movement of the locking mechanism from the locked position to the unlocked position and facilitate movement of the locking mechanism from the unlocked position to the locked position. The resistance provided by the spring plate inhibits (if not entirely prevents) accidental or unwanted unlocking of the door assembly (e.g., in the event that the image capture device is dropped) and assists with shock and vibration absorption. The spring plate is supported by the door body and includes (e.g., is formed partially or entirely from) a resilient material such that the spring plate is reconfigurable between a normal position and a deflected as the locking mechanism moves between the locked position and the unlocked position, respectively. Upon movement of the locking mechanism into the unlocked position, the resistance provided by the spring plate is eliminated, which provides the user with tactile feedback that serves as an indicator of positive (successful) unlocking of the door assembly.

In another aspect of the disclosure, in addition to the door body, the seal, and the locking mechanism, the door assembly includes a slider (e.g., a button) that is repositionable between first and second positions and a retainer that is configured for engagement (contact) with the locking mechanism to maintain the locked position thereof and, thus, inhibit (if not entirely prevent) accidental or unwanted unlocking of the door assembly. As the slider moves from the first position into the second position, the slider causes deflection of the retainer (e.g., movement from a normal configuration into a deflected configuration) such that the retainer is moved out of engagement (contact) with the locking mechanism, thereby allowing for axial movement of the locking mechanism and, thus, unlocking of the door assembly.

Figure 1B:
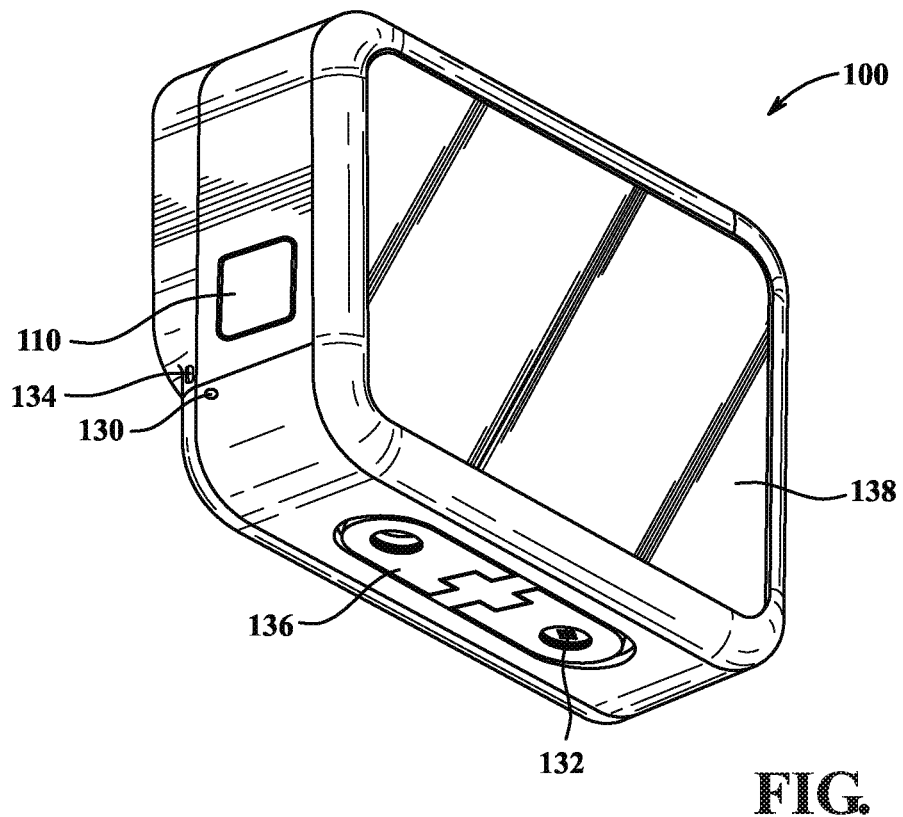

FIGS. 1A-B are isometric views of an example of an image capture device 100. The image capture device 100 may include a body 102 (also referred to herein as a device body), a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback.

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a locking (latch) mechanism 118 that releasably engages (contacts) the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages (contacts) a flange (not shown) or other interface to provide an environmental seal, and the battery interface 122 engages (contacts) the battery to secure the battery in the battery receptacle 126. The door 114 can also have a removed position (not shown) where the entire door 114 is separated from the image capture device 100, that is, where both the hinge mechanism 116 and the locking mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front (forward) face, a left face, a right face, a back (rear) face, an upper (top) face, and a lower (bottom) face) that form a rectangular cuboid. Furthermore, both the front and rear faces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the Internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
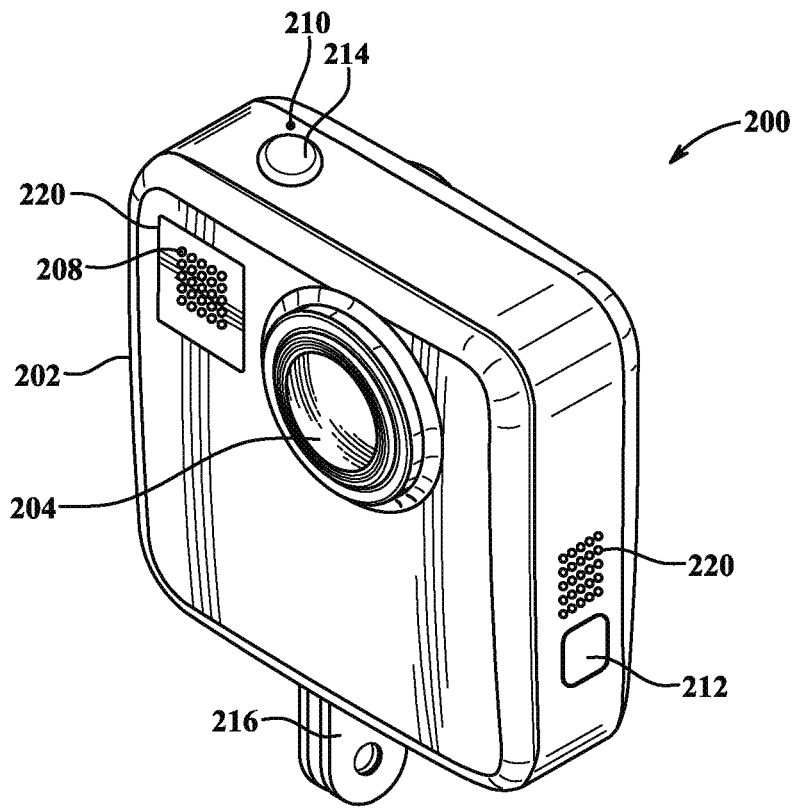
FIGS. 2A-B are isometric views of another example of an image capture device.
Figure 2B:
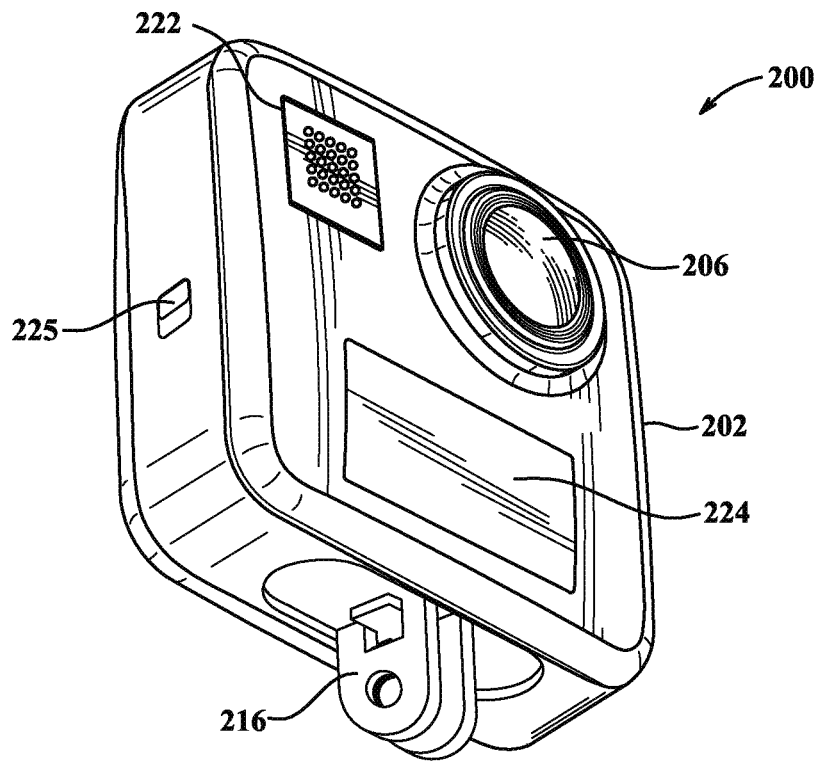

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

FIG. 2C is a top view of the image capture device 200 of FIGS. 2A-B and FIG. 2D is a partial cross-sectional view of the image capture device 200 of FIG. 2C. The image capture device 200 is configured to capture spherical images, and accordingly, includes a first image capture device 226 and a second image capture device 228. The first image capture device 226 defines a first field-of-view 230 and includes the lens 204 that receives and directs light onto a first image sensor 232. Similarly, the second image capture device 228 defines a second field-of-view 234 and includes the lens 206 that receives and directs light onto a second image sensor 236. To facilitate the capture of spherical images, the image capture devices 226 and 228 (and related components) may be arranged in a back-to-back (Janus) configuration such that the lenses 204, 206 face in generally opposite directions.

The fields-of-view 230, 234 of the lenses 204, 206 are shown above and below boundaries 238, 240 indicated in dotted line. Behind the first lens 204, the first image sensor 232 may capture a first hyper-hemispherical image plane from light entering the first lens 204, and behind the second lens 206, the second image sensor 236 may capture a second hyper-hemispherical image plane from light entering the second lens 206.

One or more areas, such as blind spots 242, 244 may be outside of the fields-of-view 230, 234 of the lenses 204, 206 so as to define a "dead zone." In the dead zone, light may be obscured from the lenses 204, 206 and the corresponding image sensors 232, 236, and content in the blind spots 242, 244 may be omitted from capture. In some implementations, the image capture devices 226, 228 may be configured to minimize the blind spots 242, 244.

The fields-of-view 230, 234 may overlap. Stitch points 246, 248 proximal to the image capture device 200, that is, locations at which the fields-of-view 230, 234 overlap, may be referred to herein as overlap points or stitch points. Content captured by the respective lenses 204, 206 that is distal to the stitch points 246, 248 may overlap.

Images contemporaneously captured by the respective image sensors 232, 236 may be combined to form a combined image. Generating a combined image may include correlating the overlapping regions captured by the respective image sensors 232, 236, aligning the captured fields-of-view 230, 234, and stitching the images together to form a cohesive combined image.

A slight change in the alignment, such as position and/or tilt, of the lenses 204, 206, the image sensors 232, 236, or both, may change the relative positions of their respective fields-of-view 230, 234 and the locations of the stitch points 246, 248. A change in alignment may affect the size of the blind spots 242, 244, which may include changing the size of the blind spots 242, 244 unequally.

Incomplete or inaccurate information indicating the alignment of the image capture devices 226, 228, such as the locations of the stitch points 246, 248, may decrease the accuracy, efficiency, or both of generating a combined image. In some implementations, the image capture device 200 may maintain information indicating the location and orientation of the lenses 204, 206 and the image sensors 232, 236 such that the fields-of-view 230, 234, the stitch points 246, 248, or both may be accurately determined; the maintained information may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back lens configuration. Reducing the lateral distance between the lenses 204, 206 may improve the overlap in the fields-of-view 230, 234. In another embodiment (not shown), the lenses 204, 206 may be aligned along a common imaging axis.

Images or frames captured by the image capture devices 226, 228 may be combined, merged, or stitched together to produce a combined image, such as a spherical or panoramic image, which may be an equirectangular planar image. In some implementations, generating a combined image may include use of techniques including noise reduction, tone mapping, white balancing, or other image correction. In some implementations, pixels along the stitch boundary may be matched accurately to minimize boundary discontinuities.

Figure 3:
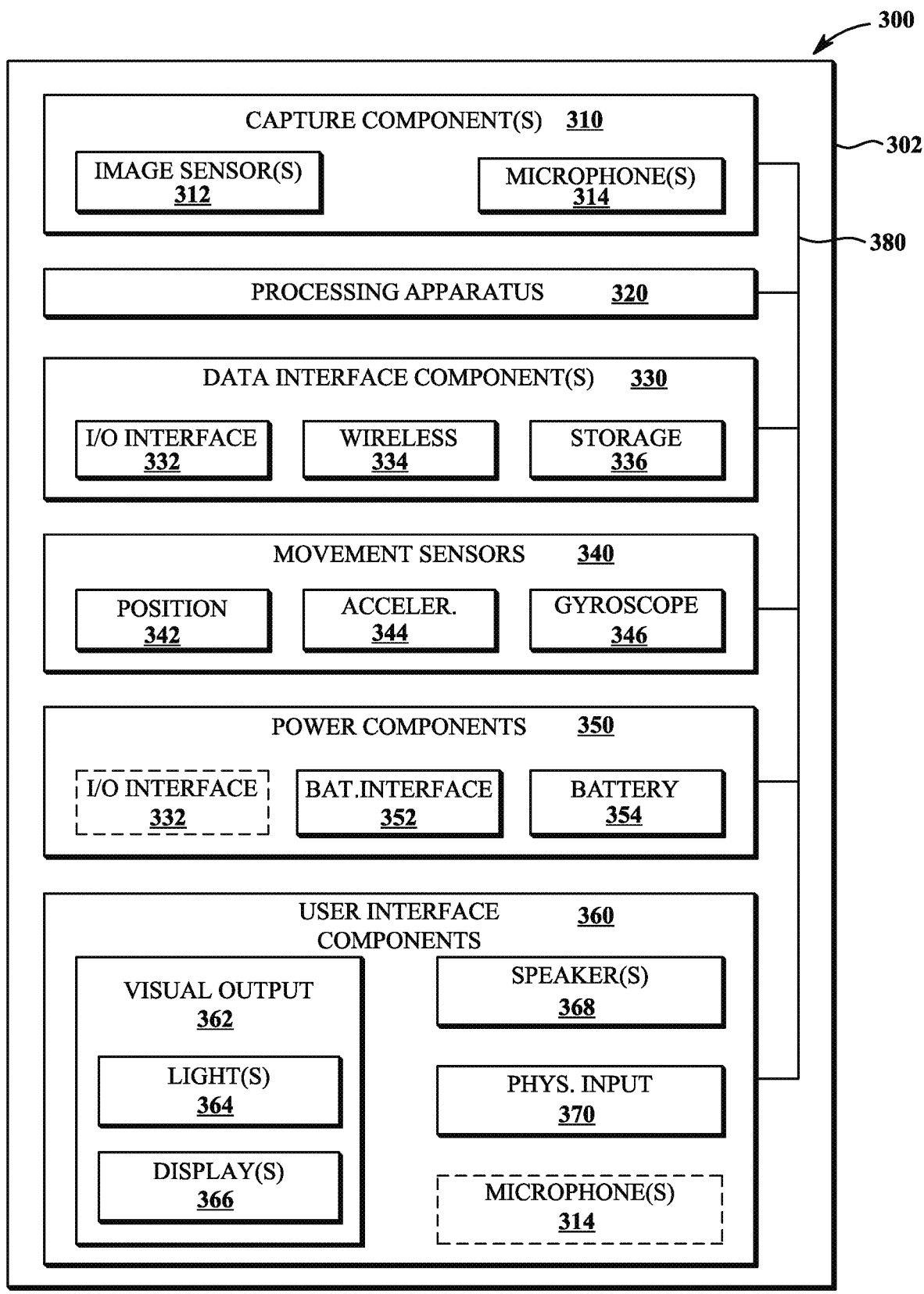
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-D.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4A:
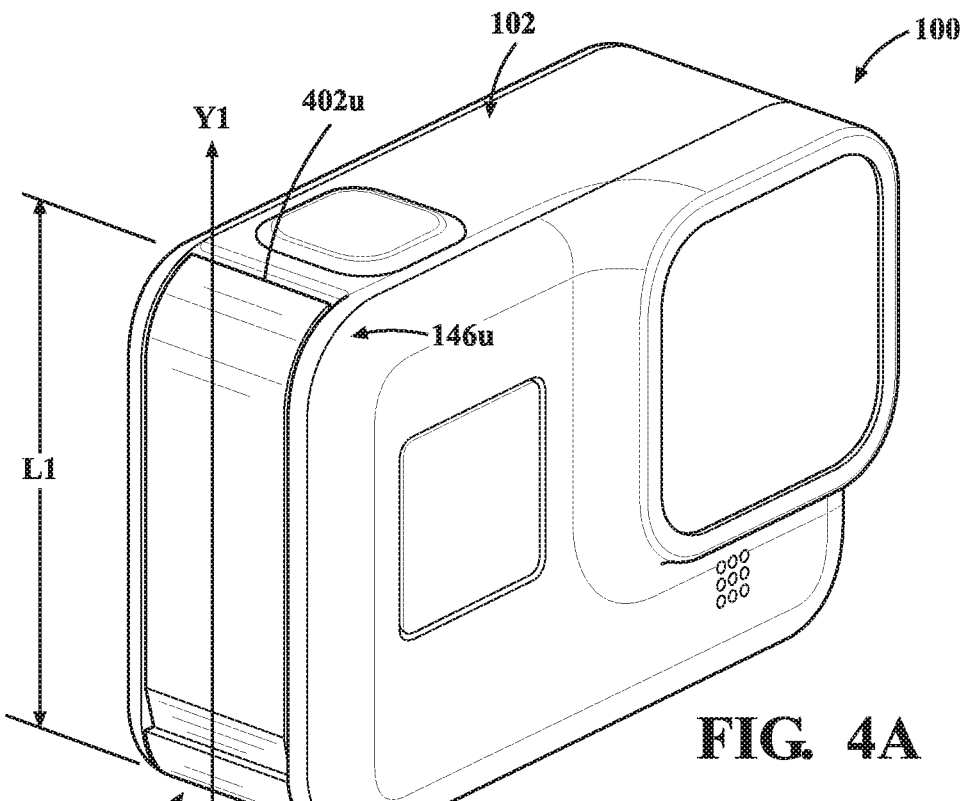
FIG. 4A is a perspective view of the image capture device seen in FIGS. 1A, 1B including a door assembly according to one aspect of the present disclosure shown in a closed position.
Figure 4B:
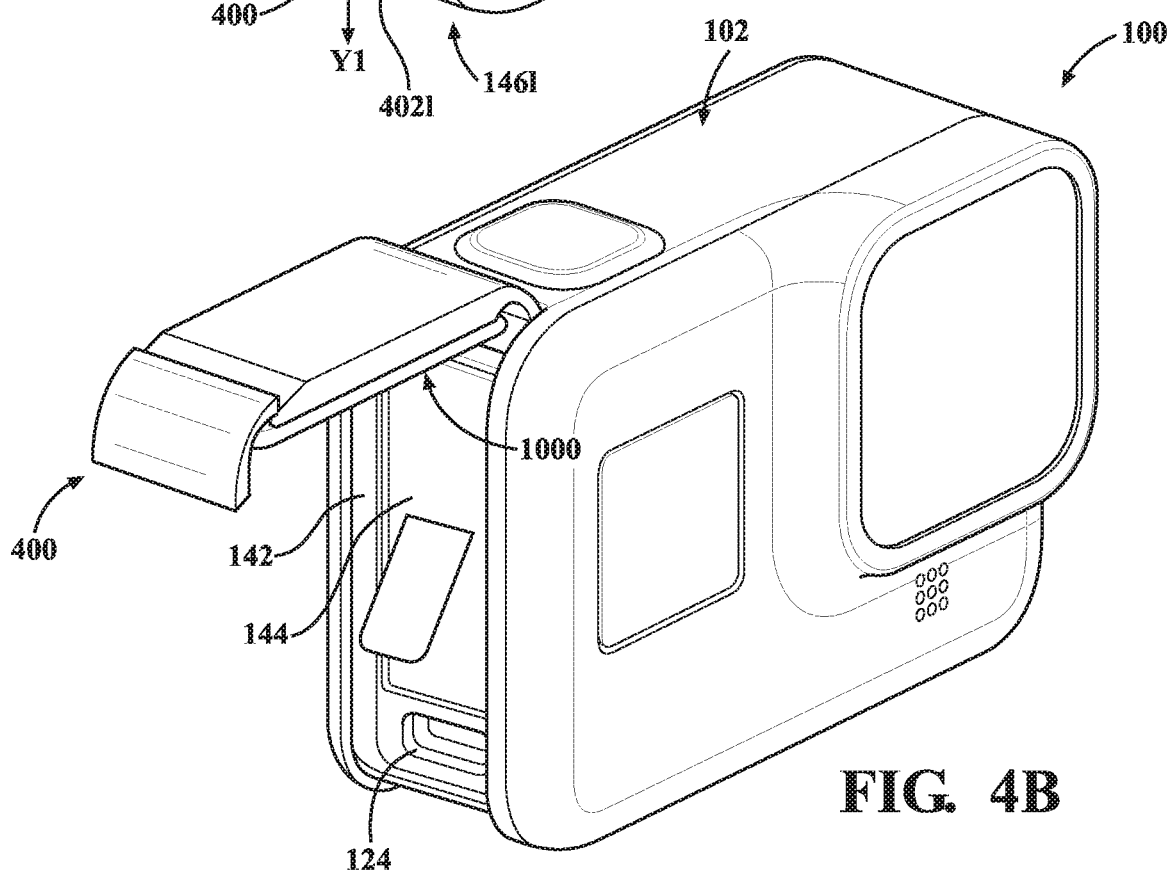
FIG. 4B is a perspective view of the image capture device with the door assembly seen in FIG. 4A shown in an open position.

Referring now to FIGS. 4A, 4B, and 5, a door assembly 400 will be discussed, which represents an alternate embodiment of the aforedescribed door 114 (FIG. 1A). More specifically, FIG. 4A provides a perspective view of the image capture device 100 with the door assembly 400 shown in a closed position; FIG. 4B provides a perspective view of the image capture device 100 with the door assembly 400 shown in an open position; and FIG. 5 provides a partial (longitudinal, vertical) cross-sectional view of the image capture device 100 with the door assembly 400 shown in the open position. Although generally discussed in connection with the image capture device 100 hereinbelow, it should be appreciated that the door assembly 400 may be configured for use with any image capture device, such as the various embodiments described herein (e.g., the aforedescribed image capture device 200 (FIGS. 2A, 2B)).

The door assembly 400 defines a longitudinal axis Y1 and an overall length L1 and is pivotably (e.g., rotatably) and removably engageable with (connectable to) the body 102 of the image capture device 100. More specifically, the door assembly 400 configured for releasable engagement with (connection to) a pivot member 140 (FIG. 5) component of the hinge mechanism 116 (FIG. 1A) such that the door assembly 400 is movable (repositionable) between the closed position (FIG. 4A) and the open position (FIGS. 4B, 5) to reveal and conceal a peripheral cavity 142 defined by the body 102 of the image capture device 100. As seen in FIG. 4B, for example, the peripheral cavity 142 may include, accommodate, or otherwise provide access to one or more components of the image capture device 100, including, for example, the battery receptacle 126 (FIG. 1A) and the battery 144; the I/O interface 124; an accessory port; a USB-C connector; etc.

The door assembly 400 completes the exterior of the image capture device 100 and extends along a side of the image capture device 100 between opposite (upper, top and lower, bottom) corner sections 146u, 146l of the image capture device 100. More specifically, the door assembly 400 includes an upper (first) end 402u that is pivotably connected to the body 102 at (or adjacent to) the corner section 146u such that the upper end 402u is positioned proximate (e.g., adjacent) to the upper face of the image capture device 100 and a lower (second) end 402l that is positioned at (or adjacent to) the corner section 146l (when the door assembly 400 is in the closed position) such that the lower end 402l is positioned proximate (e.g., adjacent) to the lower face of the image capture device 100.

Figure 7:
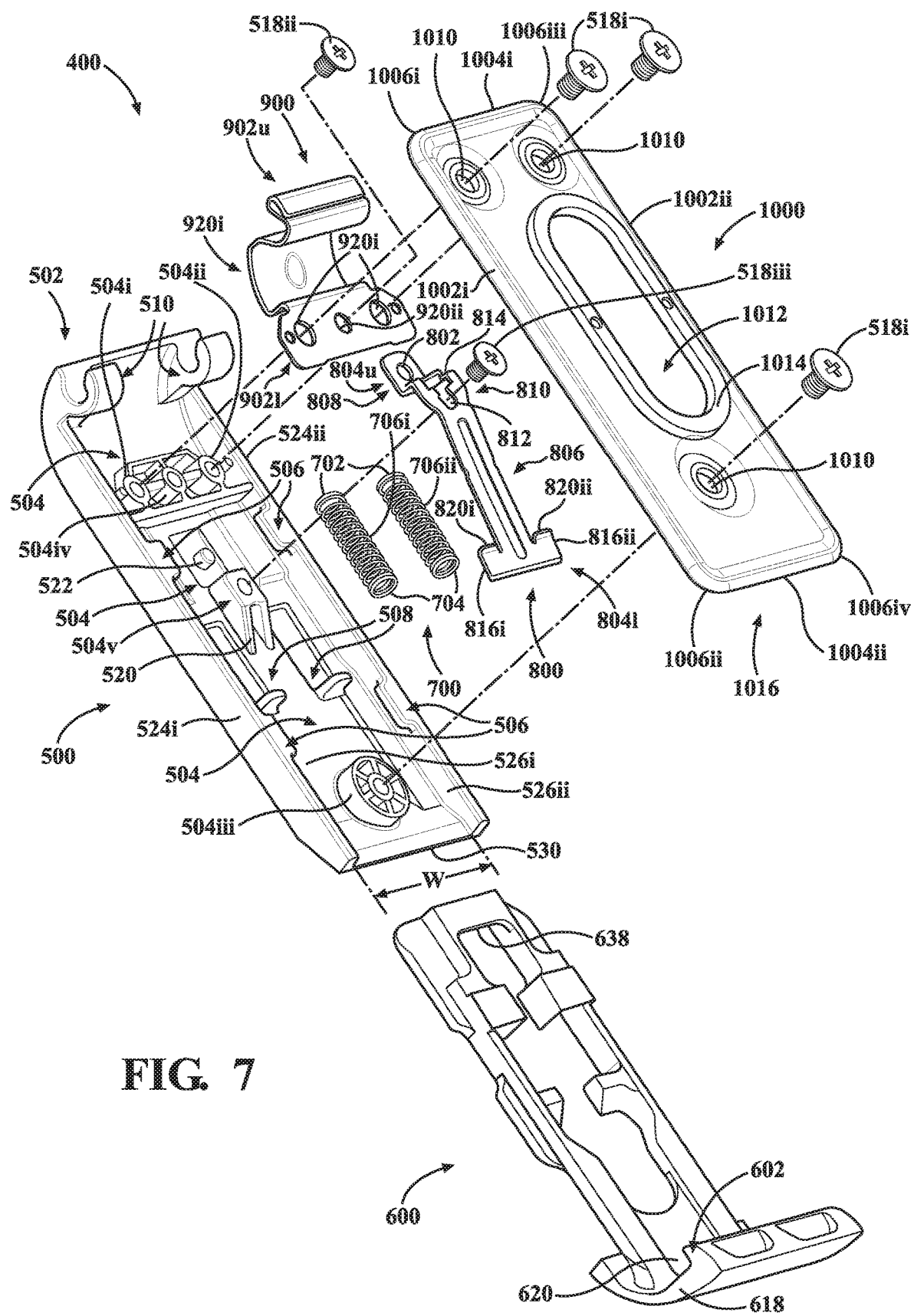
FIG. 7 is a perspective view of the door assembly with parts separated illustrating a door body; a locking mechanism; one or more biasing members; an (optional) spring plate; a spring clip; and a seal.
Figure 8:
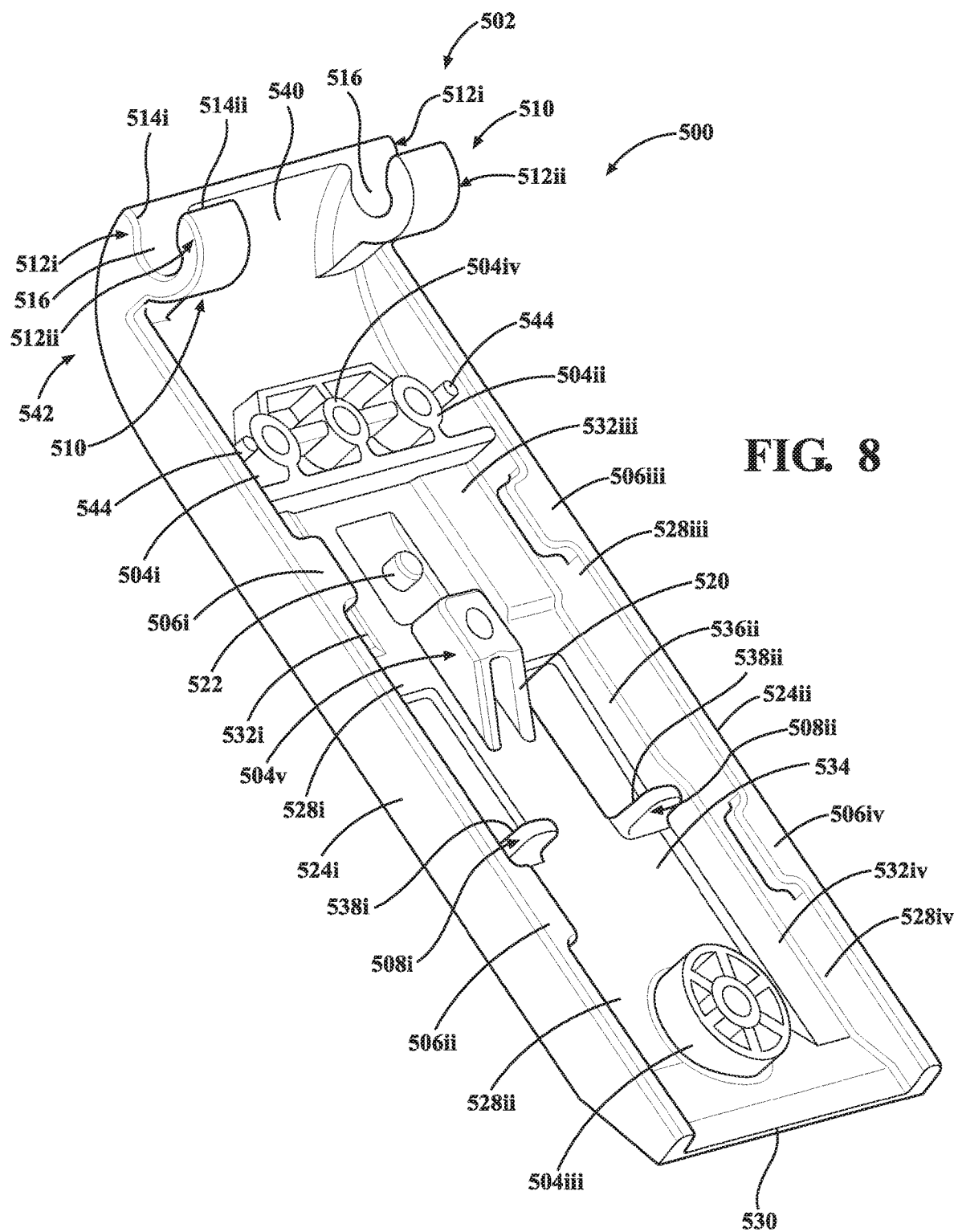
FIG. 8 is an (inner) perspective view of the door body.
Figure 9:
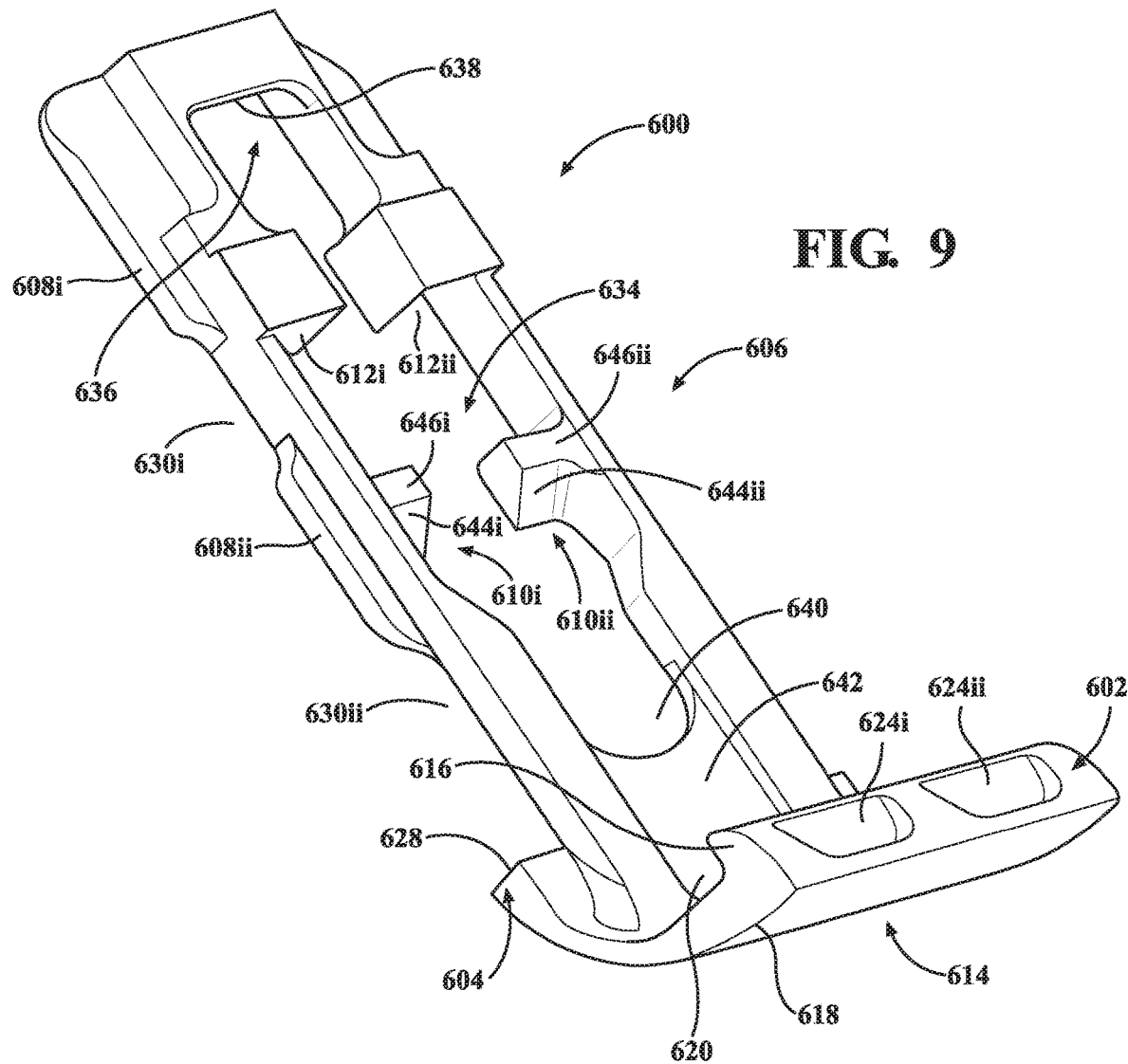
FIG. 9 is an (inner) perspective view of the locking mechanism.
Figure 10:
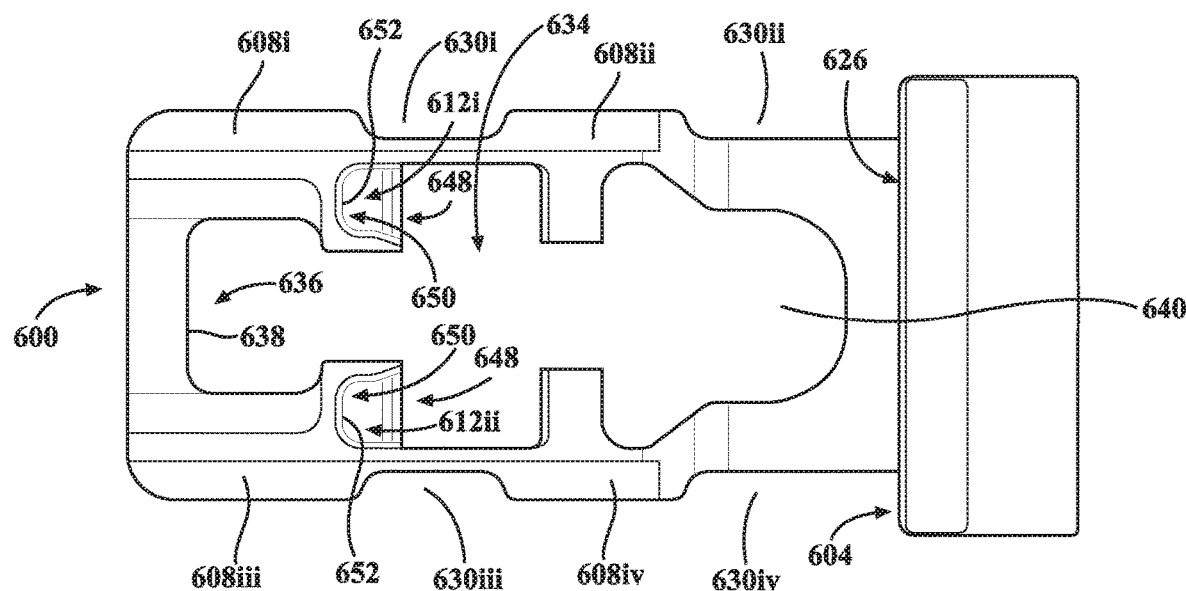
FIG. 10 is a top (outer), plan view of locking mechanism.
Figure 11:
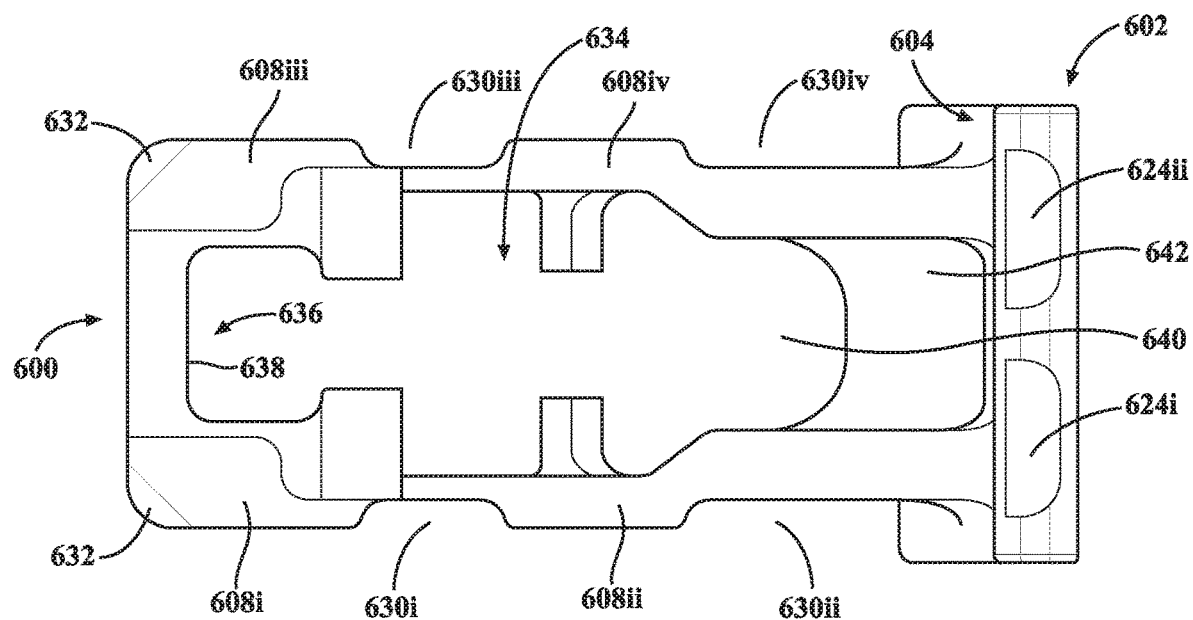
FIG. 11 is a bottom (inner), plan view of the locking mechanism.

With reference now to FIGS. 6-11 as well, the door assembly 400 includes a door body 500; a locking mechanism 600 (which is an alternate embodiment of the aforementioned locking mechanism 118 (FIG. 1A)); one or more biasing members 700; a spring plate 800; a spring clip 900; and a seal 1000. More specifically, FIG. 6 provides an (inner) plan view of the door assembly 400 shown separated from the image capture device 100; FIG. 7 provides a perspective view of the door assembly 400 with parts separated; FIG. 8 provides an (inner) perspective view of the door body 500; FIG. 9 provides an (inner) perspective view of the locking mechanism 600; FIG. 10 provides a top (outer), plan view of locking mechanism 600; and FIG. 11 provides a bottom (inner), plan view of the locking mechanism 600.

The door body 500 may include any suitable material or combination of materials and may be formed through any suitable method of manufacture. In the particular embodiment shown throughout the figures, the door body 500 includes a metallic material (e.g., stainless steel, aluminum, etc.) and is formed via injection molding. As discussed in detail below, the door body 500 includes an engagement structure 502; a plurality of bosses 504 that facilitate connection of the spring plate 800, the spring clip 900, and the seal 1000 to the door body 500; flanges 506 that support the locking mechanism 600; and one or more seats 508 that are configured to support the biasing member(s) 700.

The engagement structure 502 of the door body 500 is configured to facilitate connection of the door assembly 400 to the body 102 of the image capture device 100 (via the pivot member 140 (FIG. 5)) and includes a pair of clasps 510. Although shown as being integrally formed with the door body 500 in the illustrated embodiment, it should be appreciated that the engagement structure 502 may be formed as a separate, discrete component that is secured to the door body 500 (e.g., via adhesive, welding, etc.) without departing from the scope of the present disclosure.

The clasps 510 are configured for removable engagement (contact) with the pivot member 140 (FIG. 5) to axially (vertically) fix the door body 500 in relation to the housing 102 of the image capture device 100 while allowing the door assembly 400 to pivot (rotate) in relation to the body 102 during opening and closure. More specifically, the door assembly 400 is rotatable about an axis of rotation that extends through the pivot member 140 and, thus, through the clasps 510.

The clasps 510 are identical in configuration and, as such, throughout the following description, reference may be made to a single clasp 510 only in the interest of conciseness. Each clasp 510 is generally C-shaped in configuration, and includes arms 512i, 512ii (FIG. 8) defining ends 514i, 514ii, respectively. The arms 512i, 512ii define a channel 516 that is configured to receive the pivot member 140 (FIG. 5) so as to support rotation of the clasps 510 about the pivot member 140 during opening and closure of the door assembly 400. The channel 516 is generally ovate in configuration (as opposed to circular, for example), which facilitates force balancing during closure of the door assembly 400 and proper alignment and positioning of the seal 1000 to enhance waterproofing of the peripheral cavity 142, as descried in further detail below.

The plurality of bosses 504 includes a (first) boss 504i; a (second) boss 504ii; a (third) boss 504iii; a (fourth) boss 504iv; and a (fifth) boss 504v, each of which is configured to receive a corresponding fastener 518 (e.g., a screw, pin, rivet, etc.). More specifically, the bosses 504i, 504ii, 504iii are configured to receive fasteners 518i such that the fasteners 518i extend through the seal 1000 to fixedly connected the seal 1000 to the door body 500, the boss 504iv is configured to receive a fastener 518ii such that the fastener 518ii extends through the spring clip 900 to fixedly connect (secure) the spring clip 900 to the door body 500, and the boss 504v is configured to receive a fastener 518iii such that the fastener 518iii extends through the spring plate 800 to fixedly connect the spring plate 800 to the door body 500. Whereas the bosses 504i, 504ii, 504iii, 504iv are each generally cylindrical in configuration, the boss 504v defines an inclined surface 520 (FIG. 8) that is configured to support the spring plate 800 at an angle in relation to the longitudinal axis Y1 (FIG. 4A) of the door assembly 400 (and in relation to the locking mechanism 600) in the manner described hereinbelow. To further secure the spring plate 800 to the door body 500, the door body 500 includes a post 522 that is configured for receipt within a corresponding aperture 802 defined by the spring plate 800.

The flanges 506 extend inwardly from outer walls 524i, 524ii of the door body 500 so as to define channels 526i, 526ii that are configured to receive the locking mechanism 600. More specifically, in the illustrated embodiment, the door body 500 includes a pair of flanges 506i, 506ii that extend inwardly from the outer wall 524*i* and a pair of flanges 506*iii*, 506*iv* that extend inwardly from the outer wall 524*ii*. It should be appreciated, however, that the number of flanges 506 may be varied in alternate embodiments without departing from the scope of the present disclosure. As seen in FIG. 8, the flanges 506*i*, 506*ii* are spaced axially from each other (along the longitudinal axis Y1 (FIG. 4A) of the door assembly 400) so as to define a (first) slot 528*i* therebetween and the flange 506*ii* is spaced axially from a lower end surface 530 of the door body 500 so as to define a (second) slot 528*ii* therebetween. Similarly, the flanges 506*iii*, 506*iv* are spaced axially from each other (along the longitudinal axis Y1 (FIG. 4A) of the door assembly 400) so as to define a (third) slot 528*iii* therebetween and the flange 506*iv* is spaced axially from the lower end surface 530 of the door body 500 so as to define a (fourth) slot 528*iv* therebetween.

In certain embodiments, such as that shown throughout the figures, the door body 500 may further include a plurality of supports 532 (FIG. 8) that extend inwardly from an inner surface 534 of the door body 500 (i.e., towards the seal 1000). More specifically, in the illustrated embodiment, the door body 500 includes four supports 532*i*-532*iv* that are positioned in general registration (alignment) with the flanges 506*i*-506*iv*, respectively, such that the channels 526 extend between the flanges 506 and the supports 532. As seen in FIG. 8, for example, the supports 532*i*, 532*ii* are spaced axially from each other (along the longitudinal axis Y1 (FIG. 4A) of the door assembly 400), as are the supports 532*iii*, 532*iv*, so as to define recesses 536*i*, 536*ii* that are configured to accommodate the spring plate 800, which allows for a reduction in the overall profile of the door assembly 400.

Although generally illustrated as blocks throughout the figures, it should be appreciated that the particular configuration and/or number of supports 532 included on the door body 500 may be varied in alternate embodiments without departing from the scope of the present disclosure, as discussed above in connection with the flanges 506. For example, embodiments in which supports 532 are configured as detents (or other such projections) would also be within the scope of the present disclosure, as would embodiments in which the door body 500 includes a pair of supports 532 that are positioned on opposite sides of the door body 500.

The seat(s) 508 extend inwardly from the inner surface 534 of the door body 500 (i.e., towards the seal 1000) so as to define platforms 538 that are configured to support the biasing member(s) 700. Although shown as including a pair of seats 508 (e.g., respective first and second seats 508*i*, 508*ii*) that are formed integrally with the door body 500, it should be appreciated that the particular number of seats 508 may be varied in alternate embodiments without departing from the scope of the present disclosure (e.g., depending upon the particular number of biasing members 700 included in the door assembly 400).

The locking mechanism 600 may include any suitable material or combination of materials and may be formed through any suitable method of manufacture (e.g., machining, casting, injection molding, etc.). In the particular embodiment shown throughout the figures, for example, the locking mechanism 600 includes a metallic material (e.g., stainless steel, aluminum, etc.) and is formed via CNC machining. As discussed in detail below, the locking mechanism 600 includes a locking member 602; a tactile member 604; a body portion 606 including rails 608; one or more deflectors 610; and one or more cavities 612. Referring to FIGS. 12-15 as well, the locking mechanism 600 is slidably movable (displaceable) in an axial (vertical) manner between locked and unlocked (first and second) positions along an axis of movement YL1 (FIGS. 12-15) that extends in generally parallel relation to the longitudinal axis Y1 (FIG. 4A) of the door assembly 400. More specifically, FIG. 12 provides a front (outer), plan view of the door assembly 400 with the locking mechanism 600 shown in the locked position; FIG. 13 provides a partial, (transverse, horizontal) cross-sectional view of the image capture device 100 and the door assembly 400 with the locking mechanism 600 shown in the locked position; FIG. 14 provides a front (outer), plan view of the door assembly 400 with the locking mechanism 600 shown in the unlocked position; and FIG. 15 provides a partial, (transverse, horizontal) cross-sectional view of the image capture device 100 and the door assembly 400 with the locking mechanism 600 shown in the unlocked position.

In the locked position, the locking mechanism 600 engages (contacts) the housing 102 of the image capture device 100 to rotationally fix the door assembly 400 in relation to the housing 102 and, thus, maintain the door assembly 400 in the closed position. By contrast, in the unlocked position, the locking mechanism 600 is disengaged from (moved out of contact with) the housing 102 of the image capture device 100 to permit rotation of the door assembly 400 in relation to the housing 102 and, thus, movement of the door assembly 400 into the open position.

The locking member 602 is positioned at a lower end 614 of the locking mechanism 600 (i.e., at the end of the locking mechanism 600 opposite to the pivot member 140), and is configured for insertion into, and removal from, a corresponding receptacle 148 in the housing 102 of the image capture device 100 such that the locking member 602 is engageable (connectable) with and disengageable (disconnectable) from the housing 102 during movement (sliding) of the locking mechanism 600 between the unlocked and locked positions. More specifically, in the illustrated embodiment, the locking member 602 is configured as a tooth 616 that is configured for insertion into and removal from an opening 150 (e.g., a channel or other such surface irregularity) defined by the housing 102. It should be appreciated, however, that the particular configuration of the locking member 602 and the receptacle 148 may be varied in alternate embodiments without departing from the scope of the present disclosure.

The locking member 602 extends upwardly (vertically) from an end wall 618 of the locking mechanism 600 in the direction of movement of the locking mechanism 600 in transitioning from the unlocked position to the locked position so as to define a groove 620. The end wall 618 is arcuate in configuration so as to match the overall exterior contour defined by the housing 102, whereby the end wall 618 sits flush with the lower face of the image capture device 100 when the locking mechanism 600 is in the locked position. The locking member 602 defines a bearing surface 622 (FIGS. 13, 15) that is configured for engagement (contact) with a corresponding bearing surface 152 defined by the body 102 of the image capture device 100 (e.g., at the corner section 146*i* (FIG. 4A)).

In certain embodiments, such as that illustrated throughout the figures, the locking member 602 may include one or more reliefs 624 to reduce the overall weight of the locking mechanism 600. Although shown as including a pair of discrete reliefs 624*i*, 624*ii* in the illustrated embodiment, it should be appreciated that the particular number and/or configuration of the relief(s) 624 may be varied without departing from the scope of the present disclosure. For example, an embodiment including a single relief 624 is also contemplated herein.

To facilitate movement (sliding) between the locked position and the unlocked position, the locking mechanism 600 includes the tactile member 604, which is configured for manual engagement (contact) by a user such that a suitable force can be applied to the locking mechanism 600. For example, in the illustrated embodiment, the tactile member 604 is configured as an exterior flange 626 defining a finger grab 628. As seen in FIGS. 12 and 13, in the locked position, the exterior flange 626 is configured for engagement (contact) with the lower end surface 530 defined by the door body 500 to reduce (if not entirely eliminate) gapping between the locking mechanism 600 and the door body 500 when the locking mechanism 600 is in the locked position, as seen in FIG. 12, for example.

The rails 608 (FIGS. 9-11) extend laterally (horizontally) outward from the body portion 606 (FIG. 9) of the locking mechanism 600 and facilitate assembly and engagement of (contact between) the locking mechanism 600 and the door body 500. In the illustrated embodiment, the locking mechanism 600 includes a (first) pair of rails 608i, 608ii and a (second) pair of rails 608iii, 608iv. It should be appreciated, however, that the number of rails 608 may be varied in alternate embodiments without departing from the scope of the present disclosure.

The rails 608i, 608ii are spaced axially from each other (along the longitudinal axis Y1 of the door assembly 400) so as to define a (first) slot 630i therebetween and the rail 608ii is spaced axially from the tactile member 604 such that a (second) slot 630ii is defined therebetween. Similarly, the rails 608iii, 608iv are spaced axially from each other (along the longitudinal axis Y1 of the door assembly 400 so as to define a (third) slot 630iii therebetween and the rail 608iv is spaced axially from the tactile member 604 such that a (fourth) slot 630iv is defined therebetween. As described in further detail below, during assembly and connection of the door body 500 and the locking mechanism 600, the locking mechanism 600 is oriented such that the rails 608i-608iv are positioned for insertion into the slots 528i-528iv (FIG. 8), respectively, and such that the flanges 506ii, 506iv are positioned for insertion into the slots 630i, 630iii, respectively, which allows for positioning of the rails 608 between the flanges 506 and the supports 532 and, thus, reception of the locking mechanism 600 by the door body 500. More specifically, upon assembly and connection of the door body 500 and the locking mechanism 600, the (first) rail 608i (FIGS. 10, 11) is positioned beneath (outwardly of) the flange 506i (FIG. 8) and adjacent to the support 532i, the (second) rail 608ii is configured for positioning beneath (outwardly of) the flange 506ii and adjacent to the support 532ii, the (third) rail 608iii is configured positioning beneath (outwardly of) the flange 506iii and adjacent to the support 532iii, and the (fourth) rail 608iv is configured for positioning beneath (outwardly of) the flange 506iv and adjacent to the support 532iv, whereby the rails 608i, 608ii are positioned within the channel 526i and the rails 608iii, 608iv are positioned within the channel 526ii. Positioning of the rails 608 within the channels 526 restricts (if not entirely prevents) movement of the locking mechanism 600 towards and/or away from the door body 500 (e.g., horizontal movement) while allowing for translation (sliding) of the locking mechanism 600 relative to the door body 500 (e.g., vertical movement along the axis YL1) as the locking mechanism 600 transitions between the locked and unlocked positions.

To reduce the overall weight of the locking mechanism 600 and/or inhibit (if not entirely prevent) binding with the door body 500 during movement between the locked and unlocked positions, in certain embodiments, such as that illustrated throughout the figures, the (upper) rails 608i, 608ii may include reliefs 632 (e.g., chamfered portions) (FIG. 11). The reliefs 632 increase clearance with the flanges 506 to facilitate translation (sliding) of the locking mechanism 600 in the manner described herein.

The body portion 606 of the locking mechanism 600 defines a chamber (cavity) 634 that accommodates portions of the door body 500 and the spring plate 800 such that the door body 500 and the spring plate 800 extends into the chamber 634, as described in further detail below. An upper end 636 of the chamber 634 is defined by a (horizontal) end wall 638 that is configured for engagement (contact) with the spring plate 800. Engagement (contact) between the end wall 638 and the spring plate 800 limits vertical movement (translation) of the locking mechanism 600 (e.g., relative to the door body 500 and the spring plate 800 along the axis YL1) as the locking mechanism 600 transitions from the locked position to the unlocked position to not only define a range of motion for the locking mechanism 600, but prevent overextension of the locking mechanism 600 and, thus, inadvertent separation of the locking mechanism 600 from the door assembly 400.

In certain embodiments, such as that illustrated throughout the figures, the body portion 606 of the locking mechanism 600 may also include a cutout 640 and/or one or more reliefs 642. The cutout 640 is configured to receive the boss 504iii (FIG. 7) to increase (vertical) clearance between the locking mechanism 600 and the door body 500, thus facilitating movement of the locking mechanism 600 from the locked position to the unlocked position, and the relief(s) 642 remove excess material from the body portion 606 without compromising structural integrity to reduce the overall weight of the locking mechanism 600 and the door assembly 400.

The deflector(s) 610 (FIG. 9) are positioned generally adjacent to the seats 508 (FIG. 7) on the door body 500 (when the locking mechanism 600 is in the locked position) and are configured for engagement (contact) with the spring plate 800 to facilitate lateral deflection thereof (e.g., movement of the spring plate 800 relative to the door body 500) during movement of the locking mechanism 600 between the locked position and the unlocked position. More specifically, the deflector(s) 610 are configured for engagement (contact) with the spring plate 800 such that the spring plate 800 is deflected inwardly (i.e., away from the door body 500 and towards the seal 1000) as the locking mechanism 600 moves from the locked position to the unlocked position. Additionally, the deflector(s) 610 support the spring plate 800 during movement towards the door body 500 (and away from the seal 1000) as the locking mechanism 600 moves from the unlocked position to the locked position. To facilitate such deflection and support of the spring plate 800, each deflector 610 includes an inclined (ramped) surface 644 that is angled vertically upward (e.g., towards the pivot member 140) and a generally planar end 646 that extends from the inclined surface 644 in a generally vertical direction.

In the particular embodiment of the disclosure shown throughout the figures, the locking mechanism 600 includes a pair of deflectors 610i, 610ii that are configured such that the inclined surfaces 644i, 644ii extend at an angle that lies substantially within the range of approximately 30° to approximately 60° (relative to the longitudinal axis Y1 of the door assembly 400). It should be appreciated, however, that the number of deflectors 610 and/or the configuration of the deflector(s) 610 may be varied in alternate embodiments without departing from the scope of the present disclosure. For example, embodiments including a single deflector 610 would also be within the scope of the present disclosure, as would embodiments in which the deflector(s) 610 are configured such that the angle at which the inclined surface(s) 644 extend lies outside of the aforementioned range.

The cavity(ies) 612 extend inwardly from the body portion 606 and are configured to receive the biasing members 700 (FIG. 7) such that the biasing members 700 are supported between the cavity(ies) 612 and the seats 508 that extend inwardly from the inner surface 534 of the door body 500. More specifically, the cavity(ies) 612 are positioned axially (e.g., vertically) below the end wall 638 and laterally (e.g., horizontally) inward of the rails 608.

Each cavity 612 include opposite upper and lower ends 648, 650 (FIG. 10), respectively. Whereas the upper end 648 of each cavity 612 is closed by a lateral (e.g., horizontal) wall 652, the lower end 650 of each cavity 612 is open to allow for the insertion of a corresponding biasing member 700 (FIG. 7). Although shown as including a pair of cavities 612$i$, 612$ii$ in the illustrated embodiment, it should be appreciated that the particular number of cavities 612 may be varied in alternate embodiments without departing from the scope of the present disclosure (e.g., depending upon the number of biasing members 700 included in the door assembly 400).

Figure 16:
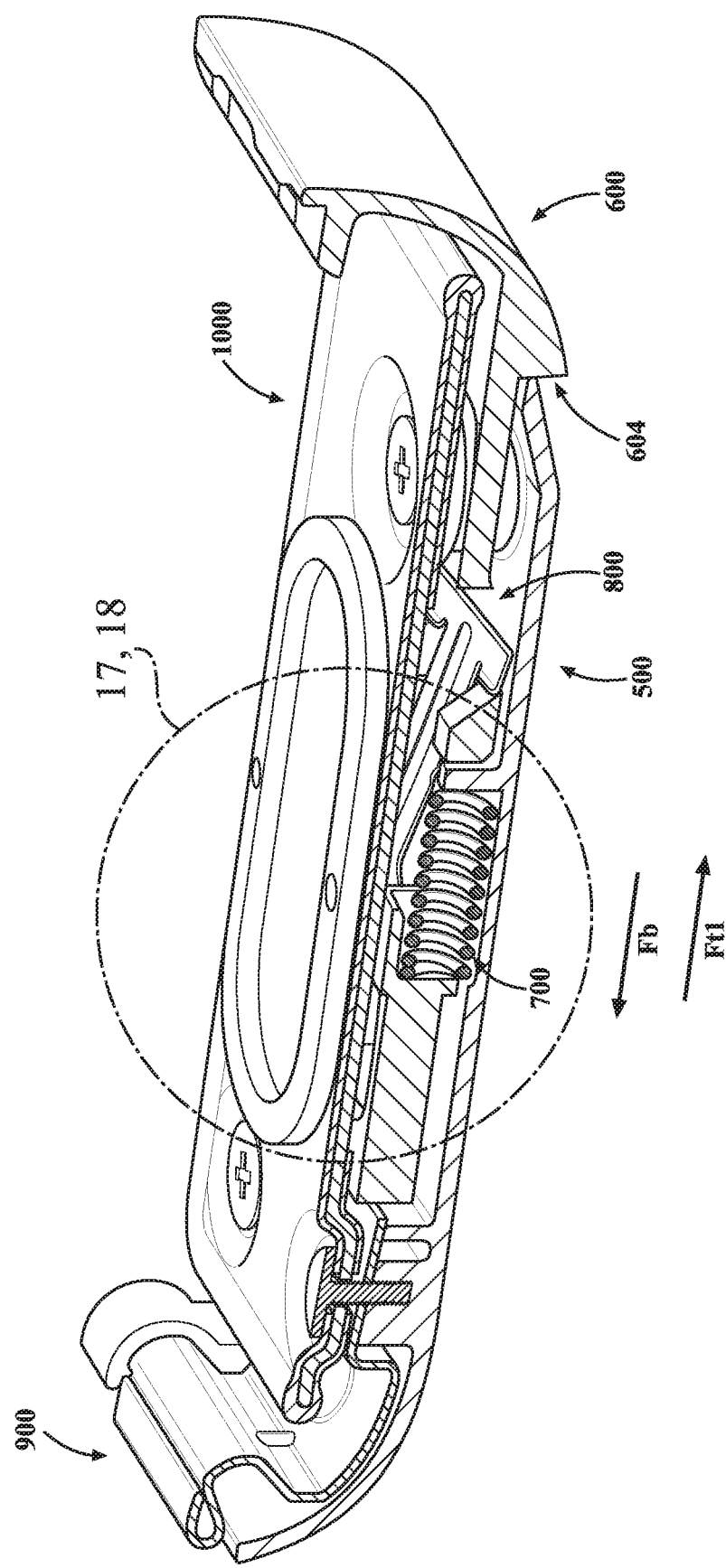
FIG. 16 is a (longitudinal, vertical) cross-sectional view of the door assembly (shown in perspective) with the locking mechanism shown in the locked position.
Figure 17:
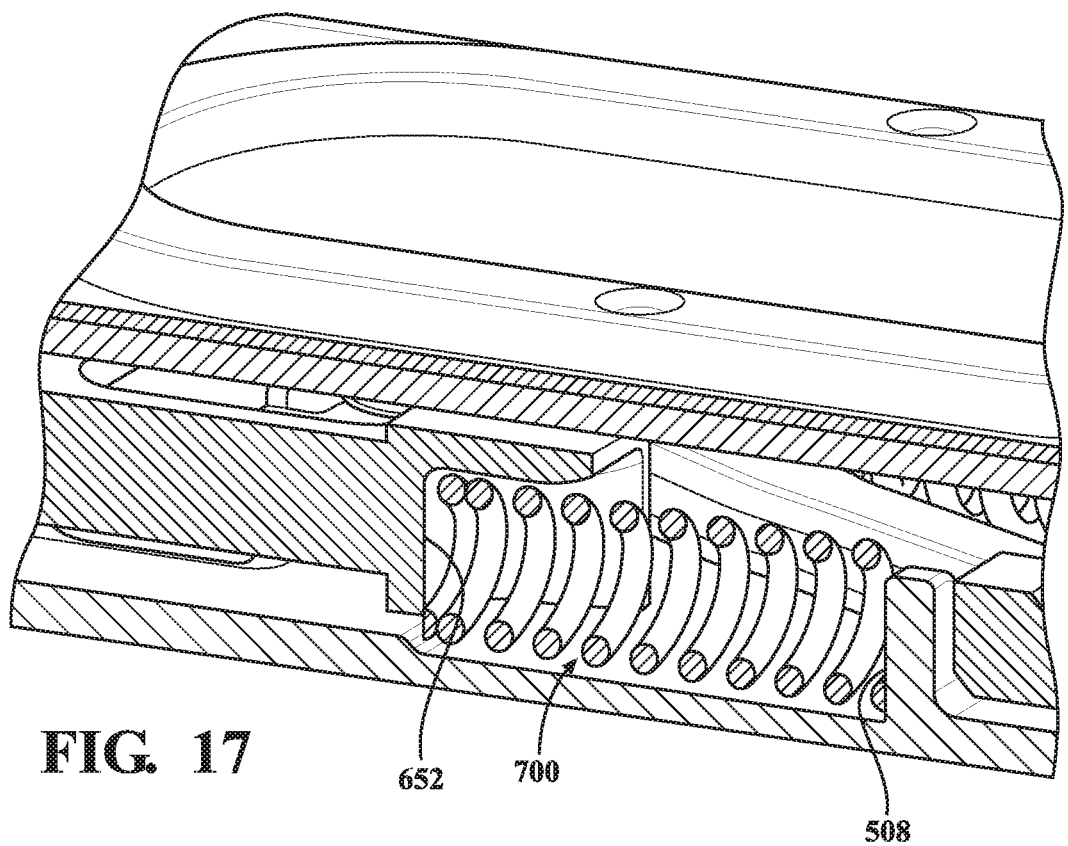
FIG. 17 is an enlargement of the area of detail identified in FIG. 16 with the locking mechanism shown in the locked position.
Figure 18:
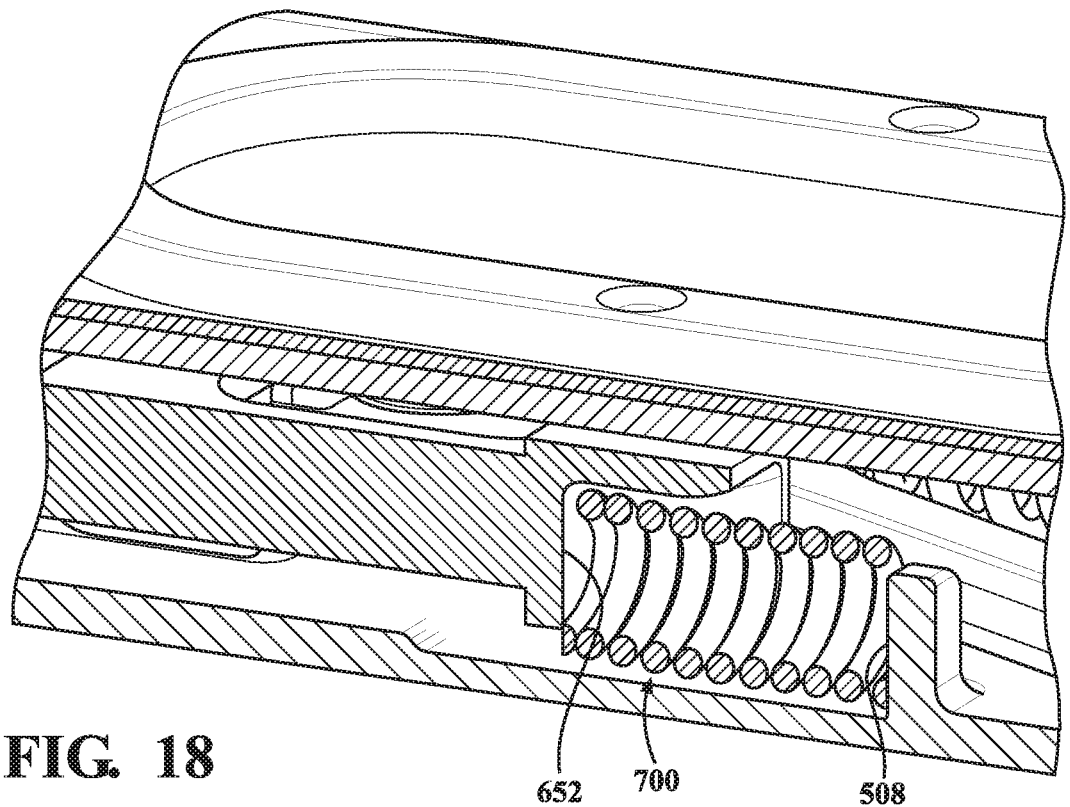
FIG. 18 is an enlargement of the area of detail identified in FIG. 16 with the locking mechanism shown in the unlocked position.

Referring now to FIGS. 7 and 16-18, the biasing members(s) 700 will be discussed. More specifically, FIG. 16 provides a (longitudinal, vertical) cross-sectional view of the door assembly 400 (in perspective) with the locking mechanism 600 shown in the locked position; FIG. 17 is an enlargement of the area of detail identified in FIG. 16; and FIG. 18 is an enlargement of the area of detail identified in FIG. 16 with the locking mechanism 600 shown in the unlocked position.

The biasing member(s) 700 are positioned between, and are supported by, the door body 500 and the locking mechanism 600 such that the biasing member(s) 700 extend along (e.g., in generally parallel relation to) the length L1 of the door assembly 400 (and the longitudinal axis Y1 of the door assembly 400). More specifically, each biasing member 700 (FIG. 7) includes an upper (first) end 702 that is positioned in engagement (contact) with the lateral wall 652 (FIG. 10) closing the upper end 648 of the corresponding cavity 612 and an opposite lower (second) end 704 that is positioned in engagement (contact) with the corresponding seat 508 such that the biasing member(s) 700 are supported by the seat(s) 508. Although shown as including a pair of (e.g., first and second) coil springs 706$i$, 706$ii$ that are separated laterally (horizontally) from each other along a width W of the door body 500 such that the coil springs 706$i$, 706$ii$ extend in (generally) parallel relation to each other in the illustrated embodiment, it should be appreciated that the particular number and/or configuration of the biasing member(s) 700 may be varied in alternate embodiments without departing from the scope of the present disclosure, as elaborated upon below.

To inhibit (if not entirely prevent) unintended movement of the biasing member(s) 700, it is envisioned that the biasing member(s) 700, the door body 500, and the locking mechanism 600 may be configured such that the biasing member(s) are compressed between the lateral wall 652 closing the upper end 648 of the corresponding cavity 612 and the corresponding seat 508 in the absence of any additional force. As described below, this initial (pre-load) compressive force is increased during movement of the locking mechanism 600 from the locked position (FIGS. 16, 17) to the unlocked position (FIG. 18).

The biasing member(s) 700 bias the locking mechanism 600 towards the locked position (FIG. 17) via the application of a biasing (resistive) force Fb (FIG. 16) that is directed (vertically) upward (e.g., towards the pivot member 140). The locked position is, thus, the normal position for the locking mechanism 600 (i.e., the position of the locking mechanism 600 in the absence of any applied external force). The biasing member(s) 700 not only assist with shock and vibration absorption, but resist axial (vertically downward) movement of the locking mechanism 600 until the application of a threshold force Ft1 (FIG. 16) to the locking mechanism 600 (e.g., via the tactile member 604) sufficient to overcome the biasing force Fb, which inhibits (if not entirely prevents) accidental or unwanted unlocking and opening of the door assembly 400 (e.g., in the event that the image capture device 100 is dropped). Upon the application of the threshold force Ft1 to the locking mechanism 600, the locking mechanism 600 moves from the locked (normal) position (FIGS. 16, 17) to the unlocked position (FIG. 18), thereby increasing compression of the biasing member(s) 700 between the corresponding lateral wall 652 and seat 508. Upon release of the threshold force Ft1, the biasing member(s) 700 automatically return the locking mechanism 600 to the locked position, which eliminates the need for any subsequent action by the user to positively lock the door assembly 400, thereby reducing the likelihood of water entry that may otherwise exist (e.g., were positive user action required to lock the door assembly 400).

The particular biasing force Fb provided by the biasing member(s) 700 may be varied as necessary or desired by altering the number of biasing member(s) 700 and/or the configuration of the biasing member(s) 700 (e.g., by varying the length of the biasing member(s) 700, the stiffness of the biasing member(s) 700, the material(s) of construction used in fabrication of the biasing member(s) 700, etc.). For example, by increasing the number of include biasing members 700, the biasing force Fb may be correspondingly increased. Allowing for variation in the biasing force Fb facilitates adjustment in the tactile feel of the door assembly 400 experienced by the user during locking and unlocking and opening and closure to achieve any desired or customized result.

Figure 19:
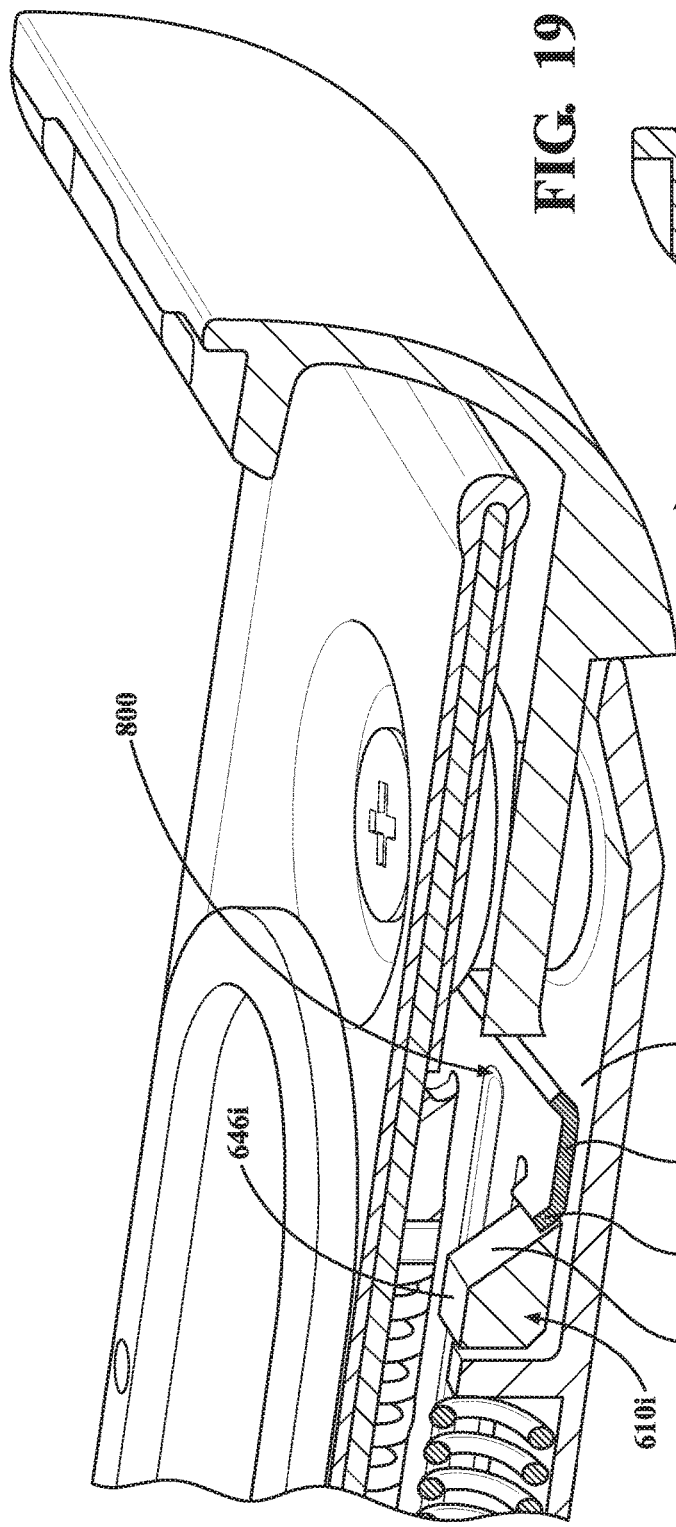
FIG. 19 is a partial, (longitudinal, vertical) cross-sectional view of the door assembly (shown in perspective) with the locking mechanism in the locked position and the spring plate in a normal (first, unbiased) position.
Figure 20:
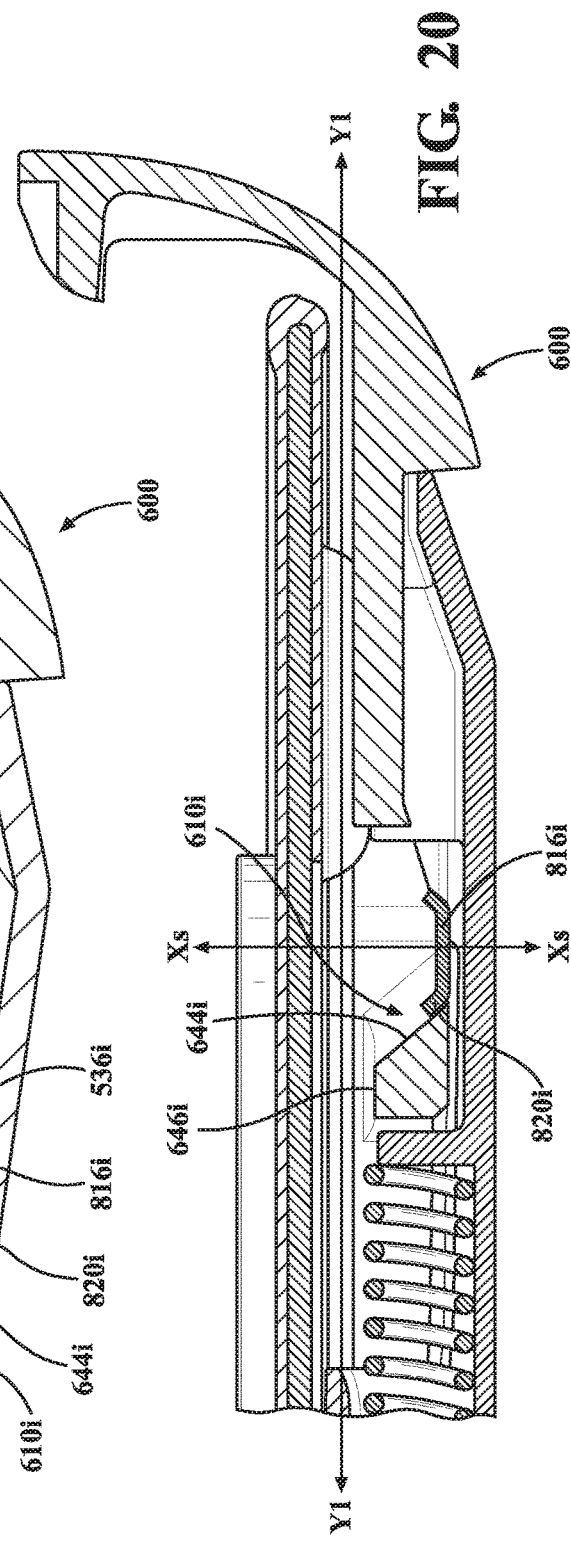
FIG. 20 is a partial, (longitudinal, vertical) cross-sectional view of the door assembly with the locking mechanism shown in the locked position and the spring plate shown in the normal position.

Referring now to FIGS. 7 and 19-22, the spring plate 800 will be discussed. FIG. 19 provides a partial, (longitudinal, vertical) cross-sectional view of the door assembly 400 (shown in perspective) with the locking mechanism 600 shown in the locked position and the spring plate 800 shown in a normal (first, unbiased) position; FIG. 20 provides a partial, (longitudinal, vertical) cross-sectional view of the door assembly 400 with the locking mechanism 600 shown in the locked position and the spring plate 800 shown in the normal position; FIG. 21 provides a partial, (longitudinal, vertical) cross-sectional view of the door assembly 400 (shown in perspective) with the locking mechanism 600 shown in the unlocked position and the spring plate 800 shown in a deflected (second, biased) position; and FIG. 22 provides a partial, (longitudinal, vertical) cross-sectional view of the door assembly 400 with the locking mechanism 600 shown in the locked position and the spring plate 800 shown in the deflected position.

The spring plate 800 may include any suitable material or combination of materials and may be formed through any suitable method of manufacture (e.g., stamping, injection molding, machining, etc.). In the particular embodiment shown throughout the figures, for example, the spring plate 800 is integrally (e.g., monolithically) formed from a resilient (e.g., flexible) metallic material (e.g., spring steel, aluminum, etc.).

The spring plate 800 is supported by the door body 500 and includes opposite upper and lower (first and second) ends 804u, 804l and a body portion 806 that is positioned between the ends 804u, 804l. The upper end 804u is spaced vertically from the lower end 804l (i.e., closer to the pivot member 140) and is axially (vertically) fixed to the door body 500. More specifically, the upper end 804u includes a first section 808 defining the aperture 802 that is configured to receive the post 522 extending from the door body 500 and a second section 810 defining an aperture 812 that is configured to receive the fastener 518iii such that the fastener 518iii extends through the spring plate 800 and into the boss 504iv to fixedly connect the spring plate 800 to the door body 500. When so connected, the boss 504iv supports the second section 810 of the spring plate 800. The second section 810 is spaced inwardly from the first section 808 (i.e., such that the second section 810 is positioned closer to the seal 1000 than the first section 808) and extends in generally parallel relation to the first section 808. The second section 810 is connected to the first section 808 by a (horizontal) flange 814 that is oriented in generally orthogonal relation to each of the sections 808, 810.

The body portion 806 of the spring plate 800 is generally linear in configuration and extends axially (e.g., vertically downward) from the second section 810. More specifically, the body portion 806 extends from the second section 810 at an angle such that the distance between the lower end 804l and the seal 1000 is greater than the distance between the second section 810 and the seal 1000.

The lower end 804l of the spring plate 800 includes a pair of wings 816i, 816ii that extend laterally (horizontally) from the body portion 806 such that the spring plate 800 includes an overall configuration that is (generally) T-shaped. However, as mentioned above, it is envisioned that the number of deflectors 610 included on the locking mechanism 600 may be varied in alternate embodiments of the disclosure (e.g., such that the locking mechanism 600 includes a single deflector 610 only). As such, embodiments of the spring plate 800 are also envisioned in which the spring plate 800 may include a single wing 816 only.

The wings 816i, 816ii are respectively accommodated by the recesses 536i, 536ii defined by the supports 532i-532iv extending from the inner surface 534 of the door body 500 and are configured for respective engagement (contact) with the deflectors 610i, 610ii during movement of the locking mechanism 600 between the locked position (FIGS. 19, 20) and the unlocked position (FIGS. 21, 22). Engagement (contact) between the wings 816i, 816ii and the deflectors 610i, 610ii inhibits (if not entirely prevents) rotation of the spring plate 800 relative to the door body 500 during movement of the locking mechanism 600. Additionally, engagement (contact) between the wings 816i, 816ii and the deflectors 610i, 610ii assists with shock and vibration absorption while resisting axial (e.g., vertically downward) movement of the locking mechanism 600 until application of the threshold force Ft1 (FIG. 16) to the locking mechanism 600 so as to inhibit (if not entirely prevent) accidental or unwanted unlocking and opening of the door assembly 400 (e.g., in the event that the image capture device 100 is dropped).

During movement of the locking mechanism 600 between the locked position (FIGS. 19, 20) and the unlocked position (FIGS. 21, 22), by virtue of the fixed axial (vertical) connection between the upper end 804u (FIG. 7) of the spring plate 800 and the door body 500, the locking mechanism 600 moves relative to the door body 500 and the spring plate 800, which causes reconfiguration (movement) of the spring plate 800 from the normal (first, unbiased) position, which is seen in FIGS. 19, 20, to the deflected (second, biased) position, which is seen in FIGS. 21, 22. More specifically, during movement of the locking mechanism 600 from the locked position to the unlocked position, the wings 816i, 816ii traverse the deflectors 610i, 610ii and travel (vertically upward) across the inclined surfaces 644i, 644ii, respectively. To facilitate movement of the wings 816i, 816ii across the inclined surfaces 644 and, thus, deflection of the spring plate 800, it is envisioned that the wings 816i, 816ii may define beveled (angled) upper surfaces 820i, 820ii that are respectively configured in correspondence with the inclined surfaces 644i, 644ii (i.e., such that the angle defined by each of the surfaces 820i, 820ii approximates or matches the angle defined by each of the inclined surfaces 644i, 644ii). As the spring plate 800 traverses the deflectors 610i, 610ii, the spring plate 800 is deflected outward (i.e., away from the door body 500 and towards the seal 1000) along an axis of movement Xs (FIG. 20) that extends in generally orthogonal relation to the longitudinal axis Y1 of the door assembly 400, thereby reducing the angle at which the body portion 806 extends from the second section 810. As seen in FIGS. 21 and 22, when the locking mechanism 600 is in the unlocked position, the spring plate 800 is supported by the respective ends 646i, 646ii of the deflectors 610i, 610ii in a generally linear configuration such that the spring plate 800 extends in generally parallel relation to the longitudinal axis Y1 of the door assembly 400 (and the locking mechanism 600). Upon reaching the unlocked position (e.g., as the spring plate 800 clears the inclined surfaces 644), the resistance to movement offered by the deflectors 610i, 610ii is eliminated, which provides the user with feedback in the form of a tactile release that acts as an indicator of positive (successful) unlocking of the locking mechanism 600.

Oppositely, as the locking mechanism 600 moves from the unlocked position to the locked position, the wings 816i, 816ii traverse the deflectors 610i, 610ii, respectively, such that the wings 816i, 816ii travel (vertically downward) across the inclined surfaces 644. By virtue of the resilient material(s) used in construction of the spring plate 800, it is envisioned that engagement (contact) between the wing(s) 816 and the deflector(s) 610 may urge the locking mechanism 600 upwardly (e.g., towards the pivot member 140), thereby facilitating return of the locking mechanism 600 to the locked position as the spring plate 800 returns to its normal configuration (FIGS. 19, 20). As the normal configuration of the spring plate 800 is restored, the distance between the wings 816i, 816ii and the door body 500 is reduced and the angle at which the body portion 806 extends from the second section 810 is increased such that the body portion 806 is again oriented at an angle in relation to the longitudinal axis Y1 of the door assembly 400 (and the locking mechanism 600).

As mentioned above, the spring plate 800 is configured for receipt within the chamber 634 (FIG. 9) defined by the locking mechanism 600. When the locking mechanism 600 is fully extended (unlocked), the flange 814 connecting the sections 808, 810 of the upper end 804u of the spring plate 800 comes into engagement (contact) with the end wall 638 defining the chamber 634. The flange 814 and the end wall 638, thus, collectively define a hard stop that limits (vertically downward) travel of the locking mechanism 600.

Referring now to FIGS. 7 and 23-27, the spring clip 900 will be discussed. FIG. 23 provides a perspective view of the spring clip 900 separated from the door body 500; FIG. 24 provides a partial, (longitudinal, vertical) cross-sectional view of the image capture device 100 and the door assembly 400 shown prior to connection of the door assembly 400; FIG. 25 provides a partial, (longitudinal, vertical) cross-sectional view of the image capture device 100 and the door assembly 400 illustrating deflection of the spring clip 900 during connection of the door assembly 400; FIG. 26 provides a partial, (longitudinal, vertical) cross-sectional view of the image capture device 100 and the door assembly 400 upon connection of the door assembly 400 with the door assembly 400 shown in the open position; and FIG. 27 provides a partial, (longitudinal, vertical) cross-sectional view of the image capture device 100 and the door assembly 400 with the door assembly 400 shown in the closed position.

The spring clip 900 is positioned axially from (vertically above) the locking mechanism 600 in generally adjacent relation to the engagement structure 502. The spring clip 900 is configured for engagement (contact) with the pivot member 140 to facilitate and maintain secured engagement (contact) between the pivot member 140 and the door body 500 (via the engagement structure 502). The spring clip 900 facilitates binary interaction between the door assembly 400 and the image capture device 100 such that the door assembly 400 is either connected to (engaged with) the image capture device 100 or disconnected (disengaged) from image capture device 100 with no allowance for any intermediate or partially-connected positions. The elimination any such intermediate position(s) improves the consistency and reliability of the connection between the door assembly 400 and the image capture device 100, which reduces potential gapping between the door assembly 400 and the image capture device 100 that may otherwise occur and, thus, any likelihood of leakage, water intrusion, etc.

The spring clip 900 may include (e.g., may be formed partially or entirely from) any suitable material or combination of materials and may be formed through any suitable method of manufacture (e.g., stamping, injection molding, machining, etc.). In the particular embodiment shown throughout the figures, for example, the spring clip 900 is integrally (e.g., monolithically) formed from a resilient (e.g., flexible) metallic material (e.g., spring steel, aluminum, etc.) and includes an upper (first) portion 902*u*; a lower (second) portion 902*l*; and an intermediate portion 902*i* that extends between the respective upper and lower portions 902*u*, 902*l*.

The upper portion 902*u* is configured for positioning within a space 540 (FIG. 8) defined between the clasps 510 of the engagement structure 502. To inhibit (if not entirely prevent) engagement (contact) between the clasps 510 and the upper portion 902*u* of the spring clip 900 and, thus, binding, the upper portion 902*u* defines a transverse (horizontal) dimension (e.g., a width) Wc that is less than that defined by the space 540. To further facilitate positioning of the upper portion 902*u* within the space 540, the upper portion 902*u* defines a (longitudinal, vertical) cross-sectional configuration (e.g., a height) that (generally) approximates that of the clasps 510. For example, as seen in FIGS. 24-27, it is envisioned that the upper portion 902*u* of the spring clip 900 may define a curvature similar to (e.g., slightly greater than) that defined by the engagement structure 502, which may facilitate (improve) secured engagement (contact) between the pivot member 140 and the upper portion 902*u* of the spring clip 900, as described in further detail below.

The upper portion 902*u* is (generally) U-shaped in configuration and includes (first and second) legs 904*i*, 904*ii* that are connected by a belly portion 906. More specifically, the legs 904*i*, 904*ii* are (generally) linear in configuration and the belly portion 906 is arcuate (curved) in configuration so as to define a channel 908 that is configured to receive the pivot member 140. The leg 904*i* is (generally) tear-dropped in configuration and includes (first and second) segments 910*i*, 910*ii* that are connected by a bridge portion 912. More specifically, the segments 910*i*, 910*ii* are (generally) linear in configuration and the bridge portion 912 is arcuate in configuration so as to define a (curved) outer guide surface 914. The curvature of the outer guide surface 914 not only prevents binding engagement (contact) between the spring clip 900 and the pivot member 140 during connection of the door assembly 400 to the image capture device 100, but urges, directs, or otherwise guides the pivot member 140 into the position seen in FIG. 27 such that the pivot member 140 is received by the channels 516, 908 respectively defined by the claps 510 and the spring clip 900. By virtue of the arcuate configuration of the bridge portion 912, the segments 910*i*, 910*ii* extend from the bridge portion 912 towards each other such that the segments 910*i*, 910*ii* are positioned in (generally) approximate (e.g., engaging (contacting)) relation with the segment 910*i* overlapping the segment 910*ii* so as to increase the rigidity and/or the strength of the leg 904*i*.

Together with the clasps 510, the leg 910*i* defines a receiving space 916 (FIG. 24) that is configured to receive the pivot member 140. By virtue of the resilient construction of the spring clip 900, as discussed in further detail below, the receiving space 916 is expandable, which facilitates insertion of the pivot member 140 into the receiving space 916 and removal of the pivot member 140 from the receiving space 916 during connection and disconnection of the door assembly 400 to the image capture device 100, respectively.

The intermediate portion 902*i* of the spring clip 900 extends from the upper portion 902*u* and includes a configuration that substantially approximates the contour defined by the inner surface 534 of the door body 500. More specifically, as can be appreciated through reference to FIGS. 8 and 23, the intermediate portion 902*i* defines a curvature that is substantially similar (or identical) to the curvature defined by an upper end 542 of the door body 500. In certain embodiments, it is envisioned that the intermediate portion 902*i* may be configured for engagement (contact) with the inner surface 534 of the door body 500 such that that intermediate portion 902*i* of the spring clip 900 is supported by the inner surface 534 of the door body 500 (e.g., during closure of the door assembly 1000) to improve uniformity and accuracy in the distribution of force across the spring clip 900.

As seen in FIG. 23, for example, the curvatures defined by the upper portion 902*u* of the spring clip 900 and the intermediate portion 902*i* of the spring clip 900 extend in different (e.g., generally opposite) directions. More specifically, whereas the curvature defined by the upper portion 902*u* extends generally away from the inner surface 534 (FIG. 8) of the door body 500, the curvature defined by the intermediate portion 902*i* extends generally towards the inner surface 534 of the door body 500.

In certain embodiments, such as that shown throughout the figures, it is envisioned that the intermediate portion 902*i* of the spring clip 900 may include one or more protrusions 918 (e.g., detents, projections, or other such surface irregularities) that facilitate engagement (contact) between the spring clip 900 and the inner surface 534 of the door body 500 within the space 540 defined between the clasps 510. The protrusion(s) 918 define one or more points of engagement (contact) to reduce the surface area of the spring clip 900 that engages (contacts) the inner surface 534 of the door body 500, which stabilizes the spring clip 900 relative to the door body 500. Although illustrated as including a single (generally arcuate) protrusion 918 in the illustrated embodiment, it should be appreciated that the particular configuration and/or number of protrusion(s) 918 may be varied in alternate embodiments without departing from the scope of the present disclosure.

The lower portion 902*l* of the spring clip 900 extends from the intermediate portion 902*i* and includes a generally planar (e.g., flat) configuration. The lower portion 902*l* extends laterally outward (transversely, horizontally) from the intermediate portion 902*i* and is configured for engagement (contact) with the bosses 504*i*, 504*ii*, 504*iv* (FIG. 8) on the door body 500. The bosses 504*i*, 504*ii*, 504*iv* support the spring clip 900 such that the upper portion 902*u* is cantilevered, which allows the upper portion 902*u* to float freely between the clasps 510 so as to facilitate flexure (deformation) of spring clip 900. More specifically, the lower portion 902*l* includes apertures 920*i* that are each configured to receive the fasteners 518*i* (FIG. 8) and an aperture 920*ii* that is configured to receive the fastener 518*ii* such that the fasteners 518*i*, 518*ii* extend into the door body 500 through the seal 1000 and the spring clip 900. Insertion of the fasteners 518*i*, 518*ii* into the door body 500 (e.g., the bosses 504*i*, 504*ii*, 504*iv*) fixedly secures the spring clip 900 to the door body 500 to limit (if not entirely prevent) rotational, axial (longitudinal, vertical), and/or lateral (transverse, horizontal) movement of the spring clip 900 relative to the door body 500 (e.g., movement of the spring clip 900 towards or away from the pivot member 140 and/or movement of the spring clip 900 towards or away from the seal 1000). Additionally, the lower portion 902*l* includes apertures 920*iii*, which are configured to receive detents 544 that extend outwardly from the bosses 504*i*, 504*ii* so as to provide a location feature that facilitates proper location and/or orientation of the spring clip 900 in relation to the door body 500.

During connection and disconnection of the door assembly 400 and the image capture device 100, the spring clip 900 facilitates positive attachment of the door body 500 to the pivot member 140 and inhibits (if not entirely prevents) inadvertent disconnection of the door assembly 400. More specifically, the pivot member 140 is directed into and out of the receiving space 916 (FIG. 24) collectively defined by the engagement structure 502 and the spring clip 900 by the outer guide surface 914 defined by the bridge portion 912 (FIG. 23). Further facilitating proper connection of the door assembly 400 is the tear-dropped configuration of the leg 904*i*, which provides a visual indication (instruction) to the user that the pivot member 140 is to be inserted into the receiving space 916.

Connection of the door assembly 400 causes deformation of the spring clip 900 via (inward) deflection of the leg 904*i* (away from the leg 904*ii*) from an original (normal) position (FIG. 24) to a subsequent (deflected) position (FIG. 25). Deflection of the leg 904*i* results in expansion of the receiving space 916 and allows for reception of the pivot member 140. As the pivot member 140 passes the outer guide surface 914 (FIGS. 25, 26), by virtue of the resilient construction of the spring clip 900, the leg 904*i* moves towards its original (normal) position (and the leg 904*ii*), whereby the leg 904*i* engages (contacts) the pivot member 140 and forces the pivot member 140 into engagement (contact) with the clasps 510 such that the door body 500 is secured to the image capture device 100 via engagement (contact) between the pivot member 140, the clasps 510, and the spring clip 900, as seen in FIG. 27.

In certain embodiments, such as that illustrated throughout the figures, the spring clip 900 may be configured such that the user is provided with a tactile feedback in the form of a force reduction as the pivot member 140 passes the outer guide surface 914. It is envisioned that this force reduction may act as an indication of positive (successful) connection of the door assembly 400 to the image capture device 100.

To disconnect the door assembly 400 from the image capture device 100, the door assembly 400 is rotated from the closed position (FIG. 27) towards the open position (FIGS. 24-26). Upon reaching a threshold orientation, continued rotation of the door assembly 400 will cause engagement of (contact between) a bearing surface 154 (FIGS. 24, 26) defined by the body 102 of the image capture device 100 and one or more corresponding bearing surface(s) 546 defined by the door body 500 (e.g., by or adjacent to the engagement structure 502). For example, it is envisioned that the door body 500 and the body 102 of the image capture device 100 may be configured such that the bearing surface 546 engages (contacts) the bearing surface 154 upon positioning of the door assembly 400 in generally orthogonal relation to the body 102 of the image capture device 100, as seen in FIG. 26. Engagement of (contact between) the bearing surfaces 546, 154 defines a hard stop that inhibits (if not entirely prevents) continued rotation of the door assembly 400. To separate the door assembly 400 from the pivot member 140, an outwardly-directed (e.g., manual, pulling) force is applied in the direction indicated by arrow 1, which causes deformation of the spring clip 900 via deflection of the leg 904*i* (away from the leg 904*ii*) in the manner discussed above so as to expand the receiving space 916 and move the spring clip 900 from the position seen in FIG. 26 to the position seen in FIG. 25. Upon sufficient deflection of the leg 904*i* and expansion of the receiving space 916, the door assembly 400 can be separated from the pivot member 140 and detached from the image capture device 100 in the manner illustrated in the transition from FIG. 25 to FIG. 24. As the door assembly 400 is disconnected, the pivot member 140 exits the receiving space 916, during which, the pivot member 140 passes (and is again directed by) the outer guide surface 914 and the leg 904*i* moves towards its original (normal) position (FIG. 24) (and the leg 904*ii*).

As discussed above in the context of connection of the door assembly 400, in certain embodiments, such as that illustrated throughout the figures, the spring clip 900 may be configured such that the user is provided with a tactile feedback in the form of a force reduction as the pivot member 140 passes the outer guide surface 914. It is envisioned that this force reduction may act as an indication of positive (successful) disconnection of the door assembly 400 from the image capture device 100.

By varying the configuration of the spring clip 900 and/or the material(s) of construction used in its fabrication, the force required to connect and disconnect the door assembly 400 from the pivot member 140 and, thus, the positive indications of connection and disconnection, can be varied as necessary or desired. For example, by increasing the rigidity (stiffness) of the spring clip 900, more force may be required during connection and disconnection of the door assembly 400, thereby increasing the feedback provided by the spring clip 900 and the tactility of the corresponding indications.

Figure 28:
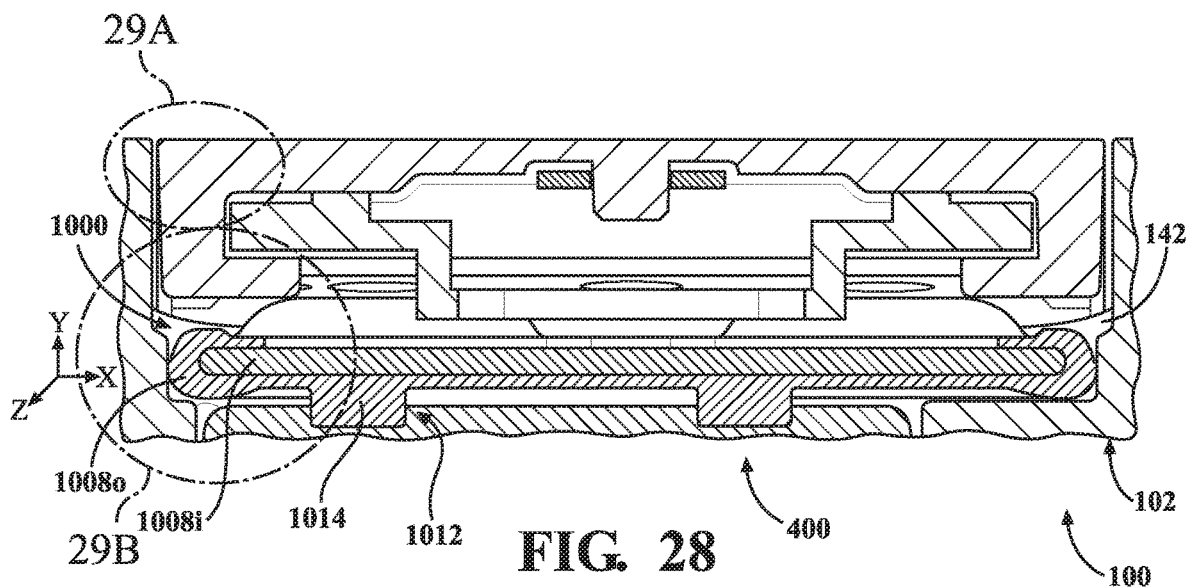
FIG. 28 is a (transverse, horizontal) cross-sectional view of the door assembly shown connected to the image capture device.
Figure 29A:
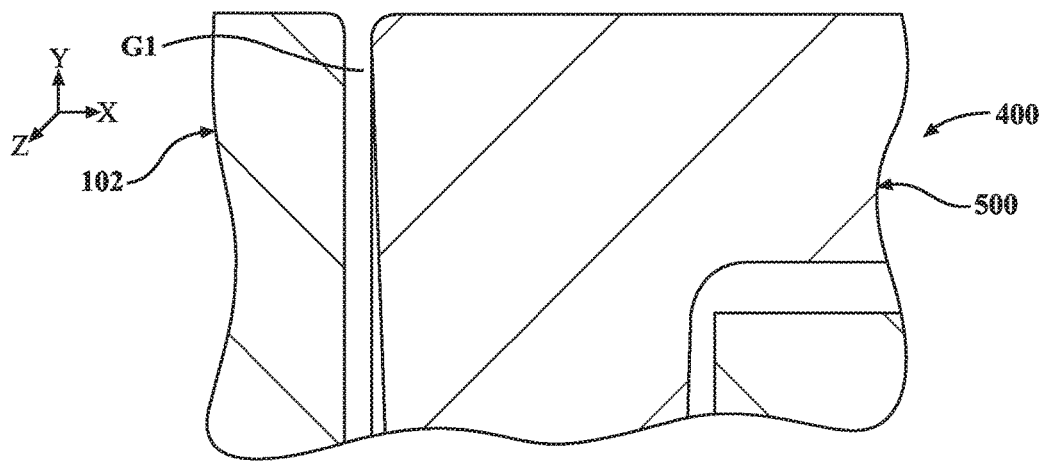
FIGS. 29A and 29B are enlargements of the areas of detail identified in FIG. 28.
Figure 29B:
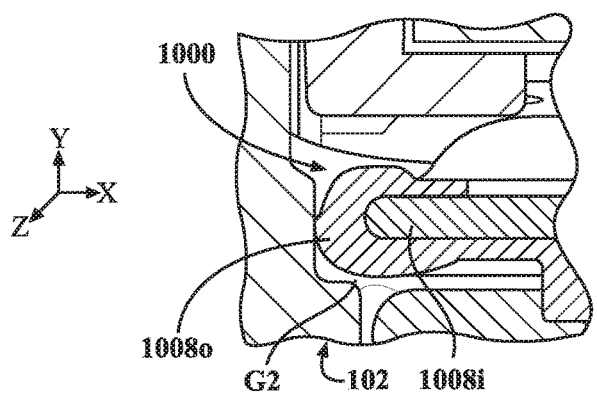

With reference now to FIG. 7 and FIGS. 28, 29A, and 29B, the seal 1000 will be discussed. FIG. 28 provides a (transverse, horizontal) cross-sectional view of the door assembly 400 shown connected to the body 102 of the image capture device 100 and FIGS. 29A, 29B are enlargements of the area of detail identified in FIG. 28.

The seal 1000 is configured in correspondence with the peripheral cavity 142 (FIG. 4A) defined by the body 102 of the image capture device 100 such that the seal 1000 is insertable into and removable from the peripheral cavity 142 during opening and closure of the door assembly 400. More specifically, in the illustrated embodiment, the seal 1000 includes a pair of generally linear sidewalls 1002i, 1002ii (FIG. 7); a pair of generally linear end walls 1004i, 1004ii that extend between the sidewalls 1002i, 1002ii; and radiused corner portions 1006i-1006iv. It should be appreciated, however, that the specific configuration of the seal 1000 may be altered in various embodiments without departing from the scope of the present disclosure (e.g., depending upon the particular configuration of the image capture device 100, the peripheral cavity 142, etc.).

The seal 1000 includes a resilient, compressible material to facilitate watertight engagement (contact) with the body 102 of the image capture device 100 upon closure of the door assembly 400 and, thus, the sealing of the peripheral cavity 142. As the door assembly 400 is closed, pressure is applied to the seal 1000 as the seal 1000 is compressed against the body 102 of the image capture device 100, which causes transverse (e.g., horizontal) and/or axial (e.g., vertical) expansion of the seal 1000. It is envisioned that the seal 1000 may include (e.g., may be formed from) any material or combination of materials suitable for the intended purpose of sealing the body 102 (e.g., the peripheral cavity 142) in the manner described herein. For example, in the particular embodiment of the disclosure illustrated throughout the figures, the seal 1000 includes an outer layer 1008o (FIG. 28) that is formed from a (first) compressible material (e.g., silicone rubber) and an inner layer (core) 1008i that is formed from a (second) material (e.g., a metallic material, polycarbonate, etc.) to increase rigidity and stability of the seal 1000 and the door assembly 400. It should be appreciated, however, that, in alternate embodiments of the disclosure, it is envisioned that the material(s) used in construction of the seal 1000 may be varied and that the seal 1000 may be formed from a single material only.

The seal 1000 is spaced inwardly from the locking mechanism 600 (i.e., further from the door body 500 and closer to the body 102 of the image capture device 100) and is integrated into the door assembly 400. More specifically, the seal 1000 is fixedly connected to the door body 500 by the fasteners 518i such that the locking mechanism 600 and the spring plate 800 are positioned between the door body 500 and the seal 1000. To facilitate connection of the seal 1000 to the door body 500, in the illustrated embodiment, the seal 1000 includes a plurality of apertures 1010 that are configured to receive the fasteners 518i such that the fasteners 518i extend through the seal 1000 into the bosses 504i, 504ii, 504iii, as discussed above.

In certain embodiments of the disclosure, such as that shown throughout the figures, the seal 1000 may include a raised section 1012 that extends outward from the seal 1000 (away from the door body 500). The raised section 1012 is configured for engagement (contact) with the battery 144 (FIG. 4A) so as to apply a force to the battery 144 upon closure of the door assembly 400. In addition to reducing (if not entirely eliminating) undesirable movement of the door assembly 400 and the battery 144 upon closure of the door assembly 400, it is envisioned that the raised section 1012 may enhance the interface between the seal 1000 and the body 102 of the image capture device 100, that that the raised section 1012 may increase shock absorption, and/or that the raised section 1012 may enhance electrical connectivity between the components of the image capture device (e.g., connection of the battery 144). Although shown as including a continuous rib 1014 that defines a (generally) ovate configuration in the illustrated embodiment, it should be appreciated that the particular configuration of the raised section 1012 may be altered in various embodiments without departing from the scope of the present disclosure (e.g., depending upon the particular configuration, location, etc., of the battery 144).

With reference now to FIGS. 7-11, assembly of the door assembly 400 will be discussed. Initially, the spring clip 900 and the spring plate 800 are secured to the door body 500. More specifically, the lower portion 902l of the spring clip 900 is positioned so as to overlie the bosses 504i, 504ii, 504iv and the spring plate 800 is positioned such that the post 522 is inserted into the opening 802. The fastener 518ii is then inserted through the opening 920ii and into the boss 504iv to secure the spring clip 900 to the door body 500 and the fastener 518iii is inserted through the aperture 812 into the boss 504v to secure the spring plate 800 to the door body 500. When so positioned, the body portion 806 of the spring plate 800 is supported by the inclined surface 520 defined by the boss 504v. Upon connection of the spring plate 800 to the door body 500, the wings 816i, 816ii are respectively accommodated by the recesses 536i, 536ii (FIG. 8) defined by the door body 500.

After connection of the spring clip 900 and the spring plate 800 to the door body 500, the locking mechanism 600 is oriented such that the rails 608i-608iv (FIG. 9) are positioned in (vertical) registration (alignment) with the slots 528i-528iv and the flanges 506ii, 506iv are positioned in (vertical) registration (alignment) with the slots 630i, 630iii (FIGS. 10, 11), which allows the rails 608i, 608ii to be inserted into the channel 526i and the rails 608iii, 608iv to be inserted into the channel 526ii via axial (vertically upward) movement of the locking mechanism 600 (e.g., towards the pivot member 140 (FIG. 5)) such that the rails 608i-608iv are supported by and positioned in engagement (contact) with the flanges 506i-506iv, respectively. When so positioned, the spring plate 800 is received by (positioned within) the chamber 634 defined by the body portion 606 of the locking mechanism 600 and the wings 816i, 816ii included at the lower end 804l of the spring plate 800 are positioned adjacent to (e.g., in engagement (contact) with) the deflectors 610i, 610ii, respectively.

Thereafter, the upper end(s) 702 of the biasing member(s) 700 are inserted into the locking mechanism 600 cavity(ies) 612 and the lower end(s) 704 of the biasing member(s) 700 are positioned in engagement (contact) with the seat(s) 508 on the door body 500 such that the biasing members 700 are axially compressed between the door body 500 and the locking mechanism 600. The seal 1000 can then be connected to the door body 500 via insertion of the fasteners 518i through the apertures 1010 and into the bosses 504i, 504ii, 504iii on the door body 500. Upon connection of the seal 1000 to the door body 500, a lower end 1016 of the seal 1000 is received within the groove 620 defined by the locking member 602 (e.g., the tooth 616) and the end wall 618 of the locking mechanism 600.

With reference now to FIGS. 4-7, 12-20, and 24-27, use and operation of the door assembly 400 will be discussed. When necessary or desired, the door assembly 400 can be moved from the closed position (FIG. 4A) to the open position (FIG. 4B) (e.g., to remove and/or replace the battery 144; to provide access to the I/O interface 124; etc.). To open the door assembly 400, the locking mechanism 600 is moved from the locked position (FIGS. 12, 13) into the unlocked position (FIGS. 14, 15), such as, for example, via the manual application of force to the tactile member 604. Due to the connection between the door body 500, the spring plate 800, the spring clip 900, and the seal 1000 established by the fasteners 518*i*, 518*ii*, 518*iii* (FIG. 7), during movement from the locked position to the unlocked position, the locking mechanism 600 translates (slides) axially (vertically downward) relative to each of the door body 500, the spring plate 800, the spring clip 900, and the seal 1000. The door body 500, the spring plate 800, the spring clip 900, and the seal 1000, thus, collectively constitute a stationary subassembly, and the locking mechanism 600 constitutes a movable subassembly.

The biasing member(s) 700 resist movement of the locking mechanism 600 from the locked position to the unlocked position, however, until the threshold force Ft1 (FIG. 16) is applied to the locking mechanism 600 (e.g., via the tactile member 604) so as to overcome the biasing force Fb applied by the biasing member(s) 700. Unlocking of the locking mechanism 600 is also resisted by the spring plate 800 via engagement (contact) between the wings 816*i*, 816*ii* and the deflectors 610*i*, 610*ii*, respectively, (FIGS. 19, 20).

Upon the application of the threshold force Ft1, as the biasing force Fb is overcome, the locking mechanism 600 moves (vertically downward) away from the pivot member 140, which compresses the biasing member(s) 700 against the seat(s) 508 (FIGS. 17, 18) and causes the lower end 804*l* of the spring plate 800 to deflect inwardly (i.e., towards the seal 1000) as the wings 816*i*, 816*ii* begin to travel (vertically upward) across the inclined surfaces 644 defined by the deflectors 610*i*, 610*ii* (FIGS. 19-22). Movement of the locking mechanism 600 continues until the end wall 638 (FIG. 7) on the locking mechanism 600 engages (contact) the flange 814 at the upper end 804*u* of the spring plate 800, during which, the locking member 602 is removed from the receptacle 148 (FIGS. 13, 15) in the housing 102 of the image capture device 100.

After movement of the locking mechanism 600 into the unlocked position, and removal of the locking member 602 from the receptacle 148, the door assembly 400 can be rotated in relation to (i.e., away from) the body 102 of the image capture device 100 into the open position seen in FIGS. 4B and 5.

If necessary or desired, the door assembly 400 can then be separated from the body 102 of the image capture device 100. For example, the door assembly 400 can be rotated such that the bearing surface 546 (FIGS. 24, 26) defined by the door body 500 engages (contacts) the bearing surface 154 defined by the body 102 of the image capture device 100, and the aforementioned outwardly-directed force can be applied to the door assembly 400 (in the direction indicated by arrow 1 (FIG. 26)). As discussed above, upon the application of the outwardly-directed force to the door assembly 400, the spring clip 900 is deflected via engagement (contact) between the pivot member 140 and the leg 904*i* so as to expand the receiving space 916, as seen in FIG. 25, and allow for separation of the engagement structure 502 from the pivot member 140 and removal of the pivot member 140 from the receiving space 916. As the pivot member 140 exits the receiving space 916, the spring clip 900 returns to its original (normal) position (FIG. 24), which provides the user with tactile feedback that identifies positive (successful) disconnection of the door assembly 400 from the image capture device 100.

To reconnect the door assembly 400 to the body 102 of the image capture device 100, the pivot member 140 is positioned adjacent to the leg 904*i*, as seen in FIG. 24, and a force is applied that causes deflection of the spring clip 900 (e.g., movement of the leg 904*i* away from the leg 904*ii*), as seen in FIG. 25. As the spring clip 900 deflects, the receiving space 916 expands, which allows for insertion of the pivot member 140 and reception of the pivot member 140 by the channel 516 defined by each clasp 510. As the pivot member 140 seats with the channel 516 and the receiving space 916, the spring clip 900 moves towards its original (normal) position as the leg 904*i* moves towards the leg 904*ii*, as seen in FIG. 26, which provides the user with tactile feedback that identifies positive (successful) connection of the door assembly 400 to the image capture device 100.

After reconnection of the door assembly 400, the door assembly 400 can be closed via rotation (pivoting) about the pivot member 140. During closure of the door assembly 400, the seal 1000 (FIG. 4B) is compressed (e.g., via engagement (contact) with the portions of the body 102 defining the peripheral cavity 142) so as to form a watertight interface between the door assembly 400 and the body 102. As the seal 1000 is compressed, due to the (generally) ovate configuration of the channel 516 (FIG. 8) defined by the arms 512*i*, 512*ii* of each clasp 510, the door assembly 400 is allowed to move in three degrees-of-freedom as the seal 1000 seats within the peripheral cavity 142. More specifically, with reference to FIG. 30, which provides a side, plan view of the door assembly 400, and FIG. 31, which is an enlargement of the area of detail identified in FIG. 30, the configuration of the clasps 510 and the channel 516 creates clearance (gapping) that allows for movement of the door assembly 400 relative to the pivot member 140 and the body 102 of the image capture device 100 in one or more of the X-, Y-, and Z-directions. More specifically, during compression of the seal 1000 (as the door assembly 400 moves inwardly towards the body 102 of the image capture device 100 along the Y-axis), shifting (movement) of the door assembly along the X-axis is facilitated by a first gap G1 (FIG. 29A) that is defined between the door body 500 and the body 102 of the image capture device 100, shifting (movement) of the door assembly along the Y-axis is facilitated by a second gap G2 (FIG. 29B) that is defined between the seal 1000 and the body 102 of the image capture device 100, and axial (e.g., vertical) shifting (movement) of the door assembly 400 along the Z-axis is facilitated by a third gap G3 (FIG. 31) that is defined between the pivot member 140 and the clasps 510 of the door body 500. This shifting of the door assembly allows for self-orientation of the seal 1000 within the peripheral cavity 142 to enhance the watertight interface between the door assembly 400 and the body 102 of the image capture device 100.

As the seal 1000 is compressed within the peripheral cavity 142, a lateral force F1 (FIG. 30) is applied that is directed outwardly (away from the image capture device 100). The interface between the pivot member 140, the engagement structure 502, and the spring clip 900 (FIGS. 24-27) and the interface between the locking member 602 and the receptacle 148 (FIGS. 15, 16), however, creates the application of opposing lateral forces F2, F3 that are directed inwardly (towards the image capture device 100) as the seal 1000 self-orients and seats within the peripheral cavity 142. As the seal 1000 is compressed, the forces F2, F3 balance the force F1, which is facilitated by the aforedescribed shifting of the door assembly 400 facilitated by the (generally) ovate configuration of the channel 516 as the seal 1000 self-orients within the peripheral cavity 142.

As the door assembly 400 is closed, the bearing surface 622 defined by the locking member 602 is brought into engagement (contact) with the bearing surface 152 defined by the body 102 of the image capture device 100. Upon engagement (contact) of the bearing surfaces 152, 622, continued closure of the door assembly 400 results in the application of force greater than or equal to the threshold force Ft1 required to unlock the locking mechanism 600, which causes the bearing surface 622 to traverse the bearing surface 152. As the bearing surface 622 (FIGS. 13, 15) traverses the bearing surface 152, the locking mechanism 600 is displaced axially (vertically downward) as the door assembly 400 continues to moves inwardly toward the body 102 of the image capture device 100. As discussed above in connection with unlocking of the locking mechanism 600, axial (vertically downward) displacement of the locking mechanism 600 results in compression of the biasing member(s) 700 and deflection of the spring plate 800 such that the lower end 804*l* (FIG. 7) thereof moves laterally outward (i.e., away from the seal 1000) as the wings 816*i*, 816*ii* travel (vertically downward) across the inclined surfaces 644 defined by the deflectors 610*i*, 610*ii* (FIGS. 19-22). Upon sufficient movement of the door assembly 400 towards the body 102 of the image capture device 100, the locking member 602 is aligned with the receptacle 148, whereupon the biasing member(s) 700 expand so as to slide the locking mechanism 600 axially (vertically upward) towards the pivot member 140 as the locking mechanism 600 returns to the locked position, which results in re-insertion of the locking member 602 into the receptacle 148. Expansion of the biasing member(s) 700, thus, automatically locks the door assembly 400 upon closure.

As the locking mechanism 600 is returned to the locked position (upon expansion of the biasing member(s) 700), it is envisioned that the lateral (inward) force applied to the locking mechanism 600 by the spring plate 800 (e.g., via engagement (contact) between the wings 816*i*, 816*ii* and the deflectors 610*i*, 610*ii*) may facilitate (e.g., encourage) axial (vertically upward) movement of the locking mechanism 600 (i.e., towards the pivot member 140). More specifically, due to the resilient construction of the spring plate 800 and the angled configuration of the deflectors 610*i*, 610*ii*, as the spring plate 800 returns to its normal position (FIGS. 19, 20), it is envisioned that the spring plate 800 may apply an additional force to the locking mechanism 600 that supplements the biasing force Fb.

It is envisioned that the sliding motion of the locking mechanism 602 during locking and unlocking may improve the user feel and the overall user experience in that unlocking and opening of the door assembly 400 as well as closure and locking of the door assembly may each be accomplished via a single motion. More specifically, unlocking and opening is accomplished via downward (vertical) movement of the locking mechanism 600 and outward rotation of the door assembly 400 and closure and locking is accomplished via inwardly rotation of the door assembly 400 and automatic upward movement of the locking mechanism 600.

Figure 32A:
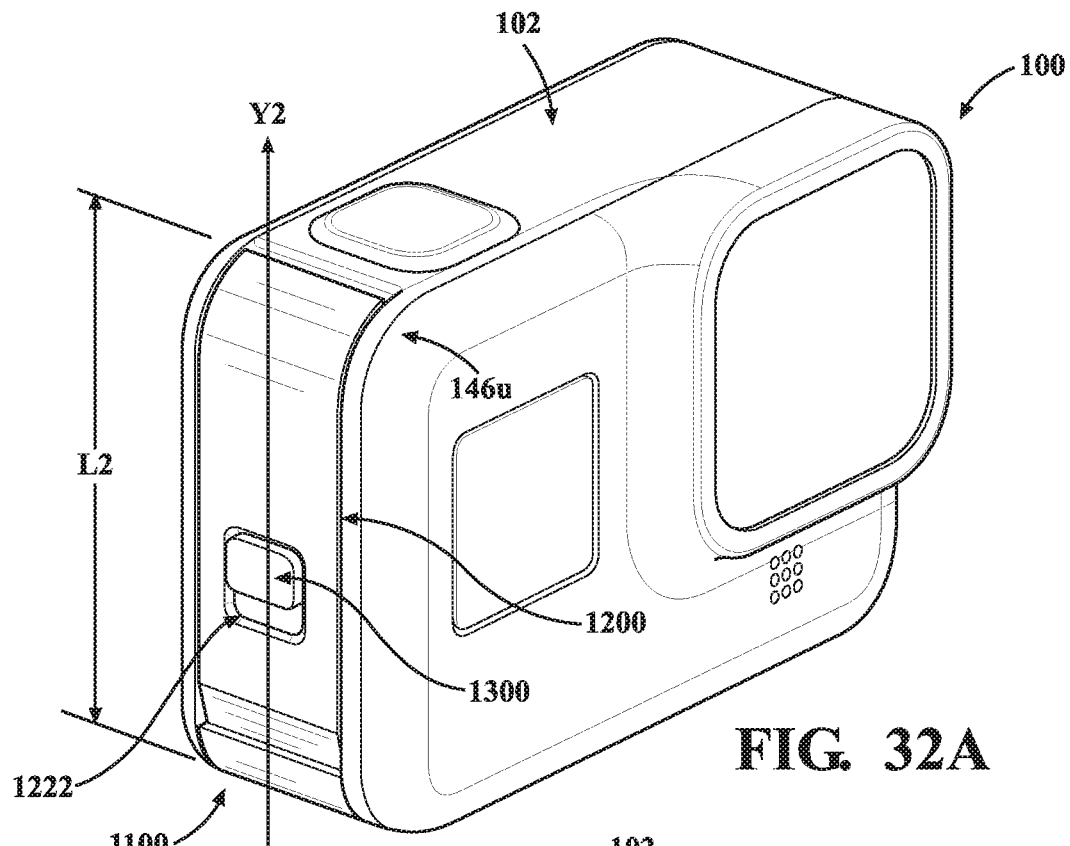
FIG. 32A is a perspective view of the image capture device seen in FIGS. 1A, 1B including a door assembly according to another aspect of the present disclosure shown in a closed position.
Figure 32B:
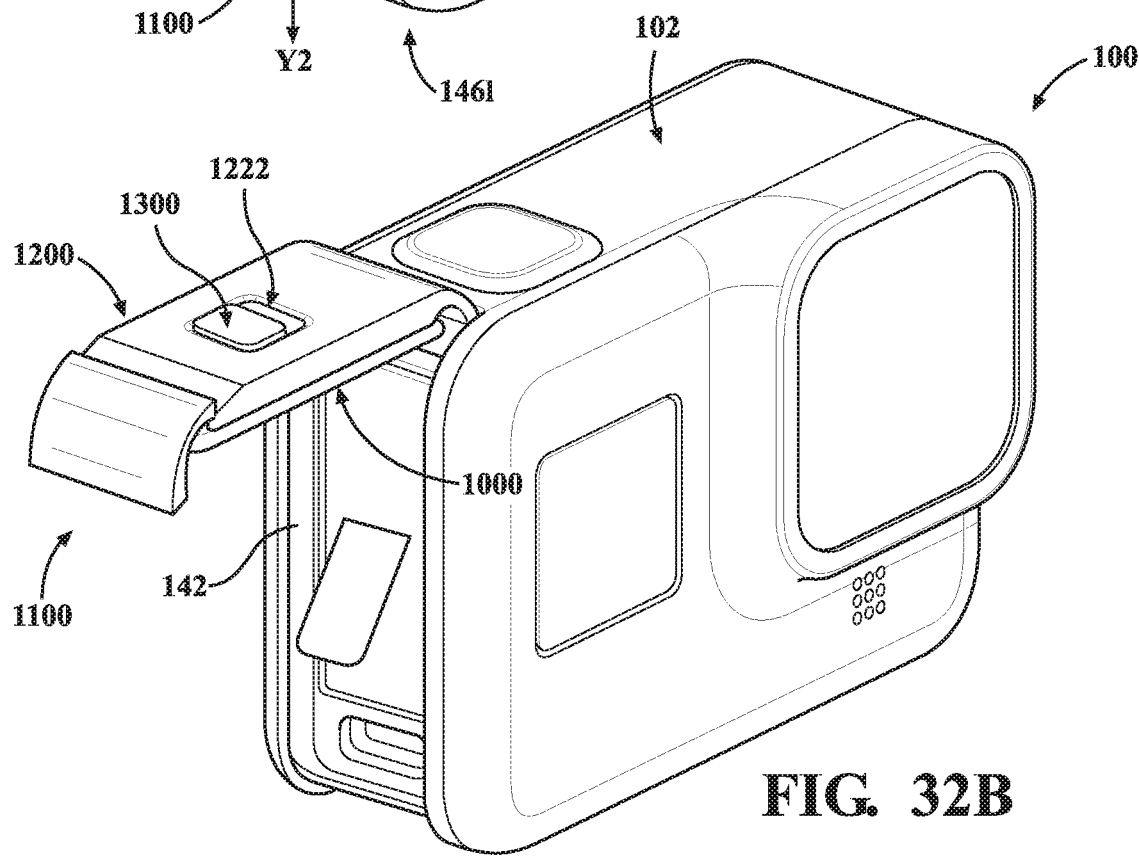
FIG. 32B is perspective view of the image capture device with the door assembly seen in FIG. 32A shown in an open position.
Figure 33:
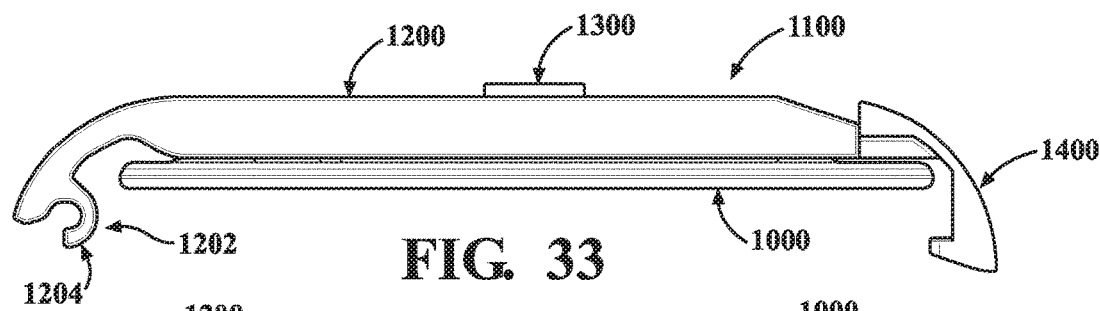
FIG. 33 is a side, plan view of the door assembly.
Figure 34:
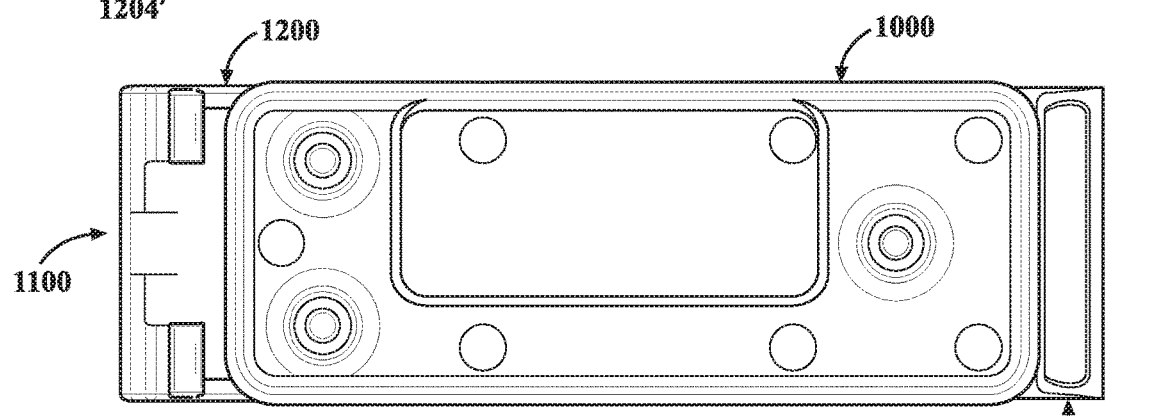
FIG. 34 is a bottom (inner), plan view of the door assembly.
Figure 35:
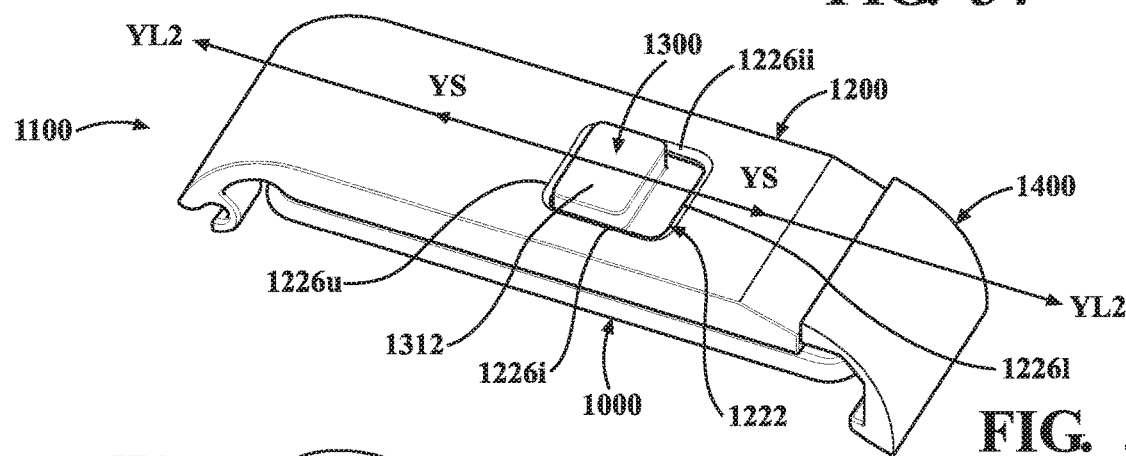
FIG. 35 is a side, perspective view of the door assembly shown in a locked position.
Figure 36:
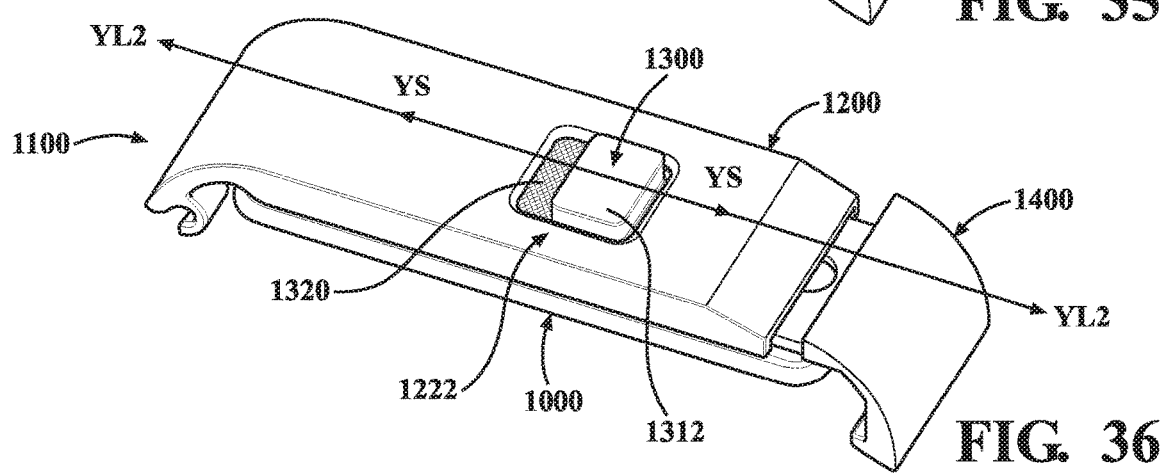
FIG. 36 is a side, perspective view of the door assembly shown in an unlocked position.
Figure 37:
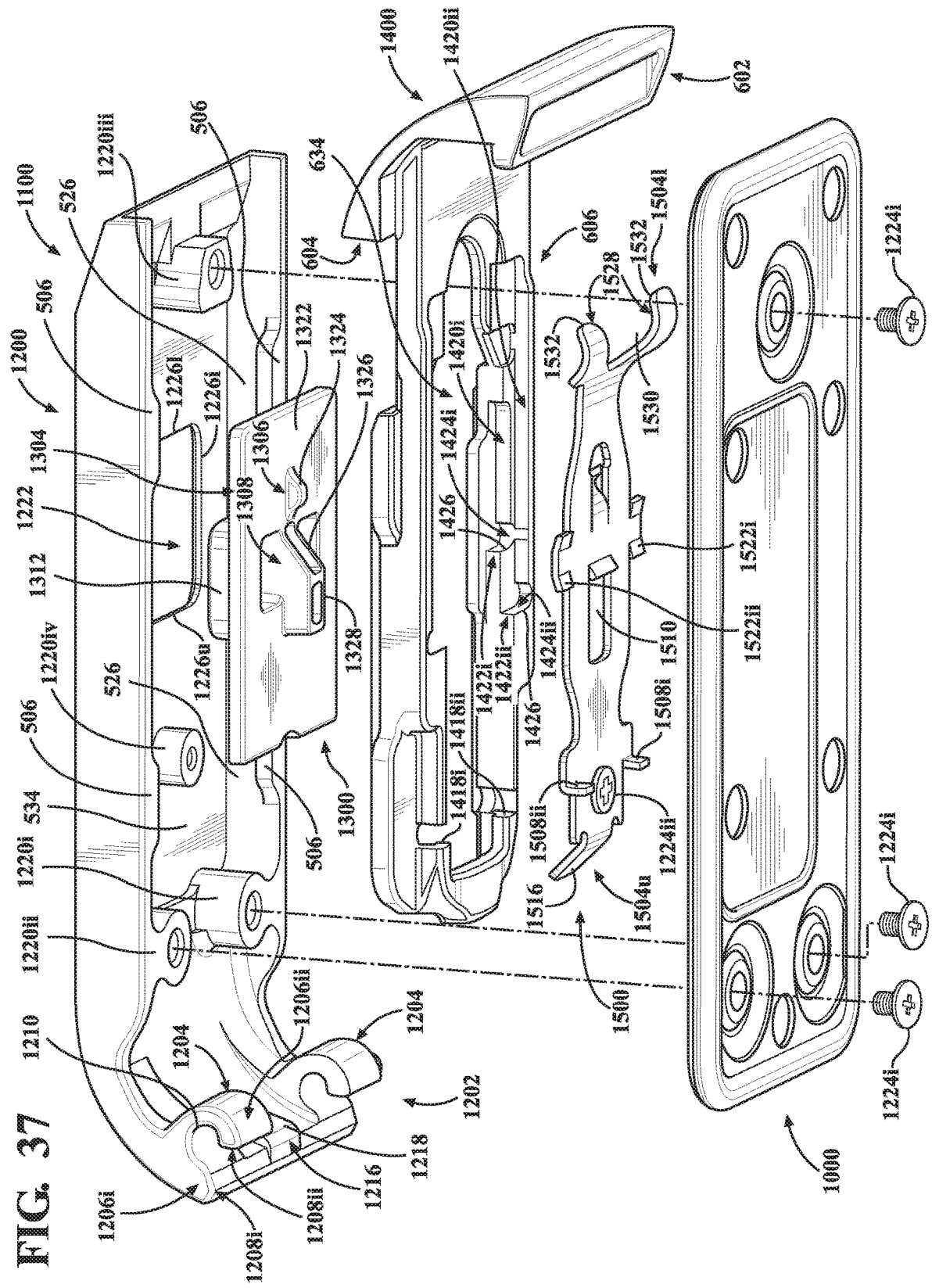
FIG. 37 is a bottom (inner), perspective view of the door assembly with parts separated illustrating a door body; a slider; a locking mechanism; a retainer; and a seal.
Figure 38:
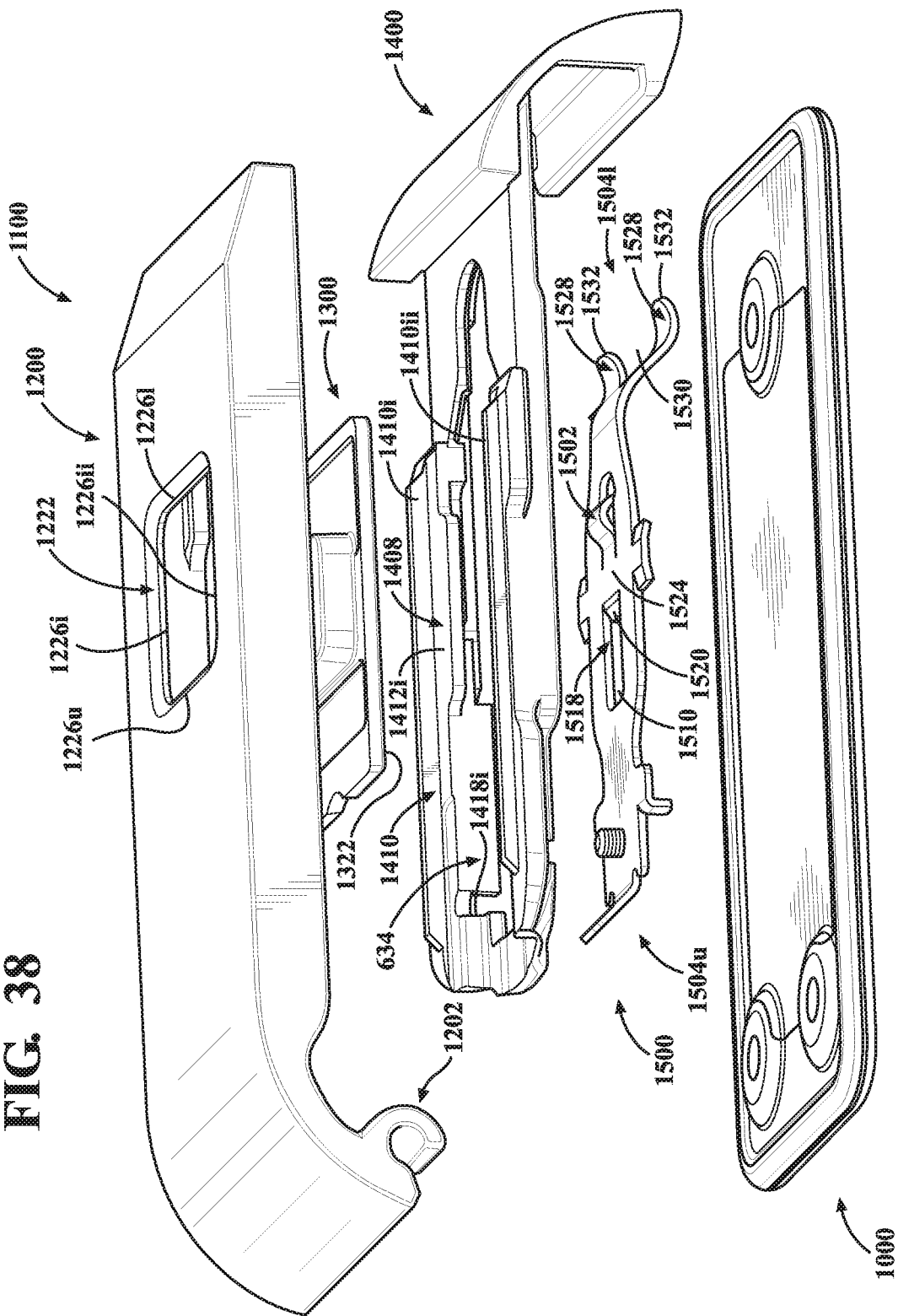
FIG. 38 is a top (outer), perspective view of the door assembly with parts separated.
Figure 39:
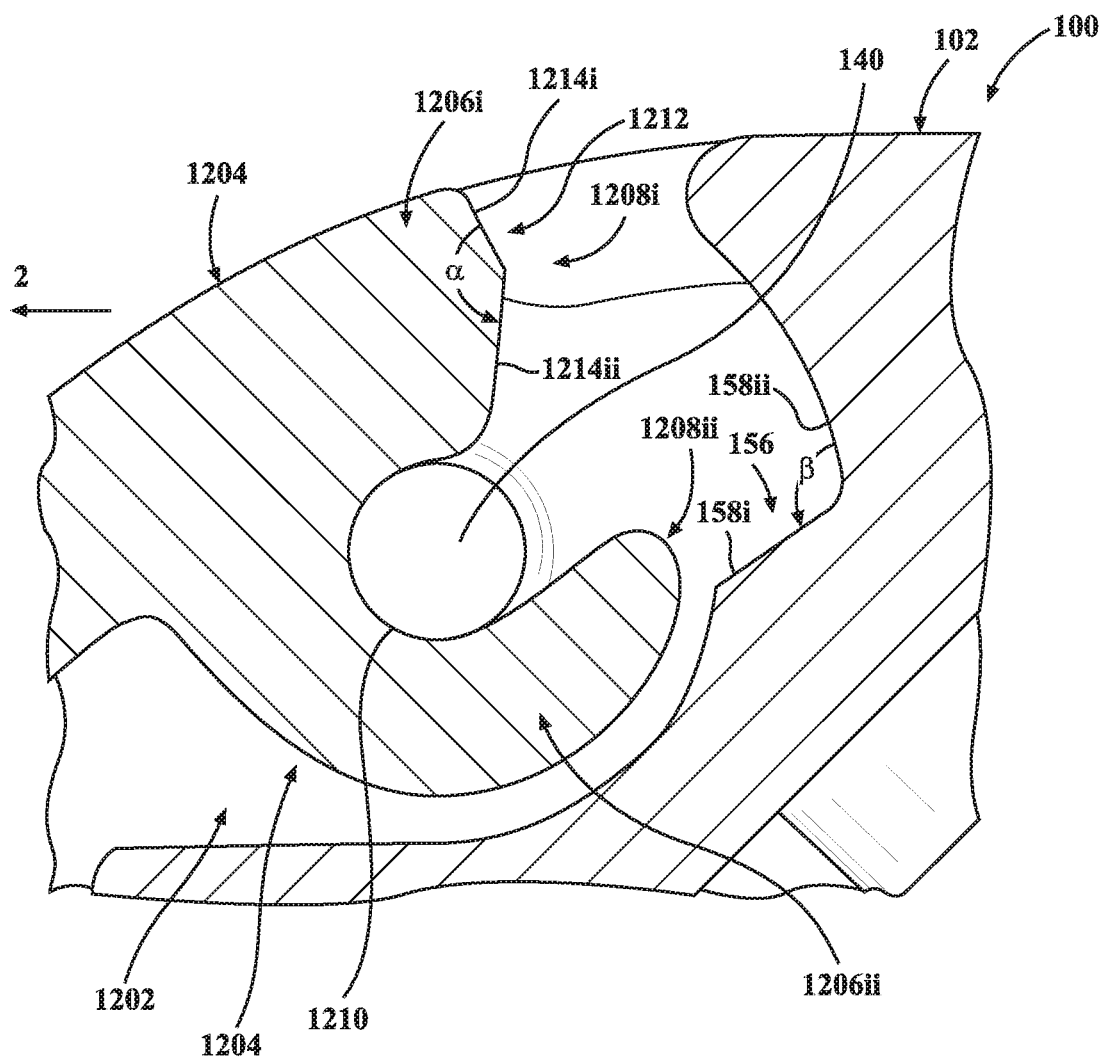
FIG. 39 is a partial, (longitudinal, vertical) cross-sectional view of the door assembly shown connected to the image capture device.

With reference now to FIGS. 32A-39, a door assembly 1100 will be discussed, which represents an alternate embodiment of door assembly 400 (FIGS. 4A-31) discussed above. More specifically, FIG. 32A provides a perspective view of the image capture device 100 with the door assembly 1100 shown in a closed position; FIG. 32B provides a perspective view of the image capture device 100 with the door assembly 1100 shown in an open position; FIG. 33 provides a side, plan view of the door assembly 1100; FIG. 34 provides a bottom (inner), plan view of the door assembly 1100; FIG. 35 provides a side, perspective view of the door assembly 1100 shown in a locked position; FIG. 36 provides a side, perspective view of the door assembly 1100 shown in an unlocked position; FIG. 37 provides a bottom (inner), perspective view of the door assembly 1100 with parts separated; FIG. 38 provides a top (outer), perspective view of the door assembly 1100 with parts separated; and FIG. 39 provides a partial, (longitudinal, vertical) cross-sectional view of the door assembly 1100 shown connected to the image capture device 100.

The door assembly 1100 shares various similarities with the door assembly 400 (FIGS. 4A-31) in both configuration and operation and, as such, in the interest of brevity, will only be discussed with respect to any differences therefrom. In those instances where the door assembly 1100 (or a component thereof) includes an element identical to that included on the door assembly 400 (or a component thereof), the same reference character will be utilized.

Although generally discussed in connection with the image capture device 100 hereinbelow, it should be appreciated that the door assembly 1100 may be configured for use with any image capture device, such as the various embodiments described herein (e.g., the aforedescribed image capture device 200 (FIGS. 2A, 2B)). Additionally, although not illustrated in FIGS. 32A-39, it should be appreciated that the door assembly 1100 may include the aforedescribed clip 900 in additional embodiments of the disclosure to facilitate and maintain secured engagement (contact) with the pivot member 140 (FIG. 5) in the manner discussed above.

The door assembly 1100 defines a longitudinal axis Y2 and an overall length L2 and is rotatably (e.g., pivotably) connected to the body 102 of the image capture device 100 via the pivot member 140 (FIG. 5) such that the door assembly 1100 is movable (repositionable) between the closed position (FIG. 32A) and the open position (FIG. 32B) to reveal and conceal the peripheral cavity 142 defined by the body 102 of the image capture device 100. As discussed in connection with the door assembly 400, the door assembly 1100 completes the exterior of the image capture device 100 and extends along a side of the image capture device 100 between the (upper and lower) corner sections 146*u*, 146*l*.

Figure 42A:
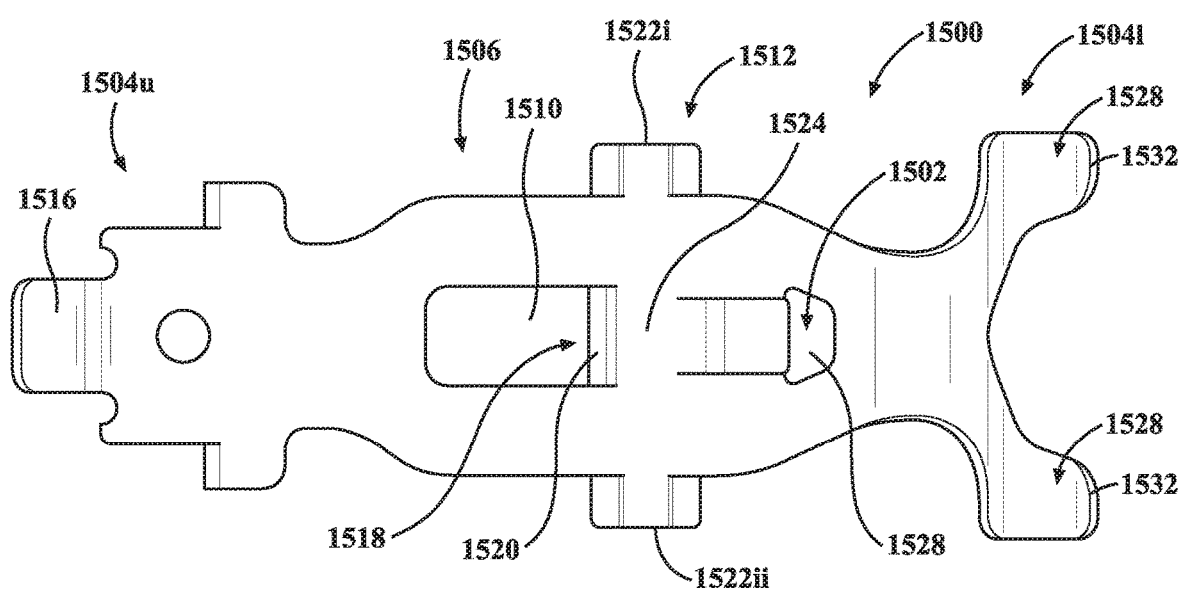
FIG. 42A is a top (outer), plan view of the retainer.
Figure 42B:
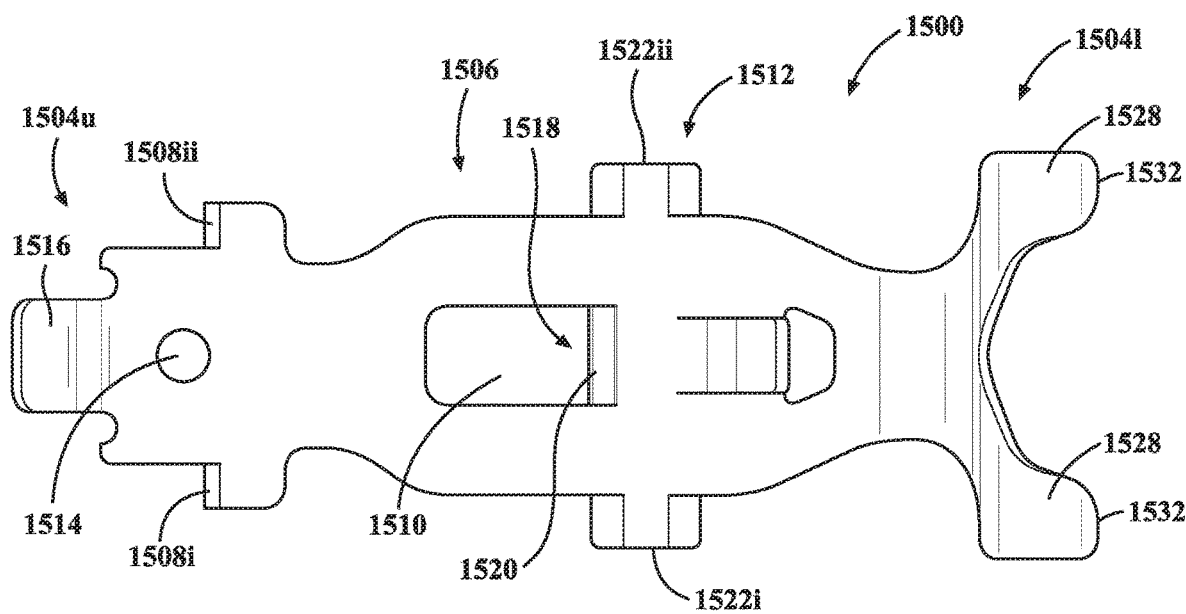
FIG. 42B is a bottom (inner), plan view of the retainer.

With reference to FIGS. 40A-42B as well, the door assembly 1100 includes a door body 1200; a slider 1300; a locking mechanism 1400 that is slidably movable (displaceable) in an axial (vertical) manner between locked and unlocked (first and second) positions along an axis of movement YL2 that extends in generally parallel relation to the longitudinal axis Y2 of the door assembly 1100; a retainer 1500; and the aforementioned seal 1000. More specifically, FIG. 40A provides a top (outer), plan view of the slider 1300; FIG. 40B provides a bottom (inner), plan view of the slider 1300; FIG. 41A provides a top (outer), plan view of the locking mechanism 1400; FIG. 41B provides a bottom (inner), plan view of the locking mechanism 1400; FIG. 42A provides a top (outer), plan view of the retainer 1500; and FIG. 42B provides a bottom (inner), plan view of the retainer 1500.

The door body 1200 is substantially similar to the door body 500 discussed above and includes an engagement structure 1202; a plurality of bosses 1220 that facilitate connection of the retainer 1500 and the seal 1000 to the door body 1200; the (aforedescribed) flanges 506, which support the locking mechanism 1400 in the manner described below; and a window 1222 that is configured to receive the slider 1300.

The engagement structure 1202 includes clasps 1204 (FIG. 37), which are substantially similar in both structure and function to the aforedescribed clasps 510. More specifically, each clasp 1204 is generally C-shaped in configuration and includes arms 1206*i*, 1206*ii* defining ends 1208*i*, 1208*ii*, respectively. The arms 1206*i*, 1206*ii* define a channel 1210 that is configured to receive the pivot member 140 (FIG. 5) such that each clasp 1204 is rotatable in relation to the pivot member 140 during opening and closure of the door assembly 1100. For example, in certain embodiments, it is envisioned that each clasp 1204 may be configured to create an interference fit (e.g., a snap-fit) with the pivot member 140. Each clasp 1204, however, is configured to create sufficient clearance with the pivot member 140 to allow for rotation of the clasp 1204 in relation to the pivot member 140 in the manner described herein.

To facilitate connection of the clasps 1204 to the pivot member 140 (FIG. 5), it is envisioned that the clasps 1204 may include a resilient (e.g., flexible) material, such as plastic, stainless steel, etc., such that the arms 1206*ii* are deflected outwardly (i.e., away from the arms 1206*i*) during connection to the pivot member 140 and are returned to its normal position upon receipt of the pivot member 140 within the channel 1210. As the pivot member 140 seats within the channel 1210, due to the resilient (flexible) material used in construction of the clasps 1204 and the resultant deflection created during connection of the clasp 1204 to the pivot member 140, in certain embodiments, as the clasps 1204 return to their normal positions, it is envisioned that the clasps 1204 may provide an audible indication that the engagement structure 1202 and the pivot member 140 have been positively connected.

As seen in FIG. 39, in certain embodiments the arm 1206*i* of each clasp 1204 may define a bearing surface 1212 (e.g., at the end 1208*i* thereof) that is configured for contact with a corresponding bearing surface 156 defined by the body 102 of the image capture device 100 within the peripheral cavity 142 (FIG. 32B). More specifically, the bearing surface 1212 of each clasp 1204 includes segments 1214*i*, 1214*ii* defining an obtuse angle α therebetween and the bearing surface 156 includes corresponding segments 158*i*, 158*ii* defining an angle β therebetween of approximately 90°. It should be appreciated, however, that the configuration of the bearing surfaces 156, 1212 (e.g., the values for the angles α, β) may be varied in alternate embodiments without departing from the scope of the present disclosure (e.g., depending upon the desired functionality of the door assembly 1100).

When the door assembly 1100 is in the open position, upon reaching a threshold orientation (FIG. 32B), continued rotation of the door assembly 1100 will cause contact between the bearing surfaces 156, 1212 to create a leverage effect that results in the application of an outwardly-directed force (in the direction indicated by arrow 2 (FIG. 39)) that will cause the clasps 1204 to separate from the pivot member 140 (FIG. 5), thus removing the door assembly 1100 from the body 102 of the image capture device 100. For example, it is envisioned that the clasps 1204 may be configured such that the bearing surface 1212 contacts the bearing surface 156 upon positioning of the door assembly 1100 in generally orthogonal relation to the body 102 of the image capture device 100, as seen in FIG. 32B, and that continued rotation of the door assembly 1100 in relation to the body 102 of the image capture device 100 will cause detachment of the door assembly 1100 from the image capture device 100.

As seen in FIG. 37, in certain embodiments, the door assembly 1100 (e.g., the door body 1200) may further include a detent 1216 (e.g., a protrusion, a protuberance, etc.) that facilitates connection of the door assembly 1100 to the body 102 of the image capture device 100. More specifically, the detent 1216 is positioned for contact with the pivot member 140 (FIG. 5) to urge the pivot member 140 into the channel 1210 defined by each clasp 1204. To further promote proper connection of the door assembly 1100 to the pivot member 140 and, thus, the image capture device 100, in certain embodiments, the detent 1216 may include a groove (recess) 1218 that is configured to receive (or otherwise accommodate) the pivot member 140.

During connection of the door assembly 1100, it is envisioned that the pivot member 140 (FIG. 5) may experience resilient deflection (e.g., bending) via forces collectively applied to the pivot member 140 by the clasps 1204 and the detent 1216. More specifically, it is envisioned that the pivot member 140 may be deflected towards the clasps 1204 by the detent 1216 and may return to its normal (linear) position upon seating within the channel 1210 defined by each clasp 1204. Additionally, it is envisioned that the forces applied to the pivot member 140 during connection of the door assembly 1100 may further contribute to the audible indication created upon proper connection of the clasps 1204 to the pivot member 140 mentioned above.

The plurality of bosses 1220 includes a (first) boss 1220*i*; a (second) boss 1220*ii*; and a (third) boss 1220*iii*; and a (fourth) boss 1220*iv*, each of which is configured to receive a corresponding fastener 1224 (e.g., a screw, pin, rivet, etc.). More specifically, the bosses 1220*i*, 1220*ii*, 1220*iii* are configured to receive fasteners 1224*i* such that the fasteners 1224*i* extend through the seal 1000 to fixedly connected the seal 1000 to the door body 1200 and the boss 1220*iv* is configured to receive a fastener 1224*ii* such that the fastener 1224*ii* extends through retainer 1500 to fixedly connect the retainer 1500 to the door body 1200.

The window 1222 in the door body 1200 is configured to receive the slider 1300 such that the slider 1300 is axially (vertically) movable in relation to (and independently of) the locking mechanism 1400 along the longitudinal axis Y2. More specifically, the window 1222 is defined by respective upper and lower edges 1226*u*, 1226*l* and side edges 1226*i*, 1226*ii* and accommodates the slider 1300 during movement between a first position (FIG. 35), in which the locking mechanism 1400 is axially fixed in relation to the door body 1200 to lock the door assembly 1100 and inhibit (if not entirely prevent) opening of the door assembly 1100, and a second position (FIG. 36), in which the locking mechanism 1400 is axially movable in relation to the door body 1200 to allow for unlocking and opening of the door assembly 1100, as described in further detail below. As described in further detail below, movement of the slider 1300 from the first position to the second position facilitates movement of the locking mechanism 1400 and, thus, unlocking of the door assembly 1100.

The slider 1300 is configured as a button 1302, which facilitates manual manipulation by a user along an axis of movement YS (FIGS. 35, 36) that extends in (generally) parallel relation to the axis of movement YL2 of the locking mechanism 1400 and the longitudinal axis Y2 (FIG. 32A) of the door assembly 1100. The slider 1300 may be formed through any suitable method of manufacture using any suitable material or combination of materials. In the particular embodiment shown throughout the figures, for example, the slider 1300 is formed from a metallic material (e.g., stainless steel, aluminum, etc.) and includes a body 1304; a deflector 1306; and a ramp 1308.

The body 1304 of the slider 1300 includes side portions 1310*i*, 1310*ii* and a tactile member 1312 that extends laterally (horizontally) outward from the body 1304 such that the tactile member 1312 is accessible through the window 1222 in the door body 1200. The tactile member 1312 facilitates movement of the slider 1300 between the first position (FIGS. 32A, 35) and the second position (FIGS. 32B, 36) and is configured for manual engagement (contact) by a user to allow for the application of sufficient force to the retainer 1500 to manually unlock the door assembly 1100, as described in detail below. For example, in the illustrated embodiment, the tactile member 1312 is configured as a finger grab 1314 (FIG. 40A).

Additionally, in certain embodiments, the body 1304 of the slider 1300 may also include a cutout (notch) 1316 (FIG. 40B) at an upper (top) end 1318 thereof that is configured to accommodate the boss 1220*iv* (FIG. 37) so as to provide increased clearance between the slider 1300 and the door body 1200 during movement of the slider 1300 between the first position and the second position.

In certain embodiments, such as that illustrated throughout the figures, the slider 1300 may include a visual indicator 1320 (e.g., a colored strip of material, different texturing, etc.) to identify whether the door assembly 1100 is locked or unlocked. For example, when the slider 1300 is in the first position (FIGS. 32A, 35) (e.g., when the door assembly 1100 is locked), the visual indicator 1320 may be concealed by the door body 1200. Upon movement into the second position (FIGS. 32B, 36) (e.g., when the door assembly 1100 is unlocked), however, the visual indicator 1320 may become visible through the window 1222 in the door body 1200 to identify to the user that the door assembly 1100 has been unlocked.

The deflector 1306 extends laterally (horizontally) inward from an inner (bottom) surface 1322 of the slider 1300 (i.e., away from the door body 1200) and is configured for engagement (contact) with a corresponding deflector 1502 (FIGS. 38, 42A) included on the retainer 1500 to facilitate deflection (deformation) of the retainer 1500, as discussed below, and may include any structure suitable for this intended purpose. More specifically, in the particular embodiment shown throughout the figures, the deflector 1306 includes an arcuate (curved) projection 1324. It should be appreciated however, that the configuration of the deflector 1306 may be varied in alternate embodiments without departing from the scope of the present disclosure.

The ramp 1308 is spaced axially from the deflector 1306 and, more specifically, is positioned upwardly of (vertically above) the deflector 1306. The ramp 1308 extends laterally (horizontally) inward (i.e., away from the door body 1200) from the body 1304 of the slider 1300 and defines an angled surface 1326 that is configured for engagement (contact) with the retainer 1500, details of which are provided below. Engagement (contact) between the ramp 1308 and the retainer 1500 facilitates not only deflection of the retainer 1500, as discussed below, but movement of the slider 1300 relative to the retainer 1500 (and the door body 1200) as the slider 1300 moves from the first position (FIGS. 32A, 35) to the second position (FIGS. 32B, 36).

The locking mechanism 1400 is received within the channels 526 (FIGS. 7, 37) that are defined by the flanges 506. The locking mechanism 1400 is substantially similar to the locking mechanism 600 discussed above and includes the (aforedescribed) locking member 602; the (aforedescribed) tactile member 604; and the (aforedescribed) body portion 606.

The body portion 606 includes a plurality of rails 1402 that extend laterally (horizontally) outward therefrom. The rails 1402 are substantially similar in both structure and function to the rails 608 discussed above in connection with the locking mechanism 600. While the specific configurations of the rails 1402 may differ somewhat from those of the rails 608, the rails 1402 facilitate assembly and engagement of (contact between) the locking mechanism 1400 and the door body 1200 in the manner discussed above with respect to the door assembly 1100.

In the illustrated embodiment, the locking mechanism 1400 includes a (first) pair of rails 1402*i*, 1402*ii* and a (second) pair of rails 1402*iii*, 1402*iv*. As discussed in connection with the locking mechanism 600, however, it should be appreciated that the number of rails 1402 may be varied in alternate embodiments without departing from the scope of the present disclosure.

The rails 1402*i*, 1402*ii* are spaced axially from each other (along the longitudinal axis Y2 of the door assembly 1100) so as to define a (first) slot 1404*i* therebetween and the rail 1402*ii* is spaced axially from the tactile member 604 such that a (second) slot 1404*ii* is defined therebetween. Similarly, the rails 1402*iii*, 1402*iv* are spaced axially from each other (along the longitudinal axis Y2 of the door assembly 1100 so as to define a (third) slot 1404*iii* therebetween and the rail 1402*iv* is spaced axially from the tactile member 604 such that a (fourth) slot 1404*iv* is defined therebetween. As discussed in connection with the door assembly 1100, during assembly and connection of the door body 1200 and the locking mechanism 1400, the locking mechanism 1400 is oriented such that the rails 1402*i*-1402*iv* are positioned for insertion into the slots 528*i*-528*iv* (FIG. 8) defined by the door body 1200 and such that the flanges 506*ii*, 506*iv* on the door body 1200 are positioned for insertion into the slots 1404*i*, 1404*iii*, which allows for positioning of the rails 1402 between the flanges 506 and the supports 532 and, thus, reception of the locking mechanism 1400 by the door body 1200. More specifically, upon assembly and connection of the door body 1200 and the locking mechanism 1400, the rails 1402*i*, 1402*ii* and the rails 1402*iii*, 1402*iv* are positioned within the channels 526*i*, 526*ii* defined by the door body 1200, respectively, to restrict (if not entirely prevents) movement of the locking mechanism 1400 towards and/or away from the door body 1200 (e.g., horizontal movement) while allowing for translation (sliding) of the locking mechanism 1400 relative to the door body 1200 (e.g., vertical movement) as the locking mechanism 1400 transitions between the locked and unlocked positions.

To reduce the overall weight of the locking mechanism 1400 and/or inhibit (if not entirely prevent) binding with the door body 1200 during movement between the locked and unlocked positions, in certain embodiments, such as that illustrated throughout the figures, the (upper) rails 1402*i*, 1402*ii* may include reliefs 1406 (e.g., chamfered portions) (FIG. 41B). As discussed in connection with the locking mechanism 600, the reliefs 1406 increase clearance with the flanges 506 on the door body 1200 to facilitate translation (sliding) of the locking mechanism 1400 in the manner described herein.

In addition to the rails 1402, the body portion 606 includes a guide platform 1408 (FIGS. 38, 41A) and a pair of upstanding walls 1410*i*, 1410*ii* that extend laterally (horizontally) from the guide platform 1408 (towards the door body 1200) so as to collectively define a channel 1410 for the slider 1300. More specifically, the guide platform 1408 includes a pair of integral supports (extensions) 1412i, 1412ii that extend laterally (horizontally) inward towards the chamber 634. Upon assembly of the door assembly 1100, the inner (bottom) surface 1322 of the slider 1300 is positioned in engagement (contact) with the guide platform 1408 (e.g., the supports 1412i, 1412ii) and the side portions 1310i, 1310ii of the slider 1300 extend in adjacent (e.g. engaging (contacting)), parallel relation to the upstanding walls 1410i, 1410ii such that the upstanding walls 1410i, 1410ii restrict lateral (horizontal) movement of the slider 1300. At an upper (top) end 1414 thereof, the guide platform 1408 includes reliefs 1416 that increase clearance to inhibit (if not entirely prevent) binding of the slider 1300.

The body portion 606 of the locking mechanism 1400 further defines a pair of stops 1418, which are positioned (generally) adjacent to the reliefs 1416 in the embodiment illustrated throughout the figures. The stops 1418 extend inwardly into the chamber 634 and are configured for engagement (contact) with the retainer 1500 to define a range of motion for the locking mechanism 1400, as discussed in further detail below. Although shown as including a pair of stops 1418i, 1418ii in the illustrated embodiment, it should be appreciated that the particular number of stops 1418 may be varied (e.g., depending upon the particular configuration of the retainer 1500) without departing from the scope of the present disclosure. For example, an embodiment including a single stop 1418 is also contemplated herein.

Spaced axially from (e.g., vertically below) the stop(s) 1418, the body portion 606 defines a series of undercuts 1420 (e.g., recesses, channels, etc.) that extend in (generally) parallel relation to the axis of movement YL2 (FIGS. 35, 36) of the locking mechanism 1400. As described in further detail below, the undercuts 1420 are configured to accommodate the retainer 1500 (and deflection thereof) to facilitate both assembly of the door assembly 1100 and relative movement between the locking mechanism 1400 and the retainer 1500 during repositioning of the locking mechanism 1400 between the locked position (FIG. 35) and the unlocked position (FIG. 36). More specifically, in the illustrated embodiment, the body portion 606 defines an outer (first) undercut 1420i and an inner (second) undercut 1420ii.

The undercut 1420i includes an upper (top) end portion 1422i and is configured to accommodate the retainer 1500 in an undeflected (initial, normal) configuration. The upper end portion 1422i defines one or more stops 1424 that are configured for engagement (contact) with the retainer 1500 to inhibit (if not entirely prevent) movement of the locking mechanism 1400 from the locked position into the unlocked position. It is also envisioned that receipt of the retainer 1500 by the undercut 1420i may limit (if not entirely prevent) unintended lateral (horizontal) movement of the retainer 1500 relative to the locking mechanism 1400 when the retainer 1500 is in the undeflected configuration.

Although shown as including a pair of stops 1424i, 1424ii throughout the figures, it should be appreciated that the number of stops 1424 may be varied in alternate embodiments (e.g., depending upon the configuration of the retainer 1500) without departing from the scope of the present disclosure. For example, an embodiment including only a single stop 1424 is also contemplated herein.

The undercut 1420ii includes an upper (top) end portion 1422ii and is configured to accommodate the retainer 1500 when the retainer 1500 is in a deflected (subsequent) configuration. The undercut 1420ii is positioned inwardly of the undercut 1420i (e.g., further from the door body 1200 and closer to a midline of the locking mechanism 1400) such that the upper end portion 1422ii is spaced axially from (vertically below) the upper end portion 1422i of the undercut 1420i along the longitudinal axis Y2 of the door assembly 1100. As described in further detail below, the axial (vertical) separation between the undercuts 1420i, 1420ii facilitates movement of the locking mechanism 1400 from the locked position into to unlocked position following reconfiguration of the retainer 1500 from the undeflected configuration to the deflected configuration as well as movement of the locking mechanism 1400 from the unlocked position into the locked position and return of the retainer 1500 from the deflected configuration to the undeflected configuration.

To inhibit (if not entirely prevent) binding between the retainer 1500 and the body portion 606 of the locking mechanism 1400 (e.g., during reconfiguration of the retainer 1500 between the undeflected configuration and the deflected configuration and during movement of the locking mechanism 1400 between the locked position and the unlocked position), it is envisioned that the respective upper end portions 1422i, 1422ii of the undercuts 1420i, 1420ii may include radiused corner sections 1426.

Figure 43:
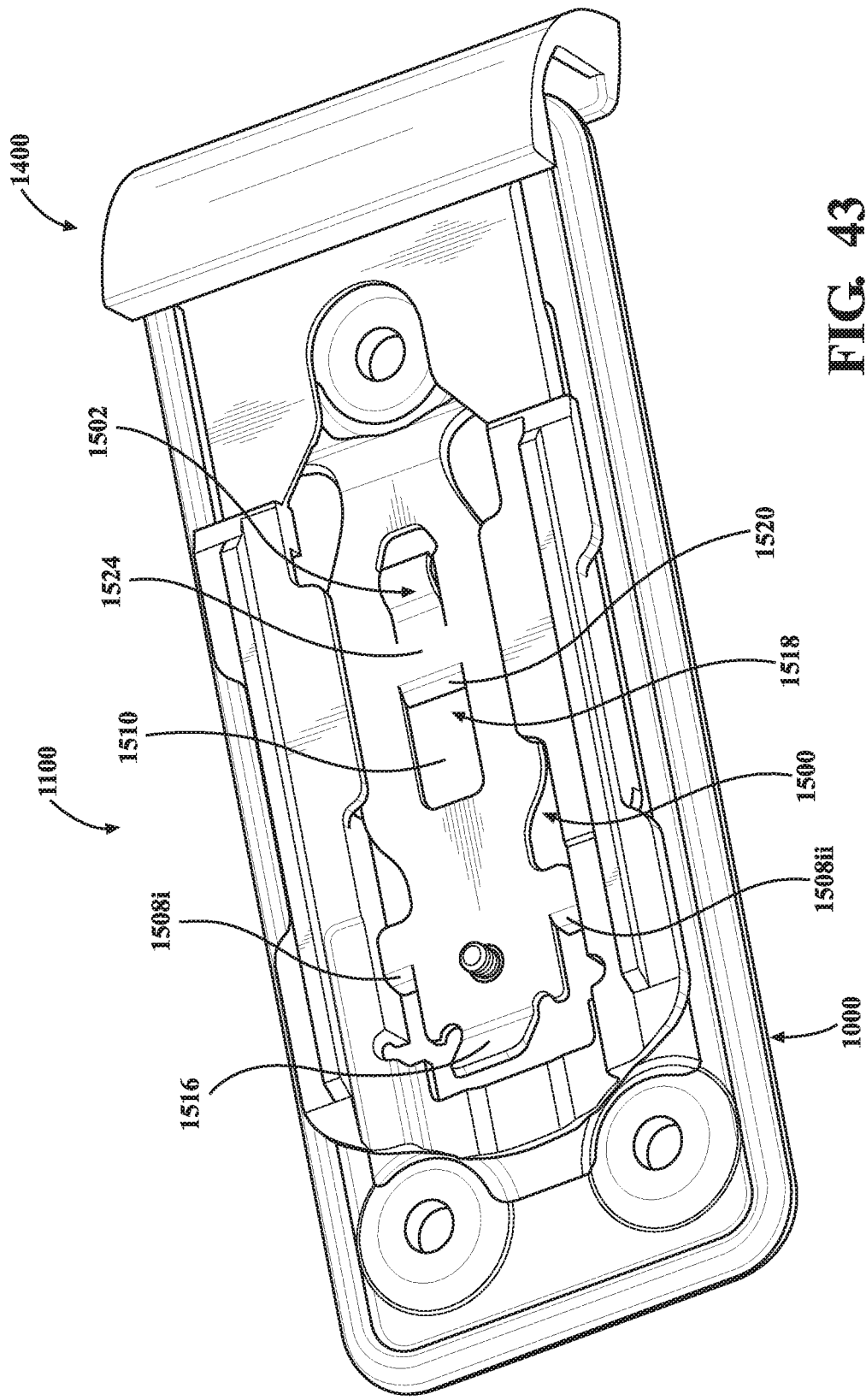
FIG. 43 is a partial, top (outer) perspective view of the door assembly.
Figure 44B:
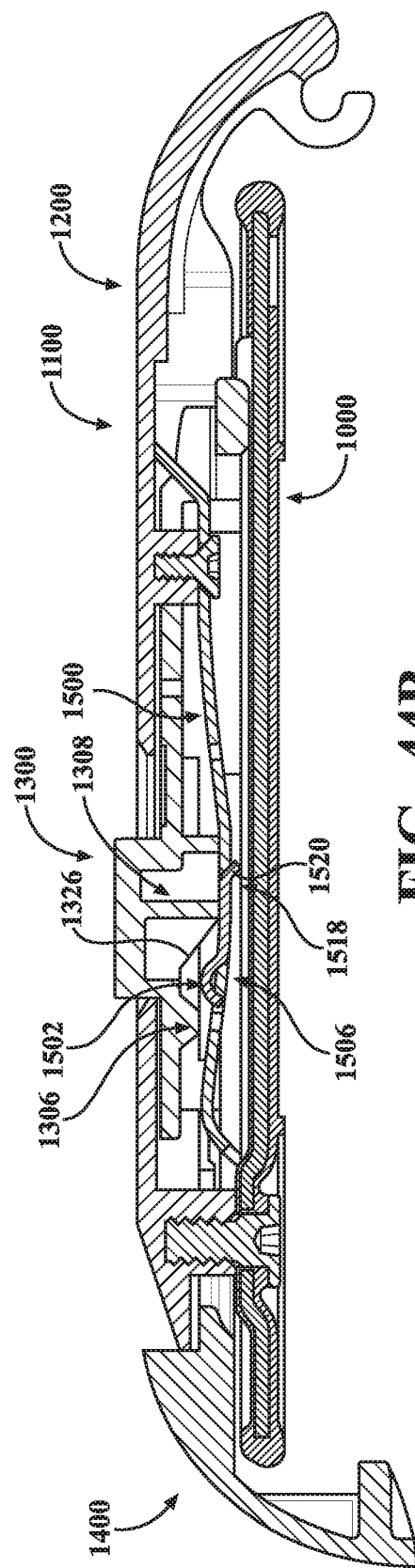
FIG. 44B is a (longitudinal, vertical) cross-sectional view of the door assembly with the slider shown in a second position and the retainer shown in a deflected (subsequent) configuration.

Referring now to FIGS. 42A-44B as well, the retainer 1500 will be discussed. More specifically, FIG. 42A provides a top (outer), plan view of the retainer 1500; FIG. 42B provides a bottom (inner), plan view of the retainer 1500; FIG. 43 is a partial, top (outer) perspective view of the door assembly 1100; FIG. 44A provides a (longitudinal, vertical) cross-sectional view of the door assembly 1100 (shown in perspective) with the slider 1300 shown in the first position and the retainer 1500 shown in the undeflected (initial, normal) configuration; and FIG. 44B provides a (longitudinal, vertical) cross-sectional view of the door assembly 1100 with the slider 1300 shown in the second position and the retainer 1500 shown in the deflected (subsequent) configuration.

The retainer 1500 is received by the chamber 634 defined by the body portion 606 of the locking mechanism 1400 and, in addition to the aforementioned deflector 1502, includes opposite upper and lower (first and second) end portions 1504u, 1504l; a body portion 1506 that is positioned between the end portions 1504u, 1504l; one or more fingers 1508; an opening 1510; and one or more retention members 1512. The retainer 1500 may include any suitable material or combination of materials and may be formed through any suitable method of manufacture (e.g., stamping, injection molding, machining, etc.). For example, in the particular embodiment shown throughout the figures, the retainer 1500 is integrally (e.g., monolithically) formed from a resilient (e.g., flexible) metallic material (e.g., spring steel, aluminum, etc.).

The upper end portion 1504u of the retainer 1500 is axially (vertically) fixed to the door body 1200. More specifically, the upper end portion 1504u of the retainer 1500 defines an aperture 1514 that is configured to receive the fastener 1224ii such that the fastener 1224ii extends through the retainer 1500 into the boss 1220iv (FIG. 37) to fixedly connect the retainer 1500 to the door body 1200. To offset force applied by the fastener 1224ii, in certain embodiments, the retainer 1500 may include an (integral) flange 1516 at the upper end portion 1504u that extends laterally outward into engagement (contact) with the inner surface 534 of the door body 1200.

The finger(s) 1508 extends inwardly from the body portion 1506 of the retainer 1500 (i.e., away from the door body 1200) and are configured for engagement (contact) with locking mechanism 1400 to limit (vertical) travel of the locking mechanism 1400. More specifically, the finger(s) 1508 are configured for engagement (contact) with the stop(s) 1418 defined by the locking mechanism 600 to limit vertical (downward) travel of the locking mechanism 1400, as described in further detail below. Although shown as including a pair of fingers 1508*i*, 1508*ii* in the illustrated embodiment, it should be appreciated that the particular number of fingers 1508 may be varied (e.g., depending upon the particular configuration of the locking mechanism 1400) without departing from the scope of the present disclosure. For example, an embodiment including a single finger 1508 is also contemplated herein.

The opening 1510 defined by the body portion 1506 of the retainer 1500 is configured to receive the ramp 1308 of the slider 1300 (when the slider 1300 is in the first position (FIGS. 32A, 35, 44A)) such that the ramp 1308 extends through the retainer 1500. More specifically, as seen in FIG. 44, when the slider 1300 is in the first position, the ramp 1308 extends through the opening 1510 such that the angled surface 1326 defined by the slider 1300 is positioned for engagement (contact) with an end wall 1518 defining the opening 1510. As the slider 1300 moves from the first position (FIGS. 32A, 35, 44A) into the second position (FIGS. 32B, 36, 44B), the angled surface 1326 of the ramp 1308 traverses the end wall 1518, thereby displacing the retainer 1500 inwardly (i.e., away from the door body 1200) such that the retainer 1500 is moved into the deflected configuration. To encourage such engagement between the slider 1300 and the retainer 1500, the end wall 1518 defining the opening 1510 may include a beveled surface 1520 that extends inwardly (i.e., away from the door body 1200) in correspondence with the configuration of the angled surface 1326. For example, it is envisioned that the angle defined by the beveled surface 1520 may be substantially similar or identical to the angle defined by the angled surface 1326.

In the embodiment of the disclosure shown throughout the figures, the ramp 1308 is illustrated as including a (generally) polygonal (e.g., rectangular) longitudinal (vertical) cross-sectional configuration. Consequently, the opening 1510 includes a corresponding (generally) polygonal (e.g., rectangular) configuration to facilitate receipt of the ramp 1308 by the opening 1510. It should be appreciated, however, that the particular configurations of the ramp 1308 and the opening 1510 may be varied in alternate embodiments without departing from the scope of the present disclosure.

The retention member(s) 1512 extend laterally (horizontally) outward from the body portion 1506 of the retainer 1500 in (generally) orthogonal relation to the longitudinal axis Y2 (FIG. 32A) of the door assembly 1100. More specifically, in the embodiment of the disclosure shown throughout the figures, the retention member(s) 1512 include a pair of wings 1522*i*, 1522*ii* that extend laterally outwardly from the body portion 1506 of the retainer 1500. Although shown as including two wings 1522 throughout the figures, it should be appreciated that the number of wings 1522 may be varied in alternate embodiments (e.g., depending upon the configuration of the locking mechanism 1400) without departing from the scope of the present disclosure. For example, an embodiment including only a single wing 1522 is also contemplated herein.

The wings 1522 are configured for receipt within the undercuts 1420*i*, 1420*ii* (FIGS. 37, 41B, 44A). More specifically, when the retainer 1500 is in the undeflected configuration (FIG. 44A), the wings 1522 are received by the undercut 1420*i* such that the wings 1522 are aligned (in registration) with the stops 1424*i*. Upon deflection of the retainer 1500, however, the wings 1522 are removed from the undercut 1420*i*, are moved out of alignment (registration) with the stops 1424*i*, and are received by the undercut 1420*ii* such that the locking mechanism 1400 can be moved into the unlocked position, as described in further detail below.

The deflector 1502 extends outwardly from the body portion 1506 of the retainer 1500 (i.e., towards the door body 1200) such that the deflectors 1306, 1502 extend in opposite directions. More specifically, the deflector 1502 is spaced axially from (vertically below) the opening 1510 so as to define a support surface 1524 that is configured for engagement (contact) with the deflector 1306 on the slider 1300. The deflector 1502 is configured for engagement (contact) with the bottom surface 1322 of the slider 1300 at a location (vertically) below the deflector 1306. It is envisioned that engagement (contact) between the retainer 1500 and the slider 1300 (e.g., engagement (contact) between the support surface 1524 and the deflector 1306 and engagement (contact) between the deflector 1502 and the bottom surface 1322) may maintain the lateral (horizontal) position of the slider 1300 such that the slider 1300 remains positioned within the window 1222 in the door body 1200. Additionally, the configuration of the deflector 1502 facilitates engagement (contact) with the deflector 1306 included on the slider 1300 to cause deflection of the retainer 1500 as the slider 1300 moves from the first position to the second position. Although shown as including an arcuate (curved) projection 1526 that generally corresponds in configuration to the projection 1324 in the particular embodiment shown throughout the figures, as mentioned in connection with the deflector 1306, it should be appreciated that the configuration of the deflector 1502 may be varied in alternate embodiments without departing from the scope of the present disclosure.

Due to the engagement (contact) between the slider 1300 and the retainer 1500, upon movement of the slider 1300 in the direction indicated by arrow 3 (FIG. 44A) from the first position (FIGS. 32A, 35, 44A) to the second position (FIGS. 32B, 36, 44B), the retainer 1500 is displaced and is reconfigured from the undeflected configuration (FIG. 44A) to the deflected configuration (FIG. 44B) along an axis YD that extends in generally orthogonal relation to the axis of movement YL2 (FIG. 34) of the locking mechanism 1400, the axis of movement YS of the slider 1300, and the longitudinal axis Y2 (FIG. 32A) of the door assembly 1100. As can be appreciated through reference to the transition illustrated between FIGS. 44A and 44B, in the undeflected configuration, the body portion 1506 of the retainer 1500 (e.g., the retention member(s) 1512) and the door body 1200 define a first (lateral) distance therebetween, whereas in the deflected configuration, the body portion 1506 of the retainer 1500 (e.g., the retention member(s) 1512) and the door body 1200 define a second (lateral) distance therebetween that is greater than the first distance. Movement of the slider 1300 from the first position to the second position, however, is resisted by engagement (contact) between the deflector 1306 and the deflector 1502, which is axially fixed by virtue of connection between the retainer 1500 and the door body 1200 established by the fastener 1224*ii* (FIG. 37) and the boss 1220*iv*, until the application of a threshold force Ft2 to the slider 1300. The resistance to movement of the slider 1300 provided by the retainer 1500 inhibits (if not entirely prevents) accidental or unwanted movement of the slider 1300 into the second position (e.g., in the event that the image capture device 100 is dropped) and, thus, inadvertent (e.g., accidental or unwanted) unlocking and opening of the door assembly 1100.

Upon application of the threshold force Ft2, the deflectors 1306, 1502 bear against one another as the deflector 1306 beings to traverse (travel across) the deflector 1502, which results in approximation of the ramp 1308 and the end wall 1518 defining the opening 1510 in the body portion 1506 of the retainer 1500. As the deflectors 1306, 1502 bear against one another, lateral (outward) movement of the slider 1300 (i.e., movement away from the retainer 1500 and towards the door body 1200) is resisted by the door body 1200, which allows the lateral position of the slider 1300 to remain relatively constant within the door assembly 1100. As a result, axial movement of the slider 1300 causes deflection (movement) of the retainer 1500 inwardly (i.e., away from the door body 1200) along the axis YD in the direction indicated by arrow 4 (FIG. 44A). Continued movement of the slider 1300 towards the second position causes engagement of (contact between) the angled surface 1326 of the ramp 1308 and the end wall 1518, which results in further (inward) deflection (movement) of the retainer 1500 and removal of the ramp 1308 from the opening 1510. Upon removal of the ramp 1308 from the opening 1510, continued movement of the slider 1300 towards the second position results in positioning of a bottom (inner) surface 1328 (FIGS. 37, 40B) of the ramp 1308 in engagement (contact) with the support surface 1524 (FIGS. 38, 42A) on the retainer 1500, as seen in FIG. 4B. Deflection of the retainer 1500 is thus caused by movement of the slider 1300 from the first position to the second position and the resultant engagement (contact) between the deflectors 1306, 1502 and between the ramp 1308 and the end wall 1518 defining the opening 1510 in the retainer 1500.

Oppositely, as the slider 1300 moves from the second position to the first position (in the direction indicated by arrow 5 (FIG. 44A)), the inner surface 1328 of the ramp 1308 traverses the support surface 1524 on the retainer 1500 until the ramp 1308 reaches the opening 1510 in the retainer 1500. Continued movement of the slider from the second position to the first position causes the angled surface 1326 to traverse the end wall 1518 as the ramp 1308 re-enters the opening 1510, during which, the deflector 1306 traverses (travels across) the deflector 1502 as the retainer 1500 moves outwardly (i.e., towards the door body 1200) in the direction indicated by arrow 6 (FIG. 44A) during return of the retainer 1500 to the undeflected configuration. As the undeflected configuration of the retainer 1500 is restored, which is facilitated by the inclusion of the aforementioned resilient material(s) used in construction of the retainer 1500, the (lateral) distance between the retainer 1500 (e.g., the retention member(s) 1512) and the door body 1200 is reduced.

The lower end portion 1504*l* of the retainer 1500 includes a pair of flanges 1528 that are configured for engagement (contact) with the seal 1000. The flanges 1528 are spaced laterally (horizontally) from each other such that the lower end portion 1504*l* of the retainer 1500 is (generally) Y-shaped in configuration. As seen in FIGS. 37 and 38, for example, the (generally) Y-shaped configuration of the lower end portion 1504*l* defines a receiving space 1530 for the boss 1220*iii*.

The flanges 1528 each include an end portion 1532 that bears against the seal 1000 to create and apply a force to the retainer 1500 that is directed outwardly (towards the door body 1200). It is envisioned the outwardly directed force created by the flanges 1528 may increase not only the stability of the door assembly 1100, but the threshold force Ft2 (FIG. 44A) that must be applied to the slider 1300 to move the slider 1300 from the first position (FIGS. 32A, 35, 44A) into the second position (FIGS. 32B, 36, 44B) and cause deflection of the retainer 1500 in the manner discussed above. The flanges 1528, thus, further inhibit accidental or unwanted movement of the slider 1300 into the second position and inadvertent (e.g., accidental or unwanted) unlocking and opening of the door assembly 1100. Additionally, the outwardly directed force created by the flanges 1528 is communicated to the slider 1300 via engagement (contact) between the support surface 1524 and the deflector 1306 and engagement (contact) between the deflector 1502 and the bottom surface 1322 of the slider 1300 to bias the slider 1300 outwardly (towards the door body 1200) and thereby maintain the lateral (horizontal) position of the slider 1300. To inhibit (if not entirely prevent) binding between the retainer 1500 and the seal 1000, the end portion 1532 of each flange 1528 may include an arcuate (curved) configuration, as illustrated throughout the figures, to allow for axial (vertical) of the retainer 1500 relative to the seal 1000 during deflection of the retainer 1500.

With reference now to FIGS. 37, 38, 41A, and 41B, assembly of the door assembly 1100 will be discussed. Initially, the slider 1300 is positioned such that the tactile member 1312 extends through the window 1222 defined by the door body 1200. The locking mechanism 1400 is then oriented such that the rails 1402*i*-1402*iv* (FIGS. 41A, 41B) are positioned in (vertical) registration (alignment) with the slots 528*i*-528*iv* (FIG. 8) and the flanges 506*ii*, 506*iv* are positioned in (vertical) registration (alignment) with the slots 1404*i*, 1404*iii*, which allows the rails 1402*i*, 1402*ii* to be inserted into the channel 526*i* and the rails 1402*iii*, 1402*iv* to be inserted into the channel 526*ii* via axial (vertically upward) movement of the locking mechanism 600 (e.g., towards the pivot member 140) such that the rails 1402*i*-1402*iv* are supported by and positioned in engagement (contact) with the flanges 506*i*-506*iv*, respectively. When so positioned, the slider 1300 is supported by the guide platform 1408 (FIG. 38) (e.g., by the supports 1412*i*, 1412*ii*) of the locking mechanism 1400 and is secured between the door body 1200 and the locking mechanism 1400.

The retainer 1500 is then secured to the door body 1200 via insertion of the fastener 1224*ii* into the boss 1220*iv* through aperture 1514 such that the ramp 1308 on the slider 1300 extends into the opening 1510. Upon connection of the retainer 1500 to the door body 1200, the deflector 1306 on the slider 1300 is positioned adjacent to (e.g., in engagement (contact) with) the deflector 1502 on the retainer 1500 so as to resist movement of the slider 1300 from the first position to the second position until application of the threshold force Ft2 (FIG. 44A), as discussed above. Additionally, the retention member(s) 1512 (e.g., the wings 1522*i*, 1522*ii*) are received by the undercut 1420*i* defined by body portion 606 of the locking mechanism 1400 such that the wings 1522*i*, 1522*ii* are positioned adjacent to (e.g., in engagement (contact) with the stop(s) 1424*i* defined by the upper end portion 1422*i* of the undercut 1420*i* to inhibit (if not entirely prevent) movement of the locking mechanism 1400 from the locked position into the unlocked position.

After connection of the retainer 1500 to the door body 1200, the seal 1000 can be connected to the door body 1200 in the manner discussed above such that the flanges 1528 at the lower end portion 1504*l* of the retainer 1500 are positioned adjacent to (e.g., in engagement (contact) with) the seal 1000.

With reference now to FIGS. 32A, 32B, 35-39, 44A, and 44B, use and operation of the door assembly 1100 will be discussed. To open the door assembly 1100, the slider 1300 is moved from the first position (FIGS. 32A, 35, 44A) into the second position (FIGS. 32B, 36, 44B) via application of the threshold force Ft2 (FIG. 44A) so as to overcome the resistance created via engagement (contact) between the deflectors 1306, 1502. Upon the application of the threshold force Ft2, the deflector 1306 traverses (moves across) the deflector 1502 and the angled surface 1326 of the ramp 1308 engages (contacts) and traverses the end wall 1518 defining the opening 1510 such that the ramp 1308 is withdrawn from the opening 1510. Movement of the deflector 1306 across the deflector 1502 causes initial inward deflection of the retainer 1500 (i.e., movement away from the door body 1200 and towards the door lock 800), which is supplemented by travel of the angled surface 1326 of the ramp 1308 across the end wall 1518 so as to move the retainer 1500 into the deflected configuration (FIG. 44B). Continued (downward) movement of the slider 1300 results in positioning of the inner surface 1328 (FIG. 37) of the ramp 1308 upon the support surface 1524 (FIGS. 38, 42A) of the retainer 1500, which allows the slider 1300 to complete movement into the second position.

During deflection of the retainer 1500, the wings 1522i, 1522ii (FIG. 37) are moved out of alignment (registration) with the stops 1424i, 1424ii defined by the body portion 606 of the locking mechanism 1400, respectively, which allows for (vertically) downward movement of the locking mechanism 1400 into the unlocked position (e.g., via the manual application of force to the tactile member 604) to thereby remove the locking member 602 from the receptacle 148 (FIGS. 13, 15) in the housing 102 of the image capture device 100.

After unlocking of the locking mechanism 600 and removal of the locking member 602 from the receptacle 148, the door assembly 1100 can be rotated in relation to (i.e., away from) the body 102 of the image capture device 100 into the open position (FIG. 32B). If necessary or desired, the door assembly 1100 can then be separated from the body 102 of the image capture device 100. For example, a pulling force can be applied to the door assembly 1100 to deflect the arms 1206i, 1206ii of the claps 1204 such that the claps 1204 can be separated from the pivot member 140. Alternatively, the door assembly 1100 can be rotated beyond the (generally orthogonal) threshold position seen in FIG. 32B such that the bearing surface 1212 (FIG. 39) defined at the end 1208i of the arm arms 1206i of each clasp 1204 contacts the bearing surface 156 defined by the body 102 of the image capture device 100. Upon such contact between the bearing surfaces 1212, 156, as mentioned above, the continued application of force results in the creation of an outwardly-directed force (in the direction indicated by arrow 2) that will cause the clasps 1204 to separate from the pivot member 140, thus removing the door assembly 1100 from the body 102 of the image capture device 100.

To reconnect the door assembly 1100 to the body 102 of the image capture device 100, the pivot member 140 (FIG. 5) is re-inserted into the channels 1210 defined by the clasps 1204, during which, the resilient material used in construction of the clasps 1204 allows the clasps 1204 to deflect. More specifically, the pivot member 140 deflects the arm 1206ii of each clasp 1204 outwardly (away from the arm 1206i), during which, the pivot member 140 may be resiliently deflected via forces collectively applied to the pivot member 140 by the clasps 1204 and the detent 1216 (FIG. 37). Upon seating of the pivot member 140 within the engagement structure 1202, the pivot member 140 is returned to its normal (linear) configuration.

After reconnection of the door assembly 1100, the door assembly 1100 can be rotated in relation to (i.e., towards) the body 102 of the image capture device 100 to thereby compress the seal 1000 within the peripheral cavity 142 in the manner discussed above. Once closed, the locking mechanism 1400 can be moved into the locked position (FIGS. 32A, 35), during which, the locking mechanism 1400 is moved (vertically) upward (e.g., towards the pivot member 140). During upward movement of the locking mechanism 1400, the inner surface 1328 of the ramp 1308 traverses the support surface 1524 of the body portion 1506 of the retainer 1500 and the deflector 1306 passes the deflector 1502 such that the ramp 1308 re-enters the opening 1510. As the ramp 1308 re-enters the opening 1510, the initial (undeflected) configuration of the retainer 1500 is restored and the deflectors 1306, 1502 are brought into engagement (contact). Due to the corresponding arcuate configurations of the deflectors 1306, 1502 and the resilient construction of the retainer 1500, it is envisioned that engagement (contact) between the deflectors 1306, 1502 may facilitate (e.g., encourage) not only upward (vertical) movement of the locking mechanism 1400 and return of the locking mechanism 1400 to the locked position, but return of the slider 1300 to the first position.

As the locking mechanism 1400 moves upwardly (e.g., towards the pivot member 140), the locking member 602 (FIGS. 13, 15) is re-inserted into the receptacle 148 in the housing 102 of the image capture device 100 to thereby inhibit (if not entirely prevent) inadvertent (e.g., accidental or unwanted) opening of the door assembly 1100 (e.g., in the event that the image capture device 100 is dropped).

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An image capture device comprising:
   a body defining a peripheral cavity and including a pivot member spanning the peripheral cavity; and
   a door assembly configured to close and seal the peripheral cavity, the door assembly including:
      a door body including an engagement structure configured to removably receive the pivot member such that the door body is connectable to and disconnectable from the body of the image capture device;
      a locking mechanism slidable in relation to the door body between a locked position, in which the door assembly is rotationally fixed in relation to the body of the image capture device to maintain closure of the door assembly, and an unlocked position, in which the door assembly is rotatable in relation to the body of the image capture device to allow for opening of the door assembly;
      at least one biasing member supported between the locking mechanism and the door body to bias the locking mechanism towards the locked position; and
      a spring clip housed within and secured to the door body, the spring clip configured to engage the pivot member to secure the door assembly to the pivot member, the spring clip including a resilient material and being configured for deflection during connection and disconnection of the door body to the pivot member to provide tactile indications of connection and disconnection.

2. The image capture device of claim 1, wherein the at least one biasing member includes a first end and a second end opposite to the first end, and wherein the locking mechanism defines a cavity configured to receive the first end of the at least one biasing member.

3. The image capture device of claim 2, wherein the door body defines a seat configured to support the second end of the at least one biasing member such that the at least one biasing member extends in generally parallel relation to a length of the door assembly.

4. The image capture device of claim 1, wherein the at least one biasing member includes a first biasing member and a second biasing member spaced laterally from the first biasing member along a width of the door body.

5. The image capture device of claim 1, wherein the engagement structure and the spring clip collectively define an expandable receiving space configured to receive the pivot member.

6. The image capture device of claim 5, wherein the spring clip includes a leg defining an arcuate guide surface to guide the pivot member into and out of the expandable receiving space during connection and disconnection of the door body to the pivot member.

7. The image capture device of claim 6, wherein the leg includes overlapping segments to increase rigidity of the leg.

8. The image capture device of claim 1, further including a spring plate supported by the door body and configured for engagement with the locking mechanism to resist movement of the locking mechanism from the locked position to the unlocked position and facilitate movement of the locking mechanism from the unlocked position to the locked position.

9. The image capture device of claim 8, wherein the spring plate is configured for movement between a normal position and a deflected position upon application of a threshold force to the locking mechanism.

10. The image capture device of claim 9, wherein the locking mechanism includes at least one deflector configured for engagement with the spring plate, the spring plate and the at least one deflector defining corresponding angled surfaces to facilitate movement of the spring plate between the normal position and the deflected position.

11. An image capture device comprising:
    a device body; and
    a door assembly including:
       a door body having a first end configured for removable connection to the device body and a second end opposite to the first end;
       a locking mechanism slidable in relation to the door body between a locked position, in which the door assembly is rotationally fixed in relation to the device body to maintain closure of the door assembly, and an unlocked position, in which the door assembly is rotatable in relation to the device body to allow for opening of the door assembly; and
       at least one biasing member configured for engagement with the door body and the locking mechanism to automatically move the locking mechanism into the locked position upon closure of the door assembly, the biasing member configured to bias the locking mechanism towards the first end of the door body.

12. The image capture device of claim 11, wherein the device body defines a receptacle and the locking mechanism includes a locking member configured for removable insertion into the receptacle, and wherein the locking member is movable into the receptacle during movement of the locking mechanism into the locked position and movable out of the receptacle during movement of the locking mechanism into the unlocked position.

13. The image capture device of claim 12, wherein the device body and the door assembly include corresponding bearing surfaces configured for engagement during closure of the door assembly to thereby slide the locking mechanism axially in relation to the door body to facilitate insertion of the locking member into the receptacle.

14. The image capture device of claim 11, wherein the locking mechanism defines a cavity configured to receive the at least one biasing member such that the at least one biasing member extends in generally parallel relation to a length of the door assembly.

15. The image capture device of claim 14, wherein the door body defines a seat configured to support the at least one biasing member such that the at least one biasing member is compressed between the locking mechanism and the door body.

16. The image capture device of claim 15, wherein the at least one biasing member includes a first biasing member and a second biasing member spaced laterally from the first biasing member along a width of the door body.

17. The image capture device of claim 16, wherein the locking mechanism defines a first cavity configured to receive the first biasing member and a second cavity configured to receive the second biasing member, and wherein the door body defines a first seat configured to support the first biasing member and a second seat configured to support the second biasing member.

18. A door assembly for an image capture device, the door assembly comprising:
- a door body having a first end configured for removable connection to the image capture device and a second end opposite to the first end;
- a locking mechanism received by the door body such that the locking mechanism is axially displaceable along a length of the door assembly during movement between an unlocked position and a locked position; and
- at least one biasing member axially compressed between the door body and the locking mechanism such that the locking mechanism automatically moves into the locked position upon closure of the door assembly, the biasing member configured to bias the locking mechanism towards the first end of the door body.

19. The door assembly of claim 18, further including a spring clip secured to the door body and configured for engagement with a body of the image capture device to secure the door assembly to the body of the image capture device.

20. The door assembly of claim 19, wherein the spring clip includes a resilient material such that the spring clip is deflected during connection and disconnection of the door assembly to the body of the image capture device to provide tactile indications of connection and disconnection.

* * * * *